United States Patent
Sharma et al.

(10) Patent No.: US 10,459,685 B2
(45) Date of Patent: *Oct. 29, 2019

(54) METHODS AND SYSTEM FOR CUE DETECTION FROM AUDIO INPUT, LOW-POWER DATA PROCESSING AND RELATED ARRANGEMENTS

(71) Applicant: Digimarc Corporation, Beaverton, OR (US)

(72) Inventors: Ravi K. Sharma, Portland, OR (US); Shankar Thagadur Shivappa, Tualatin, OR (US); Osama M. Alattar, Tigard, OR (US); Brett A. Bradley, Portland, OR (US); Scott M. Long, Portland, OR (US); Ajith M. Kamath, Beaverton, OR (US); Vojtech Holub, Portland, OR (US); Hugh L. Brunk, Portland, OR (US); Robert G. Lyons, Portland, OR (US); Aparna R. Gurijala, Port Coquilam (CA)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,127

(22) Filed: Feb. 9, 2018

(65) Prior Publication Data

US 2018/0246696 A1    Aug. 30, 2018

Related U.S. Application Data

(63) Continuation of application No. 15/192,925, filed on Jun. 24, 2016, now Pat. No. 9,891,883, which is a continuation-in-part of application No. PCT/US2014/072397, filed on Dec. 24, 2014.

(Continued)

(51) Int. Cl.
*G06F 17/00* (2019.01)
*G06F 3/16* (2006.01)
(Continued)

(52) U.S. Cl.
CPC ............ *G06F 3/165* (2013.01); *G10L 19/018* (2013.01); *G10L 19/0212* (2013.01); *G10L 25/09* (2013.01); *G10L 25/21* (2013.01)

(58) Field of Classification Search
CPC ..................................................... G06F 3/165
See application file for complete search history.

(56) References Cited

U.S. PATENT DOCUMENTS 8,254,902 B2    8/2012    Bell
8,359,410 B2    1/2013    Conroy
(Continued)

OTHER PUBLICATIONS

Kumar, 'Cloud Computing for Mobile Users: Can Offloading Computation Save Energy!' Purdue University, 2010.*

(Continued)

*Primary Examiner* — Joseph Saunders, Jr.
(74) *Attorney, Agent, or Firm* — Digimarc Corporation

(57) ABSTRACT

Methods and arrangements involving electronic devices, such as smartphones, tablet computers, wearable devices, etc., are disclosed. One arrangement involves a low-power processing technique for discerning cues from audio input. Another involves a technique for detecting audio activity based on the Kullback-Liebler divergence (KLD) (or a modified version thereof) of the audio input. Still other arrangements concern techniques for managing the manner in which policies are embodied on an electronic device. Others relate to distributed computing techniques. A great variety of other features are also detailed.

29 Claims, 10 Drawing Sheets

Related U.S. Application Data

(60) Provisional application No. 62/051,495, filed on Sep. 17, 2014, provisional application No. 61/920,722, filed on Dec. 24, 2013.

(51) Int. Cl.
  G10L 19/018 (2013.01)
  G10L 19/02 (2013.01)
  G10L 25/09 (2013.01)
  G10L 25/21 (2013.01)

(56) References Cited

U.S. PATENT DOCUMENTS

| | | |
|---|---|---|
| 8,405,505 B2 | 3/2013 | Desai |
| 8,595,289 B2 | 11/2013 | Nandlall |
| 8,768,707 B2 | 7/2014 | Mozer |
| 9,153,232 B2 | 10/2015 | Zhang |
| 2002/0192625 A1 | 12/2002 | Mizokawa |
| 2006/0190450 A1 | 8/2006 | Holm |
| 2009/0259865 A1 | 10/2009 | Sheynblat |
| 2010/0313050 A1 | 12/2010 | Harrat |
| 2011/0306326 A1 | 12/2011 | Reed |
| 2012/0102098 A1 | 4/2012 | Guillou |
| 2012/0139929 A1 | 6/2012 | Kaza |
| 2013/0082939 A1 | 4/2013 | Zhao |
| 2013/0110521 A1 | 5/2013 | Hwang |
| 2013/0253918 A1 | 9/2013 | Jacobs |
| 2013/0289994 A1 | 10/2013 | Newman |
| 2013/0301837 A1 | 11/2013 | Kim |
| 2013/0339028 A1 | 12/2013 | Rosner |
| 2014/0095695 A1 | 4/2014 | Wang |
| 2014/0101237 A1 | 4/2014 | Chan |
| 2014/0142958 A1 | 5/2014 | Sharma |
| 2014/0222436 A1 | 8/2014 | Binder |
| 2014/0278437 A1 | 9/2014 | Shen |
| 2014/0278443 A1 | 9/2014 | Gunn |
| 2014/0280794 A1 | 9/2014 | Baca |

OTHER PUBLICATIONS

Qi, "Research on Mobile Cloud Computing: Review, Trend and Perspectives", Faculty of Computer Science and Information Technology, University of Malaya, 2012.*

Singh, "A Synchronization Algorithm of Mobile Database for Cloud Computing", International Journal of Application or Innovation in Engineering and Management, vol. 2, Issue 3, Mar. 2013.

Huerta-Canepa, "A Virtual Cloud Computing Provider for Mobile Devices", ACM Workshop on Mobile Cloud Computing & Services, Jun. 2010.

Chen, 'Virtual Smartphone over IP', NTT Information Sharing Platform Laboratories, NTT Technical Review, vol. 8 No. 7, Jul. 2010.

Chun, 'Augmented Smartphone Applications Through Clone Cloud Execution', Intel Research Berkeley, 2009.

Chun, "CloneCloud: Elastic Execution between Mobile Device and Cloud", 2011.

Chetan, "Cloud Computing for Mobile World", Technique Report, 2010.

Tandel, "Cloud Computing in Smartphone: Is offloading a better-bet", Department of Electrical Engineering and Computer Science, Wichita State University, 2012.

Cuervo, "MAUI: Making Smartphones Last Longer with Code Offload", In Proceedings of ACM MobiSys, 2010.

Divya, "Mobile Application Platform on Cloud Server", 2011 International Conference on Advancements in Information Technology, 2011.

Divya, "Mobile Application with Cloud Computing", International Journal of Scientific Research Publications, vol. 2, Issue 4, Apr. 2012.

Zhao, "Mirroring Smartphones for Good: A Feasibility Study", Department of Computer Science and Engineering, The Pennsylvania State University, 2011.

Sen, "The Case for Cloud-Enabled Mobile Sensing Services", Proceedings of the first edition of the MCC workshop on Mobile cloud computing, 2012.

Satyanarayanan, The Case for VM-based Cloudlets in Mobile Computing, IEEE Pervasive Computing, vol. 8, No. 4, pp. 14-23, Nov. 2009.

PCT Search Report and Written Opinion dated Apr. 23, 2015 in PCT/US2014/072397.

Chetan, "Cloud Computing for Mobile World", Department of Computer Science and Engineering National Institute of Technology, Calicut.

* cited by examiner

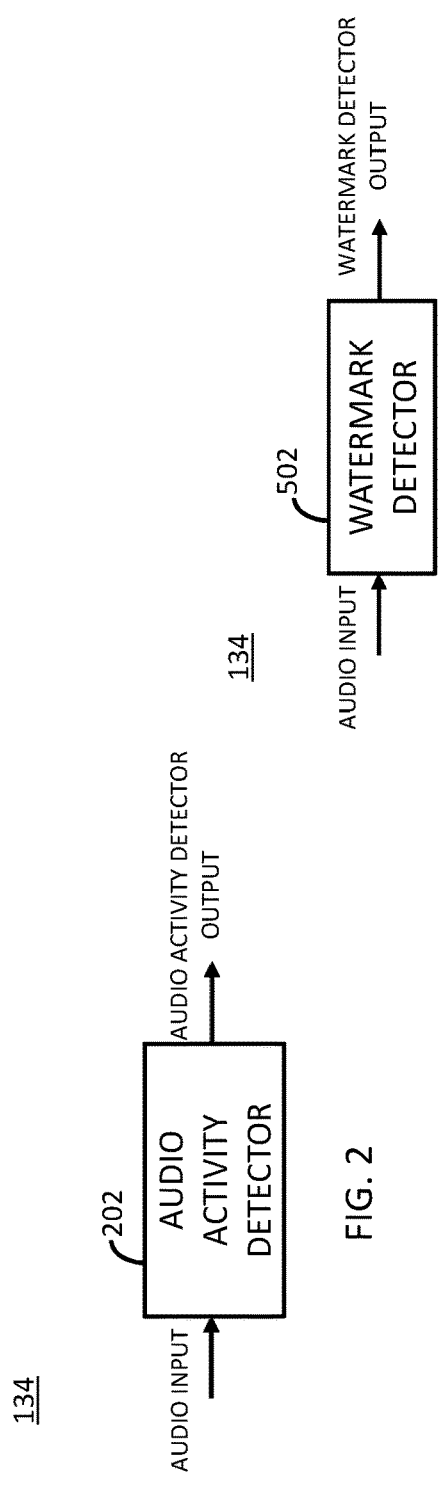
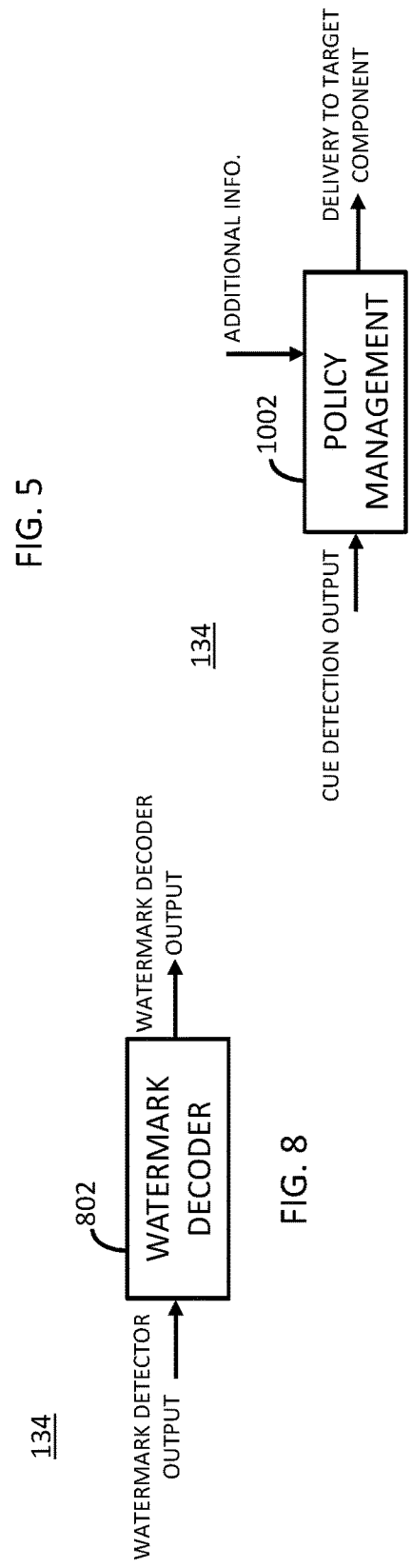
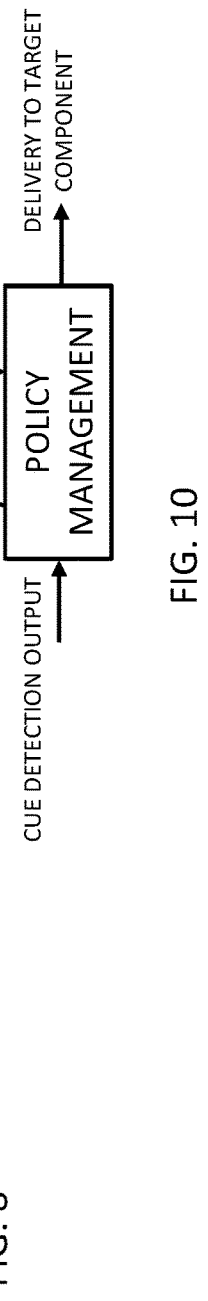

METHODS AND SYSTEM FOR CUE DETECTION FROM AUDIO INPUT, LOW-POWER DATA PROCESSING AND RELATED ARRANGEMENTS

CROSS-REFERENCE TO RELATED APPLICATIONS

This application is a continuation of application Ser. No. 15/192,925, filed Jun. 24, 2016 (now U.S. Pat. No. 9,891,883) which is a continuation in part and nationalization of PCT/US14/72397, filed Dec. 24, 2014, which claims priority to U.S. Provisional Application No. 62/051,495, filed Sep. 17, 2014 and U.S. Provisional Application No. 61/920,722, filed Dec. 24, 2013, each of which is incorporated herein by reference in its entirety.

TECHNICAL FIELD

The following disclosure relates to systems and methods for audio signal processing, audio activity detection, digital watermark detection and decoding, power management, policy control in electronic devices, distributed computing and more.

BACKGROUND

Advances in consumer electronics have resulted in a variety of mobile devices such as mobile phones, cellular phones, smartphones, tablet computers, laptop computers, media players, personal activity tracking devices, smartwatches, etc. These devices are, increasingly, multi-sensory (e.g., capable of sensing location, orientation, motion, ambient light levels, ambient sound, user heartbeat, etc.) and multi-functional (e.g., capable of supporting functions such as cellular telephony, VOIP, playing audio and video, capturing still images, recording video, playing video games, GPS navigation, web surfing, downloading of streaming media from the Internet, Bluetooth and WiFi communications, emailing, text messaging, tracking a user's physical activity, etc.).

Another current trend in mobile computing relates to the notion of contextual or "context-aware" computing as a means of enabling or otherwise enhancing the functionality supported by a user's mobile device. Contextual computing requires the gathering of contextual information, including information describing computing context (e.g., network connectivity, memory availability, processor type, CPU contention, etc.), user context (e.g., user profile, location, utterances, gestures or other actions, preferences, nearby friends, social network(s) and situation, etc.), physical context (e.g., lighting, noise level, traffic, etc.), temporal context (e.g., time of day, day, month, season, etc.), history of the above, or the like or any combination thereof. In many cases, such contextual information is gathered from one or more physical sensors, logical sensors, or combinations thereof. Examples of physical and logical sensors are described in U.S. Pat. No. 8,762,852, which is incorporated herein by reference in its entirety. Beyond gathering, the contextual information must be processed—preferably accurately, quickly and reliably—before context can be discerned and acted upon in a meaningful manner.

While mobile devices are becoming more powerful in terms of processing and sensory capabilities, constraints on mobile computing resources (e.g., battery power, wireless network communications capacity, CPU processing speed, memory, etc.) continue to place practical limits on the functionality that may be realized with mobile devices.

SUMMARY

In one embodiment, a method includes obtaining audio input; and at a first processor, processing the audio input to discern a characteristic of the audio input. Thereafter, an output based upon the processing is generated and an operation of a second processor (distinct from the first processor) is controlled based on the generated output.

In other embodiments, a method includes receiving (e.g., with a microphone of an electronic device) audio from an aural environment surrounding an electronic device; processing the received audio to derive data therefrom; and enabling or disabling at least one policy embodied on the electronic device by reference to the derived data.

In another embodiment, a method includes receiving (e.g., with a microphone of an electronic device) audio from an aural environment surrounding an electronic device; processing the received audio to derive a plurality of items of auxiliary data therefrom, wherein at least one of the items of auxiliary data comprises delivery control data; and delivering at least one other of the items of auxiliary data to at least one component of the electronic device based on the delivery control data.

Other embodiments include other methods, devices, apparatus, systems, etc., which shall become apparent from the following description and drawings.

BRIEF DESCRIPTION OF THE DRAWINGS

FIGS. 2, 5, 8 and 10 schematically illustrate various modules that may be included within the cue detection module shown in FIG. 1. Although these embodiments are illustrated separately, it will be appreciated that the cue detection module may include any combination of these illustrated modules.

DETAILED DESCRIPTION

I. Overview of Electronic Device Architecture

Figure 1:
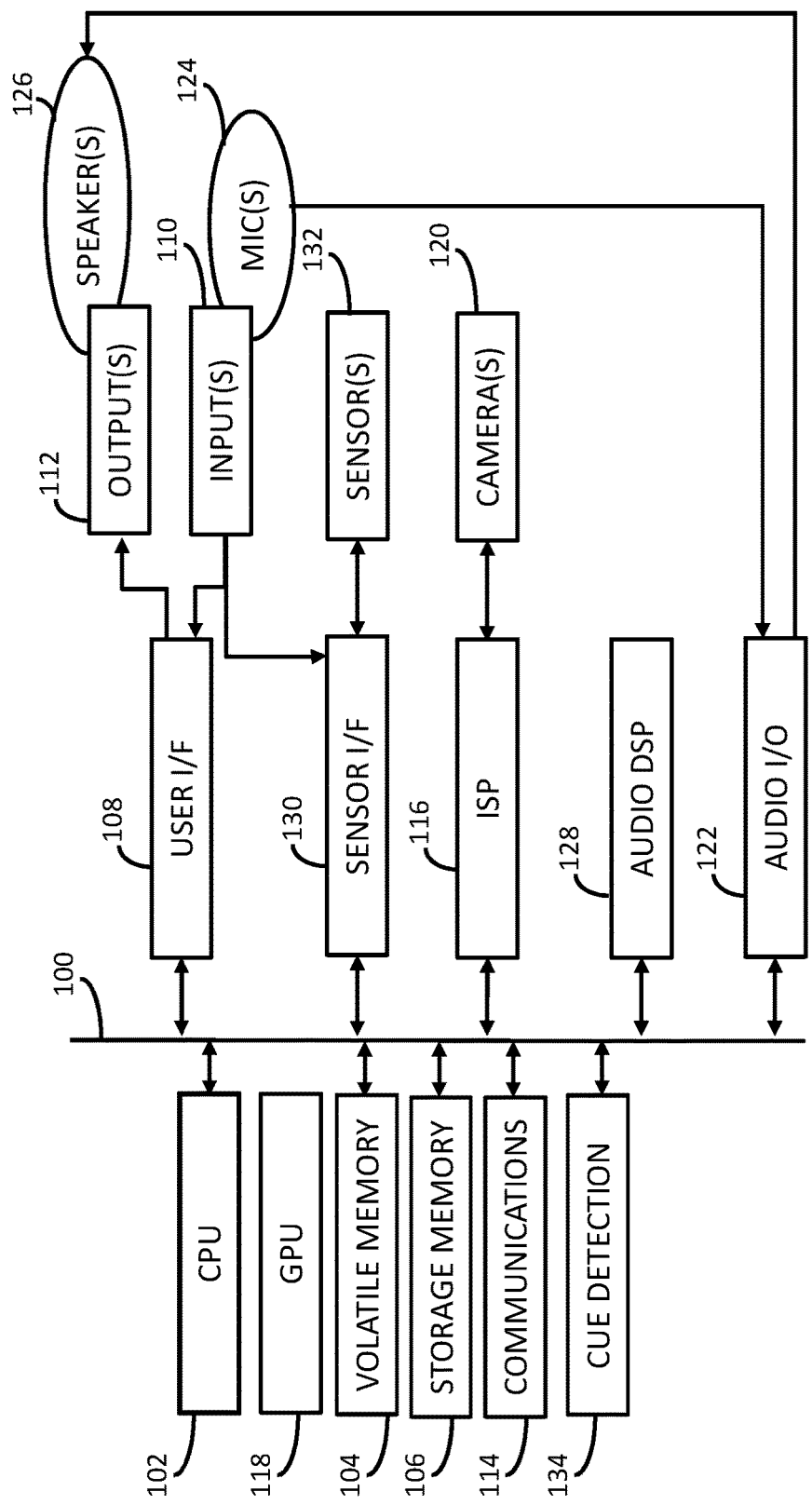
FIG. 1 illustrates a functional block diagram of system for a portable electronic device having a cue detection module, which may be used in connection with low-power audio signal processing.

Referring to FIG. 1, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 1 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, URLs or other identifiers, and the like. A software component can also include any other data or parameter to be provided to application software, a web application, or the like or any combination thereof. Examples of data files include image files, text files, audio files, video files, haptic signature files, user preference files, contact information files (e.g., containing data relating to phone numbers, email addresses, etc.), calendar files (e.g., containing data relating to appointments, meetings, etc.), location files (e.g., containing data relating to current, saved or pinned addresses, geospatial locations, etc.), web browser files (e.g., containing data relating to bookmarks, browsing history, etc.), and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, etc.) may be a physically separate device that is communicatively coupled to the electronic device (e.g., via a communications module 114). Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 1, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110.

The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Generally, and as will be discussed in greater detail below, the cue detection module 134 is configured to process signal(s) generated by an analog/digital interface (e.g., an audio ADC, not shown), the communications module 114, the audio I/O module 122, the audio DSP 128, the sensor interface module 130, one or more sensors 132 (e.g., one or more microphones 124, etc.), or the like or any combination thereof to discern a cue therefrom, with little or no involvement of the CPU 102. By doing so, the CPU 102 is free to carry out other processing tasks, or to enter a low power state which extends the useful battery life of the electronic device.

The cue detection module 134 may include a microprocessor, digital signal processor or other microcontroller, programmable logic device, or any other processor typically consuming less power than the CPU 102 when in an active or working state. Optionally, the cue detection module 134 includes cache or other local memory device (e.g., volatile memory, non-volatile memory or a combination thereof), DMA channels, one or more input buffers, one or more output buffers, and any other component facilitating the functions it supports. Although the cue detection module 134 is illustrated as an individual component, it will be appreciated that the cue detection module 134 may be functionally integrated into one or more other components (e.g., the CPU 102, the user interface module 108, the audio I/O module 122, the audio DSP 128, the sensor interface module 130, or the like or any combination thereof).

Constructed as exemplarily described above, the electronic device may be configured as a portable electronic device that may be carried by the user (e.g., in the user's hand, pants pocket, purse, backpack, gym bag, etc.), worn by the user, or the like or any combination thereof. For example, the electronic device may be embodied as a cellular or mobile phone, a smartphone (e.g., iPhone, offered by Apple; Galaxy, offered by Samsung; Moto X, offered by Motorola), a tablet computer (e.g., the iPad, offered by Apple; the Nexus product-family, offered by Google; the Galaxy product-family, offered by Samsung), a laptop computer, a media player (e.g., an iPod or iPod Nano, offered by Apple), a personal activity tracking device (e.g., the Force, Flex, Zip or One, all offered by Fitbit; the MotoActv, offered by Motorola; the FuelBand, offered by Nike), a smartwatch (e.g., the SmartWatch 2, offered by Sony; the Gear, offered by Samsung; the Toq, offered by Qualcomm), a head-mounted electronic device (e.g., Glass, offered by Google; the M100 or Wrap 1200DX, all offered by Vuzix), or any other portable or wearable electronic device (e.g., any finger-, wrist-, arm-, leg-, torso-, neck-ear-, head-mountable device, etc., of the like often used for providing a user visual, audible, or tactile notifications regarding incoming email, voicemail, text message, appointments, alerts, etc., for providing a user with the current time-of-day, for providing a user with biofeedback, for tracking or monitoring of a user's physiological function or physical activity, for facilitating hand-free communications via telephone, email, text messaging, etc.), or the like or any combination thereof. Generally, the electronic device is provided as a battery-powered electronic device (e.g., containing a rechargeable or replaceable battery). In addition, or alternatively, the electronic device may be powered by one or more solar cells, fuel cells, thermoelectric generators, or the like or any combination thereof.

Depending on the particular configuration of the electronic device, the electronic device may include more or fewer components than those mentioned above with respect to FIG. 1, and may include one or more additional components such as timing sources (e.g., oscillators, phase-locked loops, etc.), peripherals (e.g., counter-timers, real-time timers, power-on reset generators, etc.), audio-based analog/digital interfaces (e.g., an audio ADC, an audio DAC, etc.), voltage regulators; power management modules (e.g., power management integrated circuits (ICs) of the likes manufactured by FREESCALE SEMICONDUCTOR, DIALOG SEMICONDUCTOR, EXAR, MAXIM INTEGRATED PRODUCTS, LINEAR TECHNOLOGY, RENESAS ELECTRONICS, TEXAS INSTRUMENTS, etc.), direct memory access (DMA) controllers, other dedicated DSP or general purpose DSPs (e.g., capable of executing one or more functions provided by one or more items of system software, application software, middleware, etc.), field programmable gate arrays (FPGAs), coprocessors, or the like or any combination thereof. In addition (or as an alternative) to the components mentioned above, the electronic device may include one or more other components such as a speech or voice recognition module (e.g., as provided by SENSORY INC., WOLFSON MICROELECTRONICS PLC., etc.), a song recognition module (e.g., as those by ACOUSTID, AMAZON, AUDIBLE MAGIC, AUDIOID, AXWAVE, GRACENOTE, MELODIS, MICROSOFT, PREDIXIS, LAST.FM, SHAZAM, SOUNDHOUND, etc.), a visual processing unit (VPU) such as the MYRIAD 1 or MYRIAD 2 provided by MOVIDIUS LTD., or the like or any combination thereof. In one embodiment, the electronic device is provided as an evidence-based state machine, a blackboard-based system, or as otherwise described in aforementioned U.S. Pat. No. 8,762,852 or in any of U.S. Pat. Nos. 8,175, 617 and 8,805,110 and U.S. Patent App. Pub. Nos. 2011/0161076, 2012/0134548 and 2013/0324161, each of which is incorporated herein by reference in its entirety. Any of these additional components may be provided as separate components communicatively coupled to a bus (e.g., bus 100), or may be wholly integrated into another component, or may incorporated in a distributed manner across a plurality of components.

Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Any components of the electronic device (or sub-components thereof) may, collectively or individually, be embodied as circuitry that forms part of a larger or distributed system, for example, an IC, a mobile application processor, a system on-chip (SoC) (e.g., such as is available from the Snapdragon product-family offered by Qualcomm), a desktop computer, or any other electronic device or network thereof (e.g., wireless, wired, ad-hoc, Internet, local area network, near-me area network, personal area network, body area network, wireless sensor network, or the like or any combination thereof), or the like or any combination thereof. Moreover, while certain chipset architectures have been explicitly discussed above, it will be appreciated that the discussion is not intended to be limiting and that the embodiments disclosed herein are to be broadly construed to encompass other architectures and many variations thereof.

II. More on the Cue Detection Module

Generally, and as exemplarily described in greater detail below, the cue detection module 134 is configured to discern one or more cues (e.g., from the ambient environment, from data stored within a memory device of the electronic device, etc.) and generate output corresponding to the discerned cue(s). One or more operations, instructions, routines, subroutines, procedures, functions, methods, programs, policies, or the like or any combination thereof (herein each generically referred to as "actions") associated with the electronic device may then be initiated, terminated, executed, modified, enabled, disabled, or otherwise controlled, performed, etc., (e.g., by the CPU 102, the user interface module 108, the communications module 114, the ISP 116, the audio DSP 128, the sensor interface module 130, the power management module, or the like or any combination thereof) based on the discerned cue(s). In one embodiment, such cue-based operation may be performed as discussed in any of aforementioned U.S. Pat. Nos. 8,175, 617, 8,762,852 and 8,805,110 and U.S. Patent App. Pub. Nos. 2011/0161076, 2012/0134548 and 2013/0324161. Thus an otherwise-conventional electronic device can be enabled to function as an "intuitive" or "context-aware" electronic device.

In one embodiment, the cue detection module 134 is configured to discern cues from sound propagating though the ambient aural environment surrounding the electronic device (e.g., as captured by one or more microphones 124, etc.), from audio data received at the electronic device (e.g., via the communications module 114), from audio data stored within the electronic device (e.g., via the volatile memory 104, the storage memory 106, etc.), or the like or any combination thereof. Typically, a cue can be discerned by processing one or more audio signals (e.g., output from an analog/digital interface such as an audio ADC, the audio I/O module 122, the microphone(s) 124, the audio DSP 128, or the like or any combination thereof) or other audio data (each generically, and collectively, referred to herein as "audio input") to detect the presence of audio activity, to discern the type of audio activity present, to discern or estimate the specific audio activity present within the audio input (e.g., as a specific song, a specific utterance, a specific voice, etc.), to detect the presence of a digital audio signal or other audio-based data signal (collectively and generically referred to herein as a "watermark" or "watermark signal") within the audio input, to interpret a detected watermark signal, or the like or any combination thereof.

In view of the above, and depending on the types of "cues" to be discerned, the cue detection module 134 may include one or more sub-components such as an audio activity detector module, a watermark detector module, a watermark decoder module, a song recognition module, a speech recognition module, a voice recognition module, or the like or any combination thereof. If not included in the cue detection module 134, such sub-components may be provided as separate components, or may be functionally integrated within one or more other components such as the CPU 102, the audio DSP 128, the sensor interface module 130, or the like or any combination thereof. In one embodiment, all sub-components of the cue detection module 134 are part of the same electronic device (e.g., a smartphone, a tablet computer, etc.). In another embodiment, however, at least two of sub-components of the cue detection module 134 are part of physically separate electronic devices that are communicatively coupled to one another (e.g., via one or more wired or wireless links across the user's body-area network, a local-area network associated with the user, a wide-area network, the Internet, or the like or any combination thereof).

A. Cue Detection Based on Audio Activity

As used herein, the term "audio activity" refers to noticeable audio signals such as speech, music, sound effects, or other sounds capable of being imperceptibly (or at least substantially imperceptibly) encoded with a digital audio watermark signal. Speech includes conversations, television programming including news broadcasts, movies, vocal music, and so on. Music spans all genres of music played or output by sources, either in the foreground or background. Movies typically include sound effects, which can be considered as a type of audio activity. The lack of noticeable audio activity will herein be considered represent "silence."

i. Detecting Audio Activity

In one embodiment, and with reference to FIG. 2, the cue detection module 134 includes an audio activity detector module 202 configured to process sampled audio input (e.g., by performing one or more audio activity detection processes) to detect the presence of audio activity. Generally, the audio activity detector module 202 includes a microprocessor, digital signal processor (e.g., a fixed-point DSP, floating-point DSP, or a combination thereof) or other microcontroller, programmable logic device, or any other processor typically consuming less power than the CPU 102 when in an active or working state. Optionally, the audio activity detector module 202 includes cache or other local memory device (e.g., volatile memory, non-volatile memory or a combination thereof), DMA channels, one or more input buffers, one or more output buffers, and any other component facilitating the functions it supports. Although the audio activity detection module 202 is illustrated as a part of the cue detection module 134, it will be appreciated that the audio activity detection module 202 may be a part of one or more other components of the electronic device (e.g., the CPU 102, the user interface module 108, the audio I/O module 122, the audio DSP 128, the sensor interface module 130, or the like or any combination thereof).

When activated, the audio activity detector module 202 invokes, launches, or otherwise initiates one or more audio activity detection processes by applying a set of processing stages to each of several segments of audio input. These stages can be configured to re-use operations and avoid unnecessary processing and, where possible, skip a stage where execution of the stage for a previous segment can be re-used, etc. As will be appreciated, these stages can be sequentially or serially executed by the audio activity detector module 202. Serial execution enables stages to be organized into a sequential pipeline of processing stages.

Upon detecting a sufficient level of audio activity, the audio activity detector module 202 generates, as output, a signal or other message or data (e.g., indicating the audio input contains audio activity). The audio activity detector output can thereafter be communicated or otherwise delivered (e.g., via the bus 100) to one or more components of the electronic device (in this context, any such component is also referred to herein as a "target component") via one or more modes of delivery modes such as a "push" (also known as "server push") mode, a "pull" (also known as "client pull") mode, or the like or any combination thereof.

Once delivered to a target component, the audio activity detector output can be published (e.g., to a message queue implemented within an operating system, an application program, middleware, etc.), or otherwise read, copied, stored, altered, uploaded, rendered, used, etc., by system software, application software, middleware (e.g., either alone or in conjunction with one or more computer files, software components, etc.) executable by or accessible to the target component. Thus, in this context, the act of delivering audio activity detector output to a target component can be equivalent to delivering the audio activity detector output to one or more items of software (generically referred to herein as "target software") that publishes, reads, copies, stores, alters, uploads, uses, etc., the audio activity detector output. In one embodiment, delivered audio activity detector output can be rendered to a user of the electronic device via one or more user output devices 112. In another embodiment, delivered audio activity detector output can be provided to a remote database to obtain related metadata or information, to a rights management system, to facilitate an online transaction, etc.

In one embodiment, the audio activity detector 202 is automatically activated (and continually remains activated) whenever the system of the electronic device is in working state (e.g., a global working state such as the G0 state specified by the Advanced Configuration and Power Interface (ACPI), Specification, Rev. 5.0, Errata A, published Nov. 13, 2013, which is incorporated herein by reference in its entirety, etc.), a sleep state (e.g., a global sleeping state such as the S1, S2, S3 or S4 states specified by the ACPI, etc.), a "soft" off state (e.g., such as the G2 or S5 state specified by the ACPI, etc.), or the like or any combination thereof. In another embodiment, the audio activity detector 202 is explicitly activated by the user (e.g., upon receiving one or more instructions or commands from the CPU 102, the user interface module 108, etc., responsive to input received from one or more user input devices 110). In yet another embodiment, the audio activity detector 202 is activated upon receiving one or more instructions or commands via the communications module 114, or may be activated based upon stimuli sensed by one or more sensors 132 (which may or may not include a microphone 124), based on signals, data or other messages generated by or transmitted from the sensor interface module 130, or the like or any combination thereof. In one example, activation of the audio activity detector 202 may be based on stimuli sensed by a light sensor (e.g., activation may occur when a sensed ambient light level only above a threshold level corresponding to ambient light levels present during the day, or in a lit room, etc.). In another example, activation of the audio activity detector 202 may be based on stimuli sensed by an accelerometer, magnetometer, gyroscope, motion sensor, location sensor, or the like or any combination thereof (e.g., activation may occur when the sensed orientation, location, movement, etc., is changing in some predetermined manner indicating that the electronic device is being used or that it's user is active).

In another embodiment, the audio activity detector 202 is automatically activated periodically (e.g., every 1 second, 2 seconds, 3 seconds, 6 seconds, 30 seconds, 60 seconds, etc.) or upon receiving one or more instructions, commands, signals, data or other messages (e.g., generated by or transmitted from CPU 102, the user interface module 108, the ISP 116, the GPU 118, the audio DSP 128, the sensor interface module 130, a sensor 132, etc.). In this case, the audio activity detector 202 may remain activated for a limited amount of time (e.g., for 0.5 seconds, 1 second, 2 seconds, 3 seconds, 6 seconds, 30 seconds, etc.) or otherwise until the output generated therein has been communicated or delivered.

ii. Example Audio Activity Detection Processes

In one embodiment, an audio activity detection process is performed using time-domain metrics such as short-term energy, zero crossing rate (ZCR), etc., in conjunction with machine learning. Co-occurrence statistics may be applied to basic silence metrics, training classifiers may be used on statistics, and the energy content of the audio input may be approximated (e.g., as a sum(max(abs(sample value)))).

In another embodiment, an audio activity detection process is performed by comparing the audio input to one or more noise signatures or other sounds that have been pre-classified (e.g., by a classifier similar to any classifier as described in any of aforementioned U.S. Patent App. Pub. Nos. 2012/0134548 or 2014/0142958) as being likely to have a watermark signal encoded therein (e.g., based on empirical evidence, based on energy content of the sound, or based on location of the electronic device, time of day, day of year, etc., when the sound was captured, etc.). If the comparison indicates that the audio input sufficiently corresponds to a pre-classified sound (e.g., based on some pre-defined similarity metric applied by the audio activity detector module 202), then the audio input can be considered to not represent silence.

In an embodiment in which the audio input includes multiple streams of audio input (e.g., corresponding to sound captured by multiple microphones 124), an audio activity detection process is performed by differencing the multiple input signals. In this embodiment, if the difference signal thus obtained is above a predefined threshold (e.g., applied by the audio activity detector module 202), then the audio input can be considered to not represent silence. Alternatively, a frequency domain analysis (i.e. a spectral analysis) could be employed instead of or in addition to time-domain analysis. For example, a relatively flat spectrum with low energy would indicate silence.

In another embodiment, an audio activity detection process is performed based on the Kullback-Liebler divergence (KLD), or relative entropy, of the audio input. Generally, the KLD is a non-symmetric distance or cost function, and is given by the following:

$$D_{KL}(p\|q) = \sum_{i=0}^{k-1} p(x_i) \log_2 \frac{p(x_i)}{q(x_i)} \qquad (1)$$

In equation (1), $p(x_i)$ is the probability mass function truly describing a random variable $\{X_k\}=(X_0, X_1, \ldots X_{k-1})$ and $q(x_i)$ is a probability mass function modeling the same random variable $\{X_k\}$. Then, $D_{KL}(p\|q)$ is a measure of the information lost in bits if $q(x_i)$ is used to model $p(x_i)$. The KLD is a non-negative number, $D_{KL}(p\|q) \geq 0$, and is zero if and only if $p(x_i)=q(x_i) \forall i$. The KLD is not symmetric since $D_{KL}(p\|q) \neq D_{KL}(q\|p)$.

As will be described in greater detail below, KLD-based audio activity detection processes operate on multiple frames of sampled audio input and assess the extent of divergence in the probability distributions for the frames. KLD-based audio activity detection processes thus quantify the relative change in the structure of the audio input from one frame to another to determine whether the sampled audio input represents audio activity.

iii. KLD-Based Audio Activity Detection

The KLD-based audio activity detection process operates on frames of sampled audio input, which is digitally sampled (e.g., at a sampling rate of 16 kHz), wherein each frame contains the same number of samples (e.g., 2048 samples). It will be appreciated that the audio input may be sampled at a rate greater than or less than 16 kHz. Optionally, the sampled audio input is buffered (e.g., by an input buffer or other memory of the cue detection module 134, the audio I/O module 122, the audio DSP 128, or the like or any combination thereof) before being operated upon. The KLD-based audio activity detection process can process the frames of sampled audio input differently, depending upon whether the KLD-based audio activity detection process is implemented in the frequency-domain or the time-domain.

a. Frequency-Domain Approach to KLD-Based Audio Activity Detection

Figure 3:
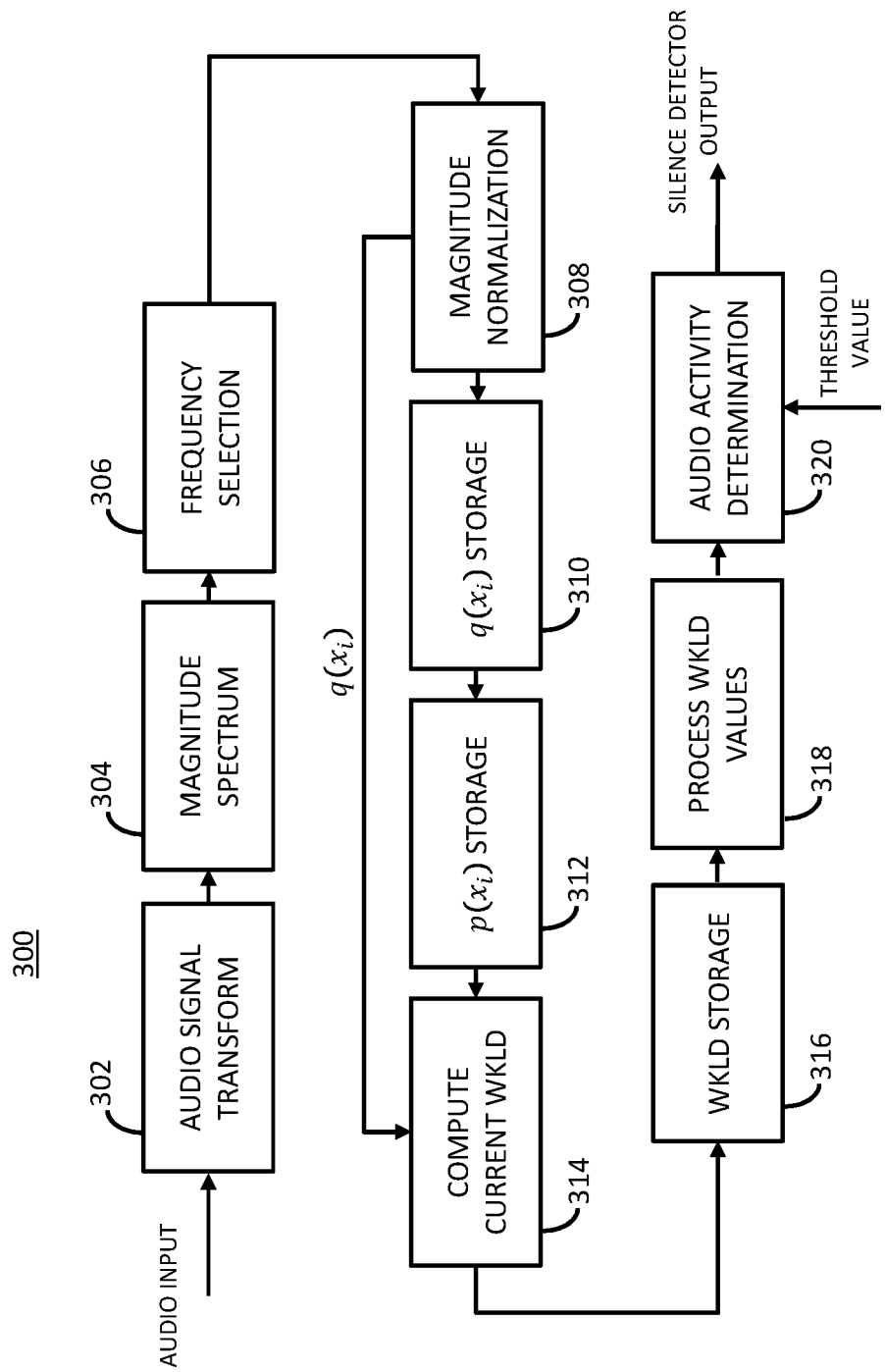
FIGS. 3 and 4 are flow charts illustrating different embodiments of an audio activity detection process.

Referring to FIG. 3, a frequency-domain approach to KLD-based audio activity detection process, such as audio activity detection process 300, involves computing the frequency spectrum of each frame (e.g., by applying an FFT, a DCT, wavelets, etc.) at 302. Thereafter, the magnitude spectrum is computed at 304, and magnitude coefficients within a range of 500 Hz to 6000 Hz (which corresponds to FFT bins 64 to 768) are selected at 306. (The frequency resolution of the magnitude coefficients for a sampling frequency of 16 kHz is 7.8125 Hz.) In general, it was experimentally observed that shifting the frequency range of interest to a frequency range higher than 500 Hz to 6000 Hz (e.g., a range of 1 kHz to 6 kHz or a range of 3 kHz to 7 kHz) resulted in a slight decrease in sensitivity to audio activity (i.e., an increase in the number of times audio input containing audio activity was misclassified as silence). Nevertheless, it will be appreciated that the frequency range may be modified to decrease sensitivity to audio activity (e.g., to conserve power, computational resources, etc.).

For audio activity detection, the occurrence of each frequency bin $(X_0, X_1, \ldots, X_{k-1})$ in the 500 Hz to 6000 Hz range for a given frame of sampled audio input at time $t_n$ is treated as a random process. Thus, the magnitude spectral coefficients for the frequencies of interest are normalized at 308 in order to represent the probability mass function $q(x_i)$ mentioned above with respect to equation (1), where $i=\{0, 1, \ldots, k-1\}$. A minimum value of 1e-9 is added to all selected magnitude coefficients prior to normalization to ensure that none of the coefficients is zero. For a current, $n^{th}$, frame of sampled audio input, the normalization for each coefficient is carried out at 308 by dividing each magnitude coefficient, $M_n(x_i)$, selected at 306 by the sum of all magnitude coefficients for frequencies in the 500 Hz to 6000 Hz range, as shown by the following:

$$q(x_i) = \frac{M_n(x_i)}{\sum_{j=0}^{k-1} M_n(x_j)} \qquad (2)$$

The probability mass function $q(x_i)$ for the current, $n^{th}$, frame is then stored (e.g., in a buffer) at 310. (A previous, $(n-1)^{th}$, frame of audio input, characterized by normalized magnitude spectral coefficients or probability mass function given by $p(x_i)$ for $i=\{0, 1, \ldots, k-1\}$, is stored (e.g., in a buffer) at 312.) Then the KLD between the two probability mass functions is $D_{KL}(p\|q)$ and the KLD represents the loss of information in bits if the probability mass function $q(x_i)$ for the current, $n^{th}$, frame of audio input is used to represent the information contained in the previous, $(n-1)^{th}$, frame of audio input (associated with probability mass function $p(x_i)$). Thus, at 314, the frequency-domain approach to KLD-based audio activity detection modifies the KLD to obtain a weighted KLD (WKLD) value, as shown by the following:

$$WKLD = D_{MKL}(p\|q) = \sum_{i=0}^{k-1} p(x_i) \frac{1}{p(x_i)} \log_2 \frac{p(x_i)}{q(x_i)} = \sum_{i=0}^{k-1} \log_2 \frac{p(x_i)}{q(x_i)} \qquad (3)$$

In view of the above, a "current" WKLD value can be characterized as representing a current, $n^{th}$, frame and previous, $(n-1)^{th}$, frame. (A "previous" WKLD value could thus be characterized as representing, for example, $(n-1)^{th}$ and $(n-2)^{th}$ frames of sampled audio input, etc.) After computing the current WKLD value, the probability mass function $q(x_i)$ associated with the $n^{th}$ frame is set as the probability mass function $p(x_i)$ (i.e., the probability mass function $p(x_i)$ associated with the $(n-1)^{th}$ frame (presently stored, e.g., within a buffer, at 312) is overwritten by the probability mass function $q(x_i)$ associated with the $n^{th}$ frame (presently stored, e.g., within a buffer, at 310)).

Once computed, a WKLD value is stored (e.g., in a buffer) at 316. In one embodiment, the buffer 316 is a first-in-first-out (FIFO) buffer, capable of storing a plurality sequentially-computed WKLD values. Thus, the buffer may store the current WKLD value and a plurality of previously sequentially-computed WKLD values (e.g., 5-50 previous WKLD values, or less than 5 previous WKLD values, or more than 50 previous WKLD values). The stored WKLD values are then processed at 318 (e.g., by taking the mean of the stored WKLD values, the variance of the stored WKLD values, the maximum of the stored WKLD values, etc.) to yield a processed WKLD value. Thus, the processed WKLD value can be characterized as representing a set of frames that are, in turn, represented by the stored WKLD values. Previous WKLD values implicitly include context information for the current WKLD value, and thus processing the WKLD values as discussed above leads to better discrimination between audio activity and silence or background noise.

At 320, the processed WKLD value is interpreted to determine whether or not the set of frames contain at least a threshold level of audio activity. In one embodiment, the interpreting includes comparing the processed WKLD value with a threshold value (e.g., determined through empirical observation, etc.). If the processed WKLD value is less than the threshold value, then the set of frames is determined to represent silence; otherwise, the set of frames is determined to contain a sufficient extent of audio activity.

In view of the above, it will be appreciated that the audio activity detection process 300 can be conceptually divided into many various stages, which can be sequentially or serially executed by the audio activity detector 202. Serial execution enables stages to be organized into a sequential pipeline of processing stages for one or more (possibly buffered) frames of audio input.

Although the audio activity detection process 300 has been described above as operating on sequential frames of sampled audio input (e.g., the $(n-1)^{th}$ frame, the $(n)^{th}$ frame, the $(n+1)^{th}$ frame, the $(n+2)^{th}$ frame, etc.), it will be appreciated that the audio activity detection process 300 may operate on non-sequential frames of sampled audio input (e.g., the stages described above may be applied to every-other frame, etc.). Further, it will be appreciated that the computational efficiency of the audio activity detection process 300 can be enhanced by lowering the sampling frequency (e.g., from 16 kHz to 8 kHz), by shifting the frequency range of interest from 500-6000 Hz to a range of 500-4000 Hz, or the like or any combination thereof.

Parameters of the audio activity detection process 300, such as the frequency range of interest, the number of samples in each frame, the sampling frequency, the number of WKLD values stored at 316, the manner in which the stored WKLD values are processed to obtain the processed WKLD value at 318, the threshold value applied at 320, etc., can be modified to increase or decrease the sensitivity of the audio activity detection process 300. For example, increasing the threshold value at 320 will lead to more frames of sampled audio input classified as silence (decreasing the threshold will lead to more frames being classified as containing audio activity). Decreasing the frequency range of interest (e.g., to obtain a range of 2 kHz to 6 kHz) will lead to more of frames to be classified as silence. Decreasing the number of frames processed at 318 will increase the sensitivity of the audio activity detection process 300 to impulse-type sounds (e.g., a door being slammed shut, a sudden brief burst of white noise or pulse, etc.). Taking the "maximum" instead of "mean" at 318 leads to higher sensitivity to loud instantaneous effects at 320. Further, the latency of the audio activity detection process 300 is linked to the frame period. Other apps on a mobile device could be used to provide additional contextual information. Contextual information such as time of the day, location, environment, power usage, and so on could be used to adjust these parameters and adjust the amount of resources (e.g., in terms of power, computation, memory, etc.) necessary to perform the audio activity detection process 300.

b. More on the WKLD Value

Most real-world audio signals tend to have a concentration of higher-valued magnitude coefficients in the low-frequency regions. That is, unlike a flat white noise spectrum, speech and music signals tend to have a significant portion of their spectral energy concentrated below 3 kHz. WKLD values are used instead of KLD values to prevent the higher-valued low-frequency magnitude coefficients from dominating the final cost function. In this application, we are mainly concerned with the ratio of $p(x_i)$ and $q(x_i)$ (e.g., at every frequency bin of interest). That is, the cumulative uncertainty in bits arising due to the use of $q(x_i)$ instead of $p(x_i)$ is measured—not the expected information loss in bits due to the use of $q(x_i)$ instead of $p(x_i)$. For audio activity detection, use of WKLD values has been found to lead to better discrimination of frames of sampled audio input containing audio activity versus frames containing silence (or even background noise) compared to conventional audio activity detection metrics. Indeed, across a frame of sampled audio input (e.g., $1.28 \times 10^{-1}$ seconds), the statistics of background noise and other typical types of low-level noise do not vary much. Hence WKLD values of background noise in the 500 Hz to 6000 Hz frequency range of interest are typically low. However, WKLD values of speech, music, sound effects, or other such sounds have been found to be considerably higher, as is discussed in greater detail below in the section entitled "Experimental Results."

c. Time-Domain Approach to KLD-Based Audio Activity Detection

Figure 4:
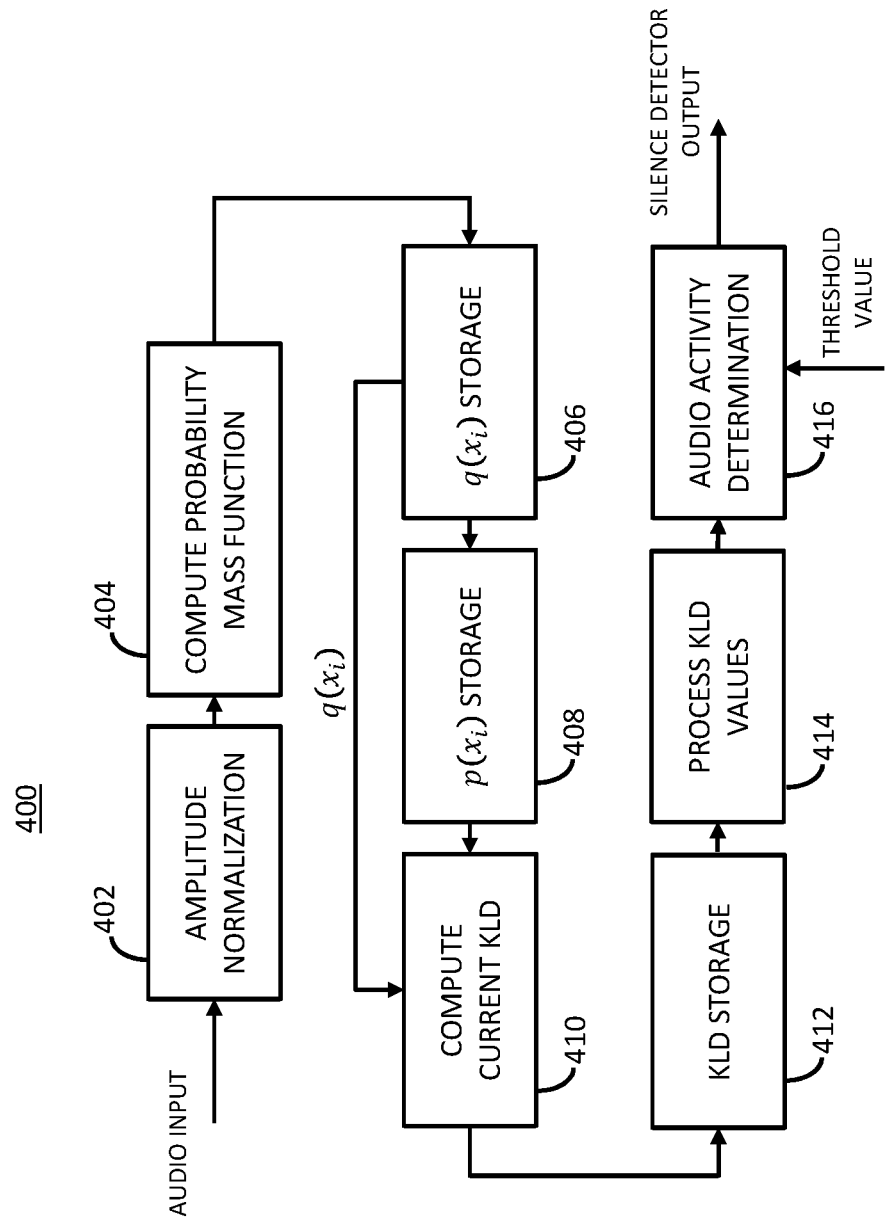

Referring to FIG. 4, a time-domain approach to KLD-based audio activity detection process, such as audio activity detection process 400, involves normalizing the amplitude of the frame of sampled audio input at 402 (e.g., by dividing by the maximum absolute value of the samples in a frame) such that the frame has normalized amplitude values between −1 and +1. The probability mass function of the normalized frame is computed at 404. In one embodiment, the probability mass function is computed by determining histogram data (e.g., data representing a histogram of the amplitudes of the normalized frame). The histogram data is determined using a uniform bin spacing in a range of 0.000001 (or thereabout) to 0.01 (or thereabout) and considers all amplitude values in a range from −1 to +1. For example, a bin spacing of 0.001 (or thereabout) was found to provide a good trade-off between capturing sufficient signal (even in cases of low dynamic range of audio input) and preventing the undesirable influence of quantization noise.

The probability mass function $q(x_i)$ for the current, $n^{th}$, frame is then stored (e.g., in a buffer) at 406. The amplitude values of the samples within the current, $n^{th}$, frame are normalized as shown in equation (2) to obtain the probability mass function. (A previous, $(n-1)^{th}$, frame of normalized audio input, characterized given by $p(x_i)$ for $i=\{0, 1, \ldots, k-1\}$, is stored (e.g., in a buffer) at 408.) Then the KLD between the two probability mass functions is $D_{KL}(p\|q)$ and the KLD represents the loss of information in bits if the probability mass function $q(x_i)$ for the current, $n^{th}$, frame of audio input is used to represent the information contained in the previous, $(n-1)^{th}$, frame of audio input (associated with probability mass function $p(x_i)$). Thus, at 412, the time-domain approach to KLD-based audio activity detection computes the KLD of the current and previous frames at 410 according to Equation (1) above.

In view of the above, a "current" KLD value can be characterized as representing a current, $n^{th}$, frame and previous, $(n-1)^{th}$, frame. (A "previous" KLD value could thus be characterized as representing, for example, $(n-1)^{th}$ and $(n-2)^{th}$ frames of sampled audio input, etc.) After computing the current KLD value, the probability mass function $q(x_i)$ associated with the $n^{th}$ frame is set as the probability mass function $p(x_i)$ (i.e., the probability mass function $p(x_i)$ associated with the $(n-1)^{th}$ frame (presently stored, e.g., within a buffer, at 408) is overwritten by the probability mass function $q(x_i)$ associated with the $n^{th}$ frame (presently stored, e.g., within a buffer, at 406)).

Once computed, a KLD value is stored (e.g., in a buffer) at 412. In one embodiment, the buffer 412 is a first-in-first-out (FIFO) buffer, capable of storing a plurality sequentially-computed KLD values. Thus, the buffer may store the current KLD value and a plurality of previously sequentially-computed KLD values (e.g., 5-50 previous KLD values, or less than 5 previous KLD values, or more than 50 previous KLD values). The stored KLD values are then processed at 414 (e.g., by taking the variance of the stored KLD values) to yield a processed KLD value. Thus, the processed KLD value can be characterized as representing a set of frames that are, in turn, represented by the stored KLD values. Previous KLD values implicitly include context information for the current KLD value, and thus processing the KLD values as discussed above leads to better discrimination between audio activity and silence or background noise.

At 416, the processed KLD value is interpreted to determine whether or not the set of frames contain at least a threshold level of audio activity. In one embodiment, the interpreting includes comparing the processed KLD value with a threshold value (e.g., determined through empirical observation, etc.). If the processed KLD value is less than the threshold value, then the set of frames is determined to represent silence; otherwise, the set of frames is determined to contain a sufficient amount of audio activity.

d. Experimental Results

Conventional metrics used in audio activity detection include short-term energy zero crossing rate (ZCR). In this section, experimental results comparing energy, ZCR with WKLD are presented. A set of six audio signals, each with different levels of audio activity were used for the analysis. The audio signals include: (a) digitally generated silence; (b) white noise; (c) low-level background noise recorded in a room; (d) song encoded with a digital audio watermark signal, captured at 40 db in the same room as (c); (e) a collection of 12 songs and speech signals captured over 17 mins; and (f) the same collection of 12 songs as in (e), and speech signals played at 40 db with pink noise in the background played at 50 db. Without any loss of generality, just the mono versions of these signals are considered for the analysis. These clips were particularly selected to demonstrate the diverse set of conditions the audio activity detector is expected to be subjected to.

Table 1 shows the maximum, minimum, average and variance values of five different metrics for the set of six clips. The metrics include certain energy-based metrics (i.e., average frame energy, maximum frame energy, and sum of absolute frame amplitude) and the aforementioned WKLD metric. The metrics were calculated for frames containing 2048 samples of audio input, obtained by sampling each signal at a sampling frequency of 16 kHz. The energy-based metrics cannot discriminate between silence (or room background noise) and a song captured in the same room at 40 db. The energy-based metrics also tend to confuse low volume white noise with low volume music or speech signals. ZCR was found to have trouble discriminating between room background noise and low-volume music and speech captures. The WKLD metric was much more effective in discriminating the three clips containing audio activity from the three clips containing silence or background noise.

| Audio | Duration | Metric | max | min | mean | variance |
|---|---|---|---|---|---|---|
| Silence | 1 min | Average frame energy | 1.6e−11 | 8.3e−12 | 1.0e−11 | 3e−25 |
| White noise | 1 min | Average frame energy | 2.9e−4 | 2.5e−4 | 2.7e−4 | 5.4e−11 |
| Room background noise | 1 min | Average frame energy | 4e−6 | 9.4e−7 | 1.9e−6 | 2.2e−13 |
| Song captured at 40 db | 1 min | Average frame energy | 1.3e−5 | 5.7e−7 | 5.5e−6 | 5e−12 |
| Music and speech clips captured at 31 db | 17 mins | Average frame energy | 0.0012 | 6.5e−7 | 2.6e−6 | 2.1e−10 |
| Music and speech clips with pink noise at 50 dB (SNR = −10 db) | 14 mins | Average frame energy | 7.2e−4 | 3.8e−5 | 8.1e−5 | 1.7e−9 |
| Silence | 1 min | Max frame energy | 4.1e−10 | 8.3e−11 | 1.3e−10 | 6.6e−22 |
| White noise | 1 min | Max frame energy | 0.0038 | 0.0020 | 0.0026 | 8.7e−8 |
| Room background noise | 1 min | Max frame energy | 4.9e−5 | 8.2e−6 | 1.7e−5 | 2.3e−11 |
| Song captured at 40 db | 1 min | Max frame energy | 2.04e−4 | 4.4e−6 | 6.8e−5 | 9.3e−10 |
| Music and speech clips captured at 31 db | 17 mins | Max frame energy | 0.06 | 5.7e−6 | 3.2e−5 | 4.6e−7 |
| Music and speech clips with pink noise at 50 dB (SNR = −10 db) | 14 mins | Max frame energy | 0.01 | 3.8e−4 | 0.0010 | 2.8e−7 |
| Silence | 1 min | ZCR | 0.80 | 0.73 | 0.76 | 1.1e−4 |
| White noise | 1 min | ZCR | 0.52 | 0.46 | 0.49 | 1.2e−4 |
| Room background noise | 1 min | ZCR | 0.13 | 0.04 | 0.07 | 1.7e−4 |
| Song captured at 40 db | 1 min | ZCR | 0.35 | 0.05 | 0.17 | 0.0026 |
| Music and speech clips captured at 31 db | 17 mins | ZCR | 0.60 | 0.02 | 0.06 | 0.0011 |
| Music and speech clips with pink noise at 50 dB (SNR = −10 db) | 14 mins | ZCR | 0.51 | 0.07 | 0.22 | 0.0011 |
| Silence | 1 min | Sum of absolute frame amplitude | 2.7e−6 | 2.3e−6 | 2.5e−6 | 5.1e−15 |

-continued

| Audio | Duration | Metric | max | min | mean | variance |
|---|---|---|---|---|---|---|
| White noise | 1 min | Sum of absolute frame amplitude | 0.0138 | 0.0126 | 0.01 | 4.1e−8 |
| Room background noise | 1 min | Sum of absolute frame amplitude | 0.0016 | 8e−4 | 0.0011 | 1.9e−8 |
| Song captured at 40 db | 1 min | Sum of absolute frame amplitude | 0.0029 | 6.1e−4 | 0.0018 | 1.6e−7 |
| Music and speech clips captured at 31 db | 17 mins | Sum of absolute frame amplitude | 0.02 | 6.6e−4 | 0.0012 | 1.4e−7 |
| Music and speech clips with pink noise at 50 dB (SNR = −10 db) | 14 mins | Sum of absolute frame amplitude | 0.02 | 0.005 | 0.0070 | 2.3e−6 |
| Silence | 1 min | WKLD | 60.99 | 0.18 | 17.26 | 164.60 |
| White noise | 1 min | WKLD | 45.29 | 0.05 | 11.84 | 78.67 |
| Room background noise | 1 min | WKLD | 121.21 | 0.06 | 17.40 | 171.30 |
| Song captured at 40 db | 1 min | Weighted KLD | 297.86 | 0.06 | 66.04 | 2.9e+3 |
| Music and speech clips captured at 31 db | 17 mins | Weighted KLD | 564.77 | 0.02 | 36.45 | 2.03e+3 |
| Music and speech clips with pink noise at 50 dB (SNR = −10 db) | 14 mins | Weighted KLD | 270.56 | 0.0014 | 33.35 | 1.1e+3 | iv. Detecting Audio Activity Type

Upon detecting one or more types of audio activity present in the audio input, the audio activity detector module 202 can generate, as output, a signal or other message or data indicating the type of audio activity present in the audio input. The audio activity detector output can thereafter be communicated or otherwise delivered (e.g., via the bus 100) to one or more target components of the electronic device. In one embodiment, the type of audio activity present in the audio input can be determined by classifying, analyzing or otherwise processing the audio input in any suitable manner (e.g., as described in any of aforementioned U.S. Patent App. Pub. Nos. 2012/0134548 or 2014/0142958). Once delivered to a target component, the audio activity detector output can be published (e.g., to a message queue implemented within an operating system, an application program, middleware, etc.), or otherwise used by system software, application software, middleware (e.g., either alone or in conjunction with one or more computer files, software components, etc.) executable by or accessible to the target component.

B. Cue Detection Based on Watermark Detection

Digital audio watermarks and other audio-based data signals, methods of encoding such watermark signals in a host audio signal, and methods of detecting encoded audio watermark signals are disclosed in U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, U.S. Patent App. Pub. Nos. 2012/0214544, 2014/0108020 and 2014/0142958, each of which is incorporated herein by reference in its entirety, and in aforementioned U.S. patent application Ser. No. 14/270,163 and U.S. Provisional App. No. 62/034,340 (and its non-provisional counterpart, Ser. No. 14/821,435). Such digital audio watermark signals are generally encoded into the host audio signal so as to be imperceptible (or at least substantially imperceptible) to people, yet capable of being reliably detected via ambient detection.

In one embodiment, a watermark signal can be conveyed as a so-called "single-bit" watermark signal may convey a plural-bit "message" or "payload," which is constructed according to a watermark protocol. In one embodiment, the watermark protocol is extensible or variable (meaning that different watermark protocols can be used to construct the same watermark signal). The watermark protocol may be conveyed by the watermark signal as a version identifier within the payload or may be conveyed as one or more attributes (e.g., as a carrier signal, synchronization signal, etc.) associated with the watermark signal. In one embodiment, the version is conveyed by the watermark signal as a version identifier represented by a plural-bit Hadamard sequence, wherein each bit in the sequence (also referred to herein as a "version bit") is repeated at a plurality of known frequencies. Accordingly, the version identifier may be repeated at i×j frequency locations, where i represents the number of version bits in the Hadamard sequence and j represents the number of frequencies to which each version bit is mapped. By conveying the watermark protocol, watermark detection processes can be adapted to quickly discern the protocol and adapt subsequent detection or decoding operations accordingly. Additional information concerning version identifiers and watermark protocols can be found in aforementioned U.S. Pat. Nos. 7,020,304 and 7,412,072.

Generally, however, a watermark protocol specifies data formatting, such as how data symbols are arranged into message fields, and how message fields are packaged into message packets. It also specifies how watermark signal elements are mapped to corresponding elements of a host audio signal. This mapping may include a scattering or scrambling function that scatters or scrambles the watermark signal elements among host signal elements. The mapping specified by a watermark protocol can be a one-to-many or a one-to-one mapping of each encoded element. For example, when used in conjunction with modulating an encoded element onto a carrier with several elements (e.g., chips) the mapping is one-to-many, as the resulting modulated carrier elements map the encoded audio watermark signal to several host signal elements. As used herein, a "tile" is a complete watermark message or payload that has been mapped to a block of audio signal, and "tiling" is a method of repeating the complete watermark message or payload in adjacent blocks of audio. As such, each audio block carries a watermark tile, and the size of a watermark tile (also referred to as a "tile size" of a watermark tile) corresponds to the minimum duration of an audio block required to carry a complete watermark tile. The autocorrelation of a tiled watermark signal reveals peaks attributable to the repetition of the watermark. Peak spacing indicates a time scale of the watermark signal, which can be used to compensate for time scale changes as appropriate in detecting additional watermark data.

The watermark protocol also defines roles of symbols, fields or other groupings of symbols. These roles include functions like error detection, variable data carrying, fixed data carrying (or simply a fixed pattern), synchronization, version control or identification, format identification, error correction, delivery control, or the like or any combination thereof. Certain symbols can be used for more than one role. For example, certain fixed bits can be used for error checking and synchronization. As used herein, a "message symbol" generally includes binary and M-ary signaling. A binary symbol, for example, may simply be on/off, 1/0, +/−, any of a variety of ways of conveying two states. M-ary signaling conveys more than two states (M states) per symbol.

The watermark protocol also defines whether and to what extent there are different watermark types and layering of watermarks. Further, certain watermarks may not require the concept of being a symbol, as they may simply be a dedicated signal used to convey a particular state, or to perform a dedicated function, like synchronization. The watermark protocol also identifies which cryptographic constructs are to be used to decode the resultant message payload, if any. This may include, for example, identifying a public key to decrypt the payload. This may also include a link or reference to or identification of Broadcast Encryption Constructs.

The watermark protocol also specifies signal communication techniques employed, such as a type of data modulation to encode data using a signal carrier. One such example is direct sequence spread spectrum (DSSS) where a pseudo random carrier is modulated with data. There are a variety of other types of modulation, phase modulation, phase shift keying, frequency modulation, etc. that can be applied to generate a watermark signal to be encoded into a host audio signal.

After the message is converted into an encodable watermark signal, it is comprised of an array of signal elements. Each element may convey one or more states. The nexus between protocol and type of watermark signal to be encoded is that the watermark protocol defines what these signal elements are, and also how they are mapped to corresponding audio features. The mapping of the watermark signal to features defines the structure of the digital audio in the feature space. This feature space for encoding may be different than the feature space in which the signal elements and structure of the encoded audio watermark signal are detected.

i. Detecting Encoded Audio Watermark Signals

In one embodiment, and with reference to FIG. 5, the cue detection module 134 includes a watermark detector module 502 configured to process sampled audio input (e.g., by performing one or more watermark detection processes) to detect the presence of a watermark signal within the audio input. Generally, the watermark detector module 502 includes a microprocessor, digital signal processor (e.g., a fixed-point DSP, floating-point DSP, or a combination thereof) or other microcontroller, programmable logic device, or any other processor typically consuming less power than the CPU 102 when in an active or working state. Optionally, the watermark detector module 502 includes cache or other local memory device (e.g., volatile memory, non-volatile memory or a combination thereof), DMA channels, one or more input buffers, one or more output buffers, and any other component facilitating the functions it supports.

The watermark detector module 502 and the audio activity module 202 may be at least partially implemented on shared, common hardware components, or may be fully implemented on completely separate hardware components. Further, although the watermark detector module 502 is illustrated as a part of the cue detection module 134, it will be appreciated that the watermark detector module 502 may be a part of one or more other components of the electronic device (e.g., the CPU 102, the user interface module 108, the audio I/O module 122, the audio DSP 128, the sensor interface module 130, or the like or any combination thereof). In one embodiment, the watermark detector module 502 and the audio activity module 202 are part of the same electronic device. In another embodiment, however, the audio activity module 202 is part of one electronic device (e.g., a first electronic device) and the watermark detector module 502 is part of another electronic device (e.g., a second electronic device) that is physically separate from the first device but communicatively coupled to the first electronic device (e.g., via one or more wired or wireless links as discussed above). In this embodiment, the first electronic device may be any of the aforementioned portable electronic devices, and the second electronic device may also be any of the aforementioned portable electronic devices or may be a desktop computer, a server (e.g., an application server, a cloud server, a base-station server such as the Radio Applications Cloud Server (RACS) offered by Nokia, or the like or any combination thereof), or the like or any combination thereof.

When activated, the watermark detector module 502 invokes, launches, or otherwise initiates a watermark detection process by applying a set of processing stages to each of several segments of audio input. The stages can be configured to re-use operations and avoid unnecessary processing and, where possible, skip a stage where execution of the stage for a previous segment can be re-used, etc. As will be appreciated, these stages can be sequentially or serially executed by the watermark detector module 502. Serial execution enables stages to be organized into a sequential pipeline of processing stages. Nevertheless, at least some of the stages can be executed in parallel, as will be described in greater detail below.

Upon detecting the presence of an audio watermark signal, the watermark detector module 502 generates, as output, a signal or other message or data (e.g., indicating that an encoded audio watermark signal has been detected). The watermark detector output can thereafter be communicated or otherwise delivered (e.g., via the bus 100) to one or more target components of the electronic device via one or more modes of delivery modes such as a push mode, a pull mode, or the like or any combination thereof.

Once delivered to a target component, the watermark detector output can be published (e.g., to a message queue implemented within an operating system, an application program, middleware, etc.), or otherwise read, copied, stored, altered, uploaded, used, etc., by system software, application software, middleware (e.g., either alone or in conjunction with one or more computer files, software components, etc.) executable by or accessible to the target component. Thus, in this context, the act of delivering watermark detector output to a target component can be equivalent to delivering the watermark detector output to one or more items of software (generically referred to herein as "target software") that publishes, reads, copies, stores, alters, uploads, uses, etc., the watermark detector output. In one embodiment, delivered watermark detector output can be rendered to a user of the electronic device via one or more user output devices 112. In another embodiment, delivered watermark detector output can be provided to a remote database to obtain related metadata or information, to a rights management system, to facilitate an online transaction, etc.

In some embodiments, the watermark detector module 502 is activated either automatically or manually, continuously or periodically, in a manner as similarly described with respect to the audio activity detector module 202. In another embodiment, the watermark detector module 502 is activated automatically whenever the audio activity detector 202 is activated. In yet another embodiment, the watermark detector module 502 is activated automatically whenever audio activity detector output is communicated or delivered. In this case, the watermark detector module 502 can be communicatively coupled to the output of the audio activity detector module or otherwise be configured to receive audio activity detector output.

Figure 6:
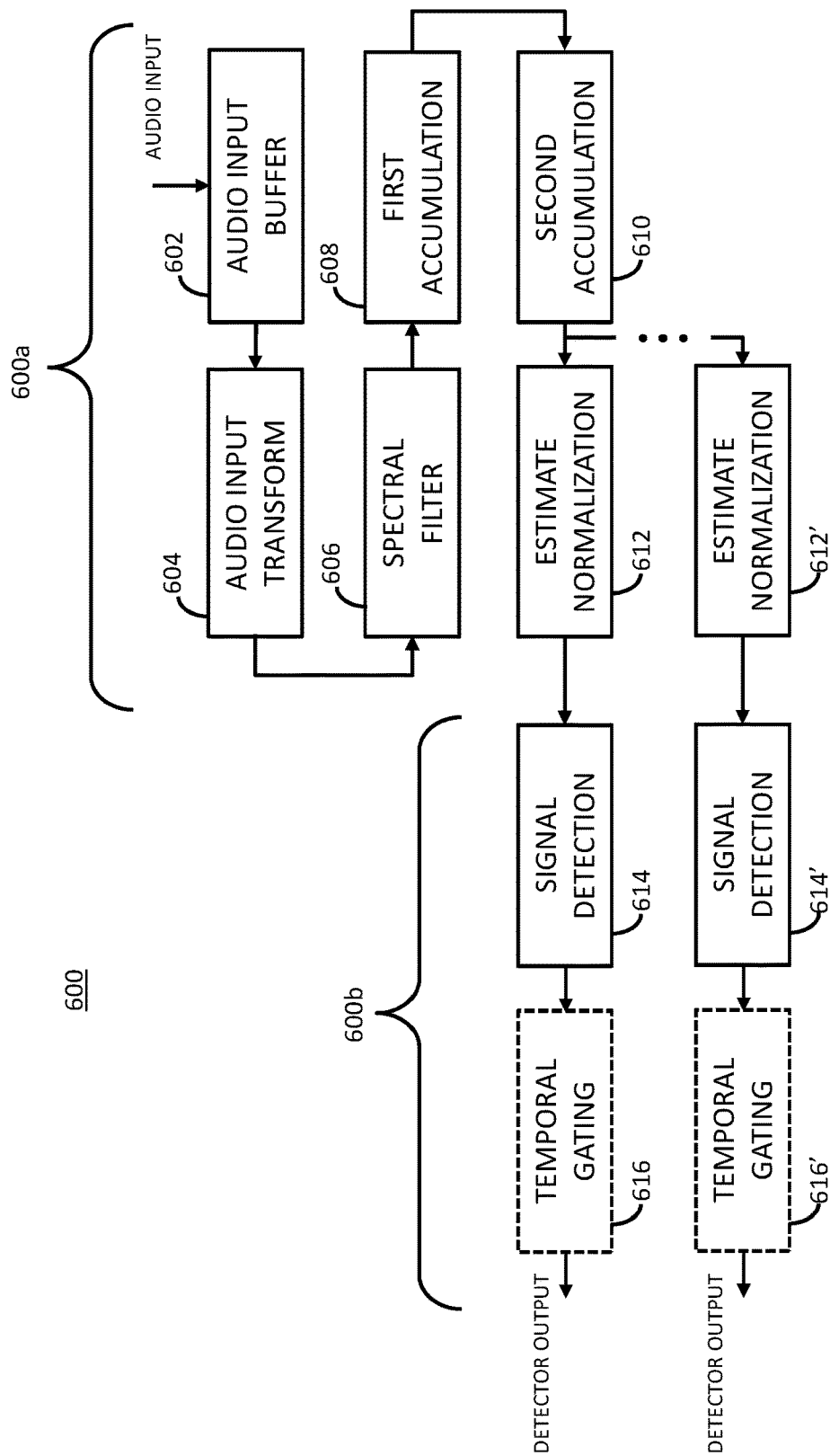
FIG. 6 is a flow chart illustrating one embodiment of a watermark detection process.

An exemplary watermark detection process is described in greater detail with respect to FIG. 6. Specifically, FIG. 6 illustrates a watermark detection process 600 for detecting a frequency-domain audio watermark signal employing an adjacent-frame, reversed embedding modulation scheme, such as that exemplarily described in aforementioned U.S. Patent App. Pub. No. 2014/0142958. It will be appreciated that the techniques described herein may be adapted to detect other types watermark signals employing any suitable or beneficial modulation scheme. Generally, the watermark detection process 600 operates on audio input, which is digitally sampled. In one example scenario, the audio input may be sampled at a sampling rate of 16 kHz. It will be appreciated that the audio input may be sampled at a rate greater than or less than 16 kHz. Optionally, the sampled audio input is buffered (e.g., by an input buffer or other memory of the cue detection module 134, the audio I/O module 122, the audio DSP 128, or the like or any combination thereof) before being operated upon by the watermark detection process 600.

a. Audio Input Buffering Stage

At 602, sequentially-sampled portions of the audio input are stored within an audio input buffer (e.g., an input buffer or other memory of the watermark detector module 502, the cue detection module 134, the audio I/O module 122, the audio DSP 128, or the like or any combination thereof). In one embodiment, the sequentially-sampled portions of the audio input are obtained as part of the any of the aforementioned audio activity detection processes. Generally, the number of samples in the audio input buffer corresponds to the minimum duration of an audio block required to carry a complete watermark tile that is (or that might be) embedded within the audio input. For example, and continuing with the sampling rate given in the example scenario given above, the audio input buffer can contain at least 2048 sequentially-sampled portions of the audio input, such samples spanning a duration of at least about 128 ms.

b. Audio Input Transform Stage

At stage 604, a group of sequentially-sampled portions of audio input (also referred to herein as a "frame" of audio input, or an "audio input frame") is transformed from the temporal domain into another domain (e.g., the frequency domain). Generally, the number of samples constituting an audio input frame corresponds to the minimum duration of an audio block required to carry a complete watermark tile that is (or that might be) embedded within the audio input. For example, and to continue with the example scenario given above, a frame of audio input could contain 2048 (or thereabout) samples of audio input.

A frame of sampled audio input may be transformed by computing the frequency spectrum of the frame (e.g., computing the entire frequency spectrum of the frame by applying an FFT, a DCT, wavelets, etc., to the frame) at 302. Once obtained, the transformed frame of sampled audio input is output to a subsequent stage (e.g., the spectral filter stage 606) as a multi-element data structure such as a multi-element vector, wherein each element contains a spectral magnitude of an FFT bin associated with the FFT applied to the audio input frame. Such a multi-element data structure is also referred to herein as a frame of spectral magnitudes or a "spectral magnitude frame." For example, a 2048-sample audio input frame can be transformed by applying a 1024-point FFT thereto, yielding a 1024-element data structure (i.e., a spectral magnitude frame) representing spectral magnitudes for 1024 frequency bins. Frames of audio input may be transformed at any suitable or desired or rate. In one embodiment, frames of audio input may be transformed at a rate that corresponds to a multiple of the sampling rate of the audio input. For example, and to continue with the example scenario given above, a frame of audio input can be transformed every 32 ms, or thereabout.

Figure 7A:
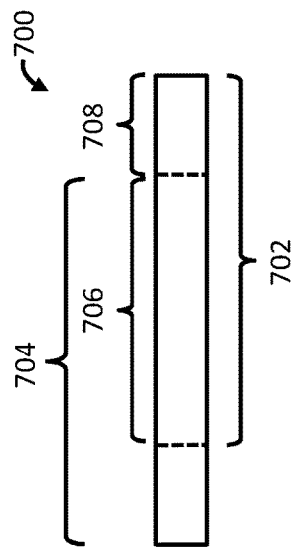
FIGS. 7A, 7B, 7C and 7D conceptually illustrate various data structures described in connection with the watermark detection process illustrated in FIG. 6.

After transforming one audio input frame (e.g., a first audio input frame), a new audio input frame (e.g., a second audio input frame) can be transformed. In one embodiment, the second audio input frame contains at least one audio input sample that was in the first audio input frame. For example, and with reference to FIG. 7A, a block 700 can conceptually represent the temporal extent of a series of sequentially-sampled portions of audio input, wherein samples at left-hand side of block 700 are relatively newer than samples at the right-hand side of block 700. After transforming a first audio input frame (e.g., containing audio input samples having a relatively older temporal extent represented by block 702), a second audio input frame (e.g., containing audio input samples having a relatively recent temporal extent represented by block 704) is transformed. The number of audio input samples that the first and second audio input frames share in common is represented by the horizontal extent of block 706. Overlap can be increased to improve robustness of watermark detection. The number of audio input samples shared between the first and second audio input frames is in a range from one-eighth to seven-eighths of the number of audio input samples in any of the audio input frames. In one embodiment, the number of audio input samples shared between the first and second audio input frames is in a range from one-quarter to three-quarters of the number of audio input samples in any of the audio input frames. In another embodiment, the number of audio input samples shared between the first and second audio input frames is one-half of the number of audio input samples in any of the audio input frames. After an audio input frame has been transformed, any audio input samples not included in the next audio input frame can be overwritten within, or otherwise cleared from, the audio input buffer. For example, after the first audio input frame 702 has been transformed, audio input samples corresponding to block 708 may be overwritten within, or otherwise cleared from, the audio input buffer.

Optionally, the sampled audio input may be filtered prior to being transformed (e.g., using one or more filters such as a high pass filter, a differentiator filter, a non-linear filter, a linear prediction residual filter, or the like or any combination thereof).

c. Spectral Filter Stage

At 606, one or more filtering operations can be performed on the spectral magnitude frames obtained at the transform stage 604 to emphasize the watermark signal or de-emphasize the remainder of the audio input frame. Selection of the particular type of spectral filter(s) to apply is based on the type of watermark signal that is, or may be, encoded into the audio input. Examples of filters that may be used during the spectral filtering are exemplarily described in aforementioned U.S. Patent App. Pub. No. 2014/0142958. In one embodiment, filtering is accomplished by first storing spectral magnitudes computed for a plurality of spectral magnitude frames (e.g., in a filter buffer, which may be provided as an input buffer or other memory of the watermark detector module 502, watermark decoder module 802, the cue detection module 134, the audio I/O module 122, the audio DSP 128, or the like or any combination thereof) and then applying a filtering operation (e.g., a non-linear filtering operation) to the stored spectral magnitudes, thereby producing a filtered frame of spectral magnitudes (also referred to herein as a filtered spectral magnitude frame).

Generally, the filter buffer is provided as a FIFO buffer, wherein elements of the FIFO buffer are organized into x sets of buffer elements, where x is any integer greater than 1. In one embodiment, x is in a range from 3 to 11. In another embodiment, x is in a range from 5 to 9. In yet another embodiment, x is 7. Notwithstanding the foregoing, it will be appreciated that x may be greater than 11. Each set of buffer elements is configured to store spectral magnitudes computed for each frame of transformed audio input output from stage 604. Within a set of buffer elements, each buffer element is configured to store only a single spectral magnitude computed for a frame of transformed audio input. Thus, the filter buffer stores x sets of spectral magnitudes for the last x spectral magnitude frames. The filter buffer can also be conceptually likened to a two-dimensional matrix, wherein elements of the matrix correspond to spectral magnitudes corresponding to frequency bin (in the vertical dimension) and time (in the horizontal dimension). When the filter buffer is full, each new set of spectral magnitudes for a spectral magnitude frame obtained from the transform stage 604 replaces the oldest stored spectral magnitude frame.

Figure 7B:
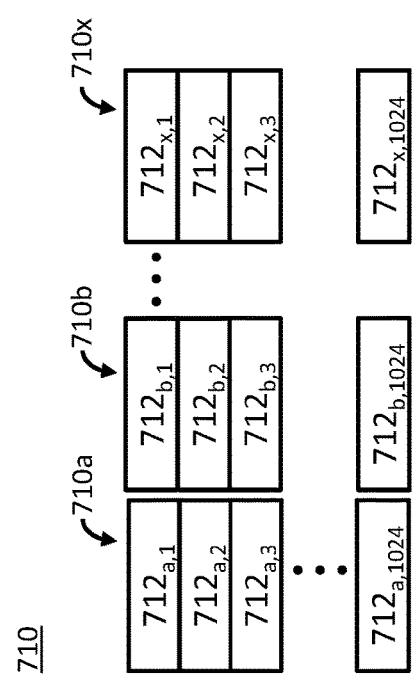

For example, and with reference to FIG. 7B, the filter buffer can be provided as a filter buffer 710 having x sets of buffer elements (e.g., a first set of buffer elements 710$a$, a second set of buffer elements 710$b$, etc., and an $x^{th}$ set of buffer elements 710$x$). Assuming each spectral magnitude frame obtained from stage 604 contains 1024 spectral magnitude values, then each set of buffer elements would also contain 1024 buffer elements (e.g., the first set of buffer elements 710$a$ would contain a corresponding 1024 buffer elements, $712_{a,1}$, $712_{a,2}$, . . . $712_{a,1024}$). A first frame of spectral magnitudes obtained from stage 604 may be stored in the first set of buffer elements 710$a$, a second frame of spectral magnitudes obtained from stage 604 may be stored in the second set of buffer elements 710$b$, and so on. After a $x^{th}$ frame of spectral magnitudes obtained from stage 604 is stored in the $x^{th}$ set of buffer elements 710$x$, an $x+1^{th}$ frame of spectral magnitudes obtained from 604 is stored in the first set of buffer elements 710$a$, an $x+2^{th}$ frame of spectral magnitudes obtained from stage 604 is stored in the second set of buffer elements 710$b$, and so on.

Once spectral magnitudes for a plurality of spectral magnitude frames are stored within the filter buffer, a filtering operation can be performed. In one embodiment, the filtering operates on each spectral magnitude of a stored spectral magnitude frame: e.g., for an identified spectral magnitude within an identified spectral magnitude frame, a 2-dimensional window spanning a plurality of stored spectral magnitudes in the frequency and time dimensions is defined. Generally, the identified spectral magnitude will be included within the window. Values of the stored spectral magnitudes within this window are aggregated (e.g., averaged) and the difference between this aggregate value and the identified spectral magnitude is taken as a filtered spectral magnitude. This filtering operation can be performed when two, three, etc., or even x frames of spectral magnitudes are stored within the filter buffer. After spectral magnitudes for an older frame of spectral magnitudes have been filtered, the filtering operation may be performed on a newer frame of spectral magnitudes.

Filtered frames of spectral magnitudes may be produced at any suitable or desired or rate. In one embodiment, filtered frames of spectral magnitudes are produced at a rate that corresponds to the rate with which audio input frames are transformed at 604. For example, and to continue with the example scenario given above, a filtered frame of spectral magnitudes can be produced every 32 ms, or thereabout. Generally, the filter buffer 710 requires only modest memory resources (e.g., 4 kB, or thereabout, is typically required to store a single frame of spectral magnitudes). However, the spectral filter stage 606 can be omitted. If the spectral filter stage 606 is omitted, the memory requirements for the watermark detection process 600 will be reduced, but doing so can also cause in robustness during a subsequent decoding stage.

d. First Accumulation Stage

Frames of, optionally filtered, spectral magnitudes are accumulated (e.g., summed) at stage 608, as estimates of an embedded watermark signal, according to a first accumulation process. Spectral magnitude frames accumulated according to the first accumulation process are stored in a first accumulation buffer (e.g., an input buffer or other memory of the watermark detector module 502, watermark decoder module 802, the cue detection module 134, the audio I/O module 122, the audio DSP 128, or the like or any combination thereof). Generally, the first accumulation buffer is provided as a FIFO buffer, wherein elements of the FIFO buffer are organized into y sets of buffer elements, where y is any integer greater than 1. In one embodiment, y is in a range from 3 to 24. In another embodiment, y is in a range from 6 to 18. In yet another embodiment, y is 6, 9 or 12. Notwithstanding the foregoing, it will be appreciated that y may be greater than 24. Generally, the number of buffer elements in each set of buffer elements can be in a range from 2 to 2048 (e.g., 2, 3, 4, 5, 8, 10, 16, 25, 32, 50, 64, 75, 100, 128, 256, 512, 1024, etc.). For purposes of facilitating discussion, examples provided below will be based on a scenario in which each set of buffer elements includes only 4 buffer elements.

Figure 7C:
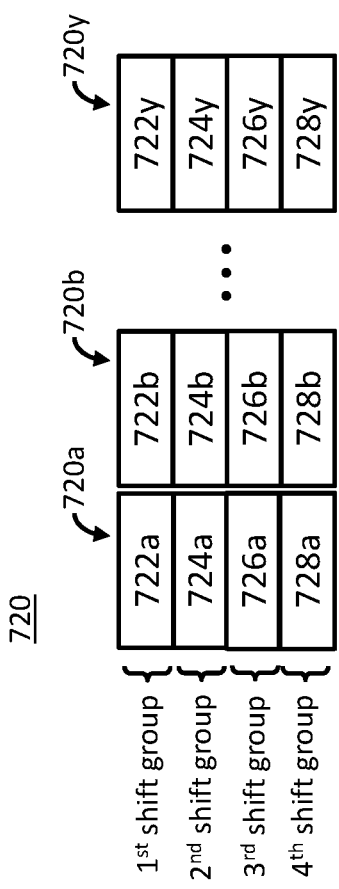

According to the first accumulation process, a set of spectral magnitude frames (e.g., as sequentially output from stage 604 or 606) is accumulated within each set of buffer elements of the first accumulation buffer. Generally, the number of spectral magnitude frames in a set of spectral magnitude frames corresponds to the minimum duration of an audio block required to carry a complete watermark tile that is (or that might be) embedded within the audio input. Thus, to continue with the example scenario given above, a set of spectral magnitude frames can include 32 spectral magnitude frames (e.g., as sequentially output from stage 604 or 606). For a set of buffer elements, however, the first accumulation process proceeds by accumulating a sub-set of non-sequential spectral magnitude frames (e.g., 8 non-sequential spectral magnitude frames) within each buffer element. For example, and with reference to FIG. 7C, the first accumulation buffer can be provided as an first accumulation buffer 720 having y sets of buffer elements (e.g., a first set of buffer elements 720*a*, a second set of buffer elements 720*b*, etc., and a y$^{th}$ set of buffer elements 720*y*). Each set of buffer elements includes four buffer elements (e.g., the first set of buffer elements 720*a* contains a first buffer element 722*a*, a second buffer element 724*a*, a third buffer element 726*a* and a fourth buffer element 728*a*, and so on). Assuming the first accumulation buffer 720 is empty, the first accumulation process is initially performed by storing a first frame of spectral magnitudes output from stage 604 (or stage 606) in the first buffer element 722*a*, storing a second frame of spectral magnitudes output from stage 604 (or stage 606) in the second buffer element 724*a*, storing a third frame of spectral magnitudes output from stage 604 (or stage 606) in the third buffer element 726*a* and storing a fourth frame of spectral magnitudes output from stage 604 (or stage 606) in the fourth buffer element 728*a*. Thereafter, a fifth frame of spectral magnitudes output from stage 604 (or stage 606) is accumulated in the first buffer element 722*a*, a sixth frame of spectral magnitudes output from stage 604 (or stage 606) is accumulated in the second buffer element 722*b*, and so on. Accordingly, the 1$^{st}$, 5$^{th}$, 9$^{th}$, 13$^{th}$, ... and 29$^{th}$ spectral magnitude frames in a first set of spectral magnitude frames output from stage 604 (or 606) can be accumulated in the first buffer element 722*a* of the first set of buffer elements 720*a*, the 2$^{nd}$, 6$^{th}$, 10$^{th}$, 14$^{th}$, ... and 30$^{th}$ spectral magnitude frames in the first set of spectral magnitude frames can be accumulated in the second buffer element 724*a*, the 3$^{rd}$, 7$^{th}$, 11$^{th}$, 15$^{th}$, ... and 31$^{st}$ spectral magnitude frames in the first set of spectral magnitude frames can be accumulated in the third buffer element 726*a* and the 4$^{th}$, 8$^{th}$, 12$^{th}$, 16$^{th}$, ... and 32$^{nd}$ spectral magnitude frames in the first set of spectral magnitude frames can be accumulated in the fourth buffer element 728*a*. According to the example scenario outlined above, the first accumulation process accumulates 8 spectral magnitudes within a single buffer element, which enables the watermark detection process 600 to detect the alignment of a watermark tile at a temporal resolution of 32 ms (or thereabout). It will be appreciated, however, that buffer elements within a set can accumulate more or fewer than 8 spectral magnitude frames, and that the number of buffer elements within a set of buffer elements can be adjusted in correspondence with the number of spectral magnitude frames accumulated in each buffer element. Thus, it may be theoretically possible to detect the alignment of a watermark tile at a temporal resolution at a temporal resolution as small as 0.0625 ms (assuming that audio input is sampled at a sampling rate of 16 kHz).

After one set of spectral magnitude frames has been accumulated within a set of buffer elements, another set of spectral magnitude frames can be accumulated (e.g., as described above) within another set of buffer elements. For example, after the first set of spectral magnitude frames has been accumulated within the first set of buffer elements 720*a* as discussed above, a second set of spectral magnitude frames can be similarly accumulated within the second set of buffer elements 720*b* (i.e., the 1$^{st}$, 5$^{th}$, 9$^{th}$, 13$^{th}$, ... and 29$^{th}$ spectral magnitude frames in the second set of spectral magnitude frames output from stage 604 (or 606) can be accumulated in the first buffer element 724*a* of the second set of buffer elements 720*b*, etc.). In one embodiment, the spectral magnitude frames in temporally-adjacent sets of spectral magnitude frames are sequentially output from stage 604 (or stage 606). For example, the 32$^{nd}$ spectral magnitude frame in the first set of spectral magnitude frames and the 1$^{st}$ spectral magnitude frame in the second set of spectral magnitude frames are spectral magnitude frames that are sequentially output from stage 604 (or stage 606).

After spectral magnitude frames have been accumulated within each set of buffer elements of the first accumulation buffer, the set of buffer elements containing the oldest accumulated set of spectral magnitude frames is cleared and another set of spectral magnitude frames can be accumulated (e.g., as described above) within that set of buffer elements. For example, after a y$^{th}$ set of spectral magnitude frames has been accumulated within the y$^{th}$ set of buffer elements 720*y*, the first set of buffer elements 720*a* can be cleared and a y+1$^{th}$ set of spectral magnitude frames can be accumulated therein as discussed above.

Spectral magnitude frames can be accumulated within a buffer element at any suitable or desired or rate. In one embodiment, new spectral magnitude frames are accumulated within buffer elements at a rate that corresponds to the rate with which frames of (optionally filtered) spectral magnitudes are produced (e.g., at stage 604 or stage 606). Thus, to continue with the example scenario given above, a spectral magnitude frame can be accumulated within a different buffer element every 32 ms (or thereabout). In one embodiment, a set of spectral magnitude frames accumulated within set of buffer elements corresponds to a period of audio input having a duration of 1.024 seconds (or thereabout). It will be appreciated, however, that each set of buffer elements may store an accumulated set of spectral magnitude frames corresponding to a period of audio input having any suitable or desired duration that is greater than or less than 1.024 seconds (or thereabout).

Corresponding buffer elements across different sets of buffer elements can be conceptually characterized as belonging to the same "offset" or "shift" group. For example, first buffer elements 722*a*, 722*b*, ... and 722*y* can be considered as belonging to a first shift group, second buffer elements 724*a*, 724*b*, ... and 724*y* can be considered as belonging to a second shift group, third buffer elements 726*a*, 726*b*, ... and 726*y* can be considered as belonging to a third shift group and fourth buffer elements 728*a*, 728*b*, ...and 728*y* can be considered as belonging to a fourth shift group. As will be discussed in greater detail below, spectral magnitude frames accumulated within buffer elements belonging to the same shift group can be processed to facilitate watermark detection.

(i). Memory Requirements and Accumulation Techniques

When implemented in the manner described above, the first accumulation process requires only modest memory resources. For example, 4 kB, or thereabout, is typically required to store a spectral magnitude frame within a single buffer element. Based on this example, a single set of buffer elements would typically require 16 kB of memory to store an accumulated set of spectral magnitude frames corresponding to a period of audio input having a duration of 1.024 seconds (or thereabout). By increasing the number of sets of buffer elements in the first accumulation buffer, one can store multiple accumulated sets of spectral magnitude frames corresponding to longer periods of audio input. For example, if y is 6$^{th}$en the first accumulation process would require 96 kB to store multiple accumulated sets of spectral magnitude frames corresponding to a period of audio input spanning 6.144 seconds (or thereabout).

However, memory requirements of the first accumulation process may be reduced simply by decreasing the number of sets of buffer elements in the first accumulation buffer and increasing the number of spectral magnitude frames that are included in any set of spectral magnitude frames (thus increasing the number of spectral magnitude frames that are accumulated within any individual buffer element). For example, the first accumulation process may be performed such that each set of buffer elements stores an accumulated set of spectral magnitude frames corresponding to a period of audio input having a duration of 2.048 seconds (or thereabout). In this case, the first accumulation process would only require 48 kB (i.e., for three sets of the aforementioned buffer elements, y=3) to store multiple sets of spectral magnitude frames corresponding to a period of audio input spanning 6.144 seconds (or thereabout). Nevertheless, it will be appreciated that each set of buffer elements may store an accumulated set of spectral magnitude frames corresponding to a period of audio input having any suitable or desired duration that is greater than or less than 2.048 seconds (or thereabout).

Memory requirements of the first accumulation process may also be reduced by conducting a weighted accumulation process for at least one set of buffer elements. When implementing a weighted accumulation process, the first accumulation buffer can include only one set of buffer elements (e.g., containing only four buffer elements and, thus, imposing memory requirements of only 16 kB), or may include additional sets of buffer elements (e.g., storing spectral magnitude frames according to one or more other accumulation processes).

Generally, a weighted accumulation process is conducted by scaling each spectral magnitude frame to be accumulated within a buffer element or by scaling each accumulated spectral magnitude frame stored within a buffer element such that spectral magnitude frames accumulated relatively distantly in time are given less importance than weighted less heavily than spectral magnitude frames accumulated relatively recently in time. A weighted accumulation process can, for example, be performed each time a spectral magnitude frame is to be accumulated in a buffer element, and can be conducted by scaling each spectral magnitude frame to be accumulated within a buffer element or by scaling each accumulated spectral magnitude frame stored within a buffer element.

Generally, the weighted accumulation process is conducted by scaling each spectral magnitude frame output from stage 604 (or stage 606), by scaling each accumulated spectral magnitude frame that is stored within a buffer element, or a combination thereof. After a new spectral magnitude frame (e.g., as output from stage 604 or stage 606) is scaled and/or after a previously-accumulated spectral magnitude frame (stored within a buffer element) is scaled, the two spectral magnitude frames are added together to yield a new accumulated spectral magnitude frame. Thereafter, the previous accumulated spectral magnitude frame in the buffer element is replaced with new accumulated spectral magnitude frame.

A spectral magnitude frame—whether as output from stage 604 or 606 or as accumulated and stored in a buffer element—can be scaled by multiplying each spectral magnitude value therein by a scaling factor. Spectral magnitude frames output from stage 604 (or stage 606) are typically scaled according to a first scaling factor whereas accumulated spectral magnitude frames stored within buffer elements are scaled according to a second scaling factor greater than the first scaling factor. Generally, one or both of the first and second scaling factors is less than 1. In one embodiment, both the first and second scaling factors are less than 1, and the sum of the two factors equal to or less than 1. Generally, the ratio between the second and first scaling factors may correspond to the desired robustness with which a watermark signal is ultimately detected or decoded, the minimum duration of an audio block required to carry a complete watermark tile that is (or that might be) embedded within the audio input, or the like or any combination thereof. Notwithstanding the above, it will be appreciated that one or both of the first and second scaling factors may be greater than or equal to 1, that the sum of the two factors may be greater than 1, or the like or any combination thereof.

e. Second Accumulation Stage

Spectral magnitude frames that have been accumulated in the first accumulation process are accumulated (e.g., summed) according to a second accumulation process at stage 610. Accumulated spectral magnitude frames accumulated according to the second accumulation process (also referred to herein as "secondly-accumulated spectral magnitude frames") are stored in a second accumulation buffer (e.g., an input buffer or other memory of the watermark detector module 502, watermark decoder module 802, the cue detection module 134, the audio I/O module 122, the audio DSP 128, or the like or any combination thereof). Generally, the second accumulation buffer is provided as a FIFO buffer, wherein elements of the FIFO buffer are organized into z sets of buffer elements, where z is any integer equal to or greater than 1. In one embodiment, z is in a range from 3 to 24. In another embodiment, z is in a range from 6 to 12. In yet another embodiment, z is 3 or 6. Notwithstanding the foregoing, it will be appreciated that z may be greater than 24.

Generally, the second accumulation process, operates on each shift group of the first accumulation buffer 720. According to the second accumulation process, a set of accumulated spectral magnitude frames within each shift group is accumulated within a corresponding buffer element in a set of buffer elements of the second accumulation buffer. Generally, accumulated spectral magnitude frames within the set are accumulated across two or more sets of buffer elements of the first accumulation buffer 720. Thus, the rate with which accumulated sets of spectral magnitude frames are accumulated may depend upon the number of sets of buffer elements from the first accumulation buffer 720 that are involved, the rate with which new spectral magnitude frames are accumulated within the first accumulation buffer 720, or the like or any combination thereof.

Figure 7D:
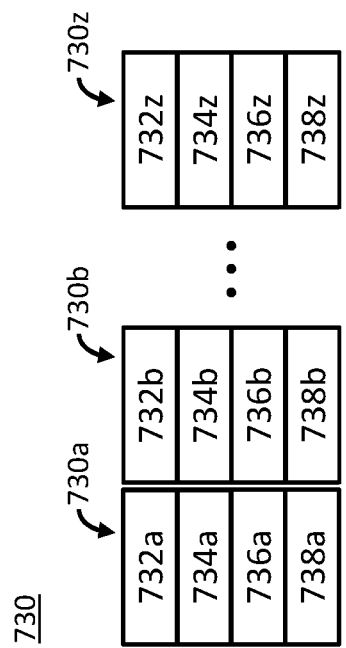

For example, and with reference to FIG. 7D, the second accumulation buffer can be provided as accumulation second accumulation buffer 730 having z sets of buffer elements (e.g., a first set of buffer elements 730a, a second set of buffer elements 730b, etc., and a $z^{th}$ set of buffer elements 730z). Each set of buffer elements includes four buffer elements (e.g., the first set of buffer elements 730a contains a first buffer element 732a, a second buffer element 734a, a third buffer element 732b and a fourth buffer element 738a, and so on). The second accumulation process can thus be performed by accumulating a set of accumulated spectral magnitude frames within the first shift group and across a group of sets of buffer elements of the first accumulation buffer 720 into the first buffer element 732a, accumulating a set of accumulated spectral magnitude frames within the second shift group and across the group of sets of buffer elements of the first accumulation buffer 720 into the second buffer element 734a, accumulating a set of accumulated spectral magnitude frames within the third shift group and across the group of sets of buffer elements of the first accumulation buffer 720 into the third buffer element 736a and accumulating a set of accumulated spectral magnitude frames within the fourth shift group and across the group of sets of buffer elements of the first accumulation buffer 720 into the fourth buffer element 738a.

In an embodiment in which the second accumulation buffer includes multiple sets of buffer elements (e.g., as shown in FIG. 7D), the second accumulation process can be performed by accumulating a set of accumulated spectral magnitude frames as discussed above, but across different groups of sets of buffer elements of the first accumulation buffer. Each set of secondly-accumulated spectral magnitude frames can then be stored in a different set of buffer elements of the second accumulation buffer. For example, and with reference to FIGS. 7C and 7D, the first set of buffer elements 730a may store a set of accumulated spectral magnitude frames that have been accumulated across all sets of buffer elements 720a, 720b, . . . , 720y in the first accumulation buffer 720. The second set of buffer elements 730b, however, may store another set of accumulated spectral magnitude frames that have been accumulated across only those sets of buffer elements in the first accumulation buffer 720 that store accumulated spectral magnitude frames corresponding to the n most recent seconds (or any fraction thereof). Another set of buffer elements of the second accumulation buffer may store yet another set of accumulated spectral magnitude frames that have been accumulated across only those sets of buffer elements in the first accumulation buffer 720 that store accumulated spectral magnitude frames corresponding to the m most recent seconds (or any fraction thereof), where m≠n.

In view of the above, it will be appreciated that a set of secondly-accumulated spectral magnitude frames stored within set of buffer elements in the second accumulation buffer 730 can correspond to a period of audio input having a duration in a range from, for example, 1 second (or thereabout) to 24 seconds (or thereabout), and that one or more groups of accumulated spectral magnitude frames may be secondly-accumulated at stage 610. Sometimes, there is tradeoff between the benefits offered by a secondly-accumulated spectral magnitude frame corresponding to a relatively long period of audio input, and those offered by a secondly-accumulated spectral magnitude frame corresponding to a relatively short period of audio input. In environments having stationary sound sources and in which the electronic device is relatively stationary (e.g., laying on a desk), use of secondly-accumulated spectral magnitude frames corresponding to a relatively long period of audio input can be helpful in increasing signal-to-noise ratio (SNR) of the watermark signal. However, in environments in which there is rapid relative movement between the sound sources and the electronic device (or in which an embedded watermark signal is changing rapidly), use secondly-accumulated spectral magnitude frames corresponding to a relatively short period of audio input may more reliably detect a watermark signal. Accordingly, two or more groups of secondly-accumulated spectral magnitude frames may be obtained at stage 610, e.g., corresponding to two or more periods of sampled audio input spanning a duration of 3 seconds, 6 seconds, 9 seconds, 12 seconds, etc.

If multiple groups of secondly-accumulated spectral magnitude frames are stored within the second accumulation buffer 730, then post-accumulation stages of the watermark detection process 600 may then be performed to process each group of secondly-accumulated spectral magnitude frames in serial fashion. For example, and with reference to FIG. 6, after a first group of secondly-accumulated spectral magnitude frames has been processed at a subsequent estimate normalization stage 612, a second group of secondly-accumulated spectral magnitude frames may be processed at the estimate normalization stage 612. However in another embodiment, and as also shown in FIG. 6, such post-accumulation stages of the watermark detection process 600 can be executed in multiple threads to process each group of aggregated sets of spectral magnitudes in parallel fashion. It will also be appreciated that any processing thread can further process multiple groups of aggregated sets of spectral magnitudes in serial fashion.

f. Estimate Normalization Stage

A group of secondly-accumulated spectral magnitude frames normalized at 612, thereby producing a group of normalized spectral magnitude frames. Normalizing the group of secondly-accumulated spectral magnitude frames helps to constrain the contribution that any spurious watermark signal elements may provide in the subsequent detection stage 614. In one embodiment, the normalization process is performed based on the overall statistical characteristics of the entire frequency band (e.g., including frequency bins 1 through 1024) but different audio (speech and different types of music) can be represented in different segments (bands) within the full spectrum. The frequency spectrum can be divided into 8 bands, and the frequencies in each band can be normalized based on the statistical characteristics of their band instead of the statistical characteristics of the full spectrum. Clipping may be performed prior to the normalization to suppress outliers. In another embodiment, normalization is accomplished by reference to a pre-computed normalization look-up table.

g. Detection Stage

Sometimes, the audio represented by the audio input, which might be encoded with an audio watermark signal, is distorted in such a manner as to prevent or otherwise hinder efficient detection of an encoded audio watermark signal at the detection stage 614. One type of distortion is linear time scale (LTS), which occurs when the audio input is stretched or squeezed in the time domain (consequently causing an opposite action in the frequency domain). In one embodiment, such distortion can be estimated and used to enhance watermark detection.

In one embodiment, the distortion estimation operates on the group of normalized spectral magnitude frames output at stage 612: spectral magnitude values in the group of normalized spectral magnitude frames are scaled in accordance with a set of linear scaling factors and one or more noise profiles, thereby yielding a set of candidate spectral magnitude profiles. For example, spectral magnitude values in the group of normalized spectral magnitude frames can be scaled using 40 linear scaling factors (e.g., ranging from −1% scaling to +1% scaling, and including 0% scaling) and 6 predetermined noise profiles, thereby yielding a set of 960 candidate spectral magnitude profiles. It will be appreciated that more or fewer than 40 linear scaling factors may be applied, and that more or fewer than 6 predetermined noise profiles may be applied.

The noise profiles weight the elements of the spectral magnitudes at frequency locations according to the type of host audio visual signal content and noise environment predicted from a classification of the type of incoming audio-visual signal (e.g., noisy public room, outdoor venue, car, home, or production studio environment). In one embodiment, the weighting is applied in a band-wise manner in which the spectral magnitudes are sub-divided into bands (e.g., 8 bands of 1000 Hz each). The weighting emphasizes spectral components where the watermark signal is most reliably detected, and/or where it is embedded with more signal strength. For spectral bands where there is little host signal or significant host signal interference for a particular audio type, the weights are reduced. If the audio type indicates that the incoming audio has relatively flat spectral content, the weights of the spectral band are roughly the same, reflecting that digital watermark content is likely the same reliability in each band. These noise profiles may be generated by a training process in which weights that provide reliable detection are determined from training sets of content of various audio types. The noise profiles may also be generated a priori by examining the bands in which the watermark signal is most strongly embedded for each audio type, and setting weights for the bands that emphasize those bands over others where the watermark is not as strongly embedded for that audio type.

The activity detector may be used to identify the noise profile, in which case processing may be streamlined by prioritizing detecting and decoding with weighting applied for the identified profile, as opposed to executing detecting and decoding on all profiles.

Notwithstanding the above, it will be appreciated that distortion may be detected and accounted for as described in any of U.S. Pat. Nos. 7,152,021 and 8,694,049 (each of which is incorporated herein by reference in its entirety), in any of the aforementioned U.S. Patent App. Pub. Nos. 2014/0108020 and 2014/0142958, or the like or any combination thereof.

For each of the candidate spectral magnitude profiles obtained from the distortion estimation, the spectral magnitudes corresponding to the aforementioned version bits of the version identifier are extracted. Thereafter, for each candidate spectral magnitude profile, values at the frequency locations for each version bit are aggregated (e.g., summed), thereby yielding a sequence of i spectral magnitudes (also referred to as a "version spectral magnitude sequence," where, as mentioned above, i represents the number of version bits used to convey the version identifier in the watermark signal). Version spectral magnitude sequences computed for the set of candidate spectral magnitude profiles are then correlated with one or more known version identifiers (e.g., stored within a memory of the watermark detector module 502, the cue detection module 134, etc.), thereby generating a "version correlation metric" for each version spectral magnitude sequence. If the version correlation metric for any version spectral magnitude sequence is above a threshold correlation value, then a watermark signal can, in some cases, be determined to be present within the audio input. Notwithstanding the above, it will be appreciated that the presence of a watermark signal can be detected as described in any of the aforementioned U.S. Pat. No. 8,694,049 or U.S. Patent App. Pub. Nos. 2014/0108020 and 2014/0142958, or the like or any combination thereof.

Upon detecting the presence of an audio watermark signal at stage 614, the watermark detector module 502 generates, as output, a signal or other message or data (e.g., indicating that an encoded audio watermark signal has been detected). The watermark detector output can thereafter be communicated or otherwise delivered in the manner discussed above.

(i). More on Coping with Distortions

As exemplarily described above, the detection process executed at stage 614 is facilitated takes a "brute force" approach to estimating linear time scaling of audio represented by the audio input. In another embodiment, linear time scaling can be estimated directly.

If an audio signal is time-scaled by a factor S, then the frequency component which would originally have appeared at bin index N of the FFT will now appear at index N/S. For example, if an original (unscaled) audio signal is time-scaled by a factor of 2 (becoming twice the duration as previously), then the frequency component at 500 Hz in the original signal will appear at 250 Hz in the scaled signal. By transforming the group of normalized spectral magnitude frames output at stage 612 to log-space (thereby creating a "transformed signal"), and also transforming version bits of the known version identifier(s) (also referred to herein as a "template"), their positions and known values, to the same space, the correlation between the transformed signal and the transformed template in log-space can be used to find a peak and determine the LTS shift. In one embodiment, transformation of the group of normalized spectral magnitude frames and of the template to log-space can accomplished as follows:

1. Let $R_O$ be the bin index of the lowest frequency to be transformed to log space. This first bin index can be 1 or greater.
2. Let $R_{END}$ be the bin index of the highest frequency to be transformed to log space. This second bin index can be 1023.
3. Let N be the desired number of points in the log-transformed space.
4. Transform a coordinate x in the log domain to a coordinate x' in the frequency domain as follows:

$$X'=R_O A_x, \qquad (4)$$

such that, when x=0, $X'=R_O$, and value of A is chosen so that when x=N−1, $X'=R_{END}$.

5. The group of normalized spectral magnitude frames is then mapped onto the log-space (length N) as follows. For each coordinate x=0, 1, 2, . . . , N—1, the source index X' is calculated using Equation (4). The value of the transformed signal, logspace[x], is computed by interpolation (linear or otherwise) on the frequency data at coordinate X'.
6. The template are also mapped to log-space for correlation with the transformed signal.
7. Let X'i be the index of the $i^{th}$ bit of the template in frequency space. Using the inverse of Equation (4) (solving for x in terms of X') the indices xi of the version bits in log space can be determined. The values (+1 or −1) of the version bits are unaltered by this transformation. These locations are fixed and can be built into the watermark detector module 502 as constant data.
8. Once the transformed signal and transformed template are obtained, a correlation between the two is calculated. In one embodiment, the correlation is normalized in regions where the template partially "falls off" the signal due to LTS shifting of some version bits above the Nyquist limit. It may be possible to construct a range of interest such that this normalization is not required.
9. The absolute value of the correlation is then used as a basis to search for the highest peak.
10. Once the highest peak (or peaks) are found, the inverse of Equation (4) is applied to convert the peak position back to the usual frequency coordinates. The ratio between the converted peak position and the known peak position for the 0% LTS case gives the final LTS estimate.

h. Temporal Gating Stage

In one embodiment, the output generated at 614 is output (e.g., via the bus 100) to one or more components of the electronic device when it is generated. Optionally, the output of any signal or other message or data generated at 614 is delayed (e.g., at 616) until the encoded audio watermark signal is detected over some period of time (e.g., spanning a range from 0.5 seconds (or thereabout) to 30 seconds (or thereabout)). Temporally gating the output of the watermark detector module 502 in this manner can help to avoid or otherwise reduce the risk of false positive detections.

ii. Adaptive Dynamic Range Adjustment

Watermark detection processes, such as watermark detection process 600, can be implemented as "fixed-point" or "floating-point" processes. Fixed-point processes represent data with a fixed number of bits after (and sometimes before) the radix point (also called the decimal point or binary point). In contrast, floating-point processes represent data approximately to a fixed number of significant bits and scaled using an exponent. The exponentiation inherent in floating-point processing assures a much larger dynamic range (i.e., the largest and smallest numbers that can be represented), which can be important when processing data where the range may be unpredictable. However, floating-point processes can be more complicated (and, thus, more computationally expensive) than fixed-point processes. Therefore, when implementing a watermark detection process (e.g., watermark detection process 600) as a fixed-point process, it can be beneficial to adjust the dynamic range of the audio input as a pre-processing stage (e.g., prior to stage 604) in order to maintain low bit representation of the audio input within the watermark detector module 502 (and other modules such as a watermark decoder module, exemplarily discussed below).

Upon adjusting the dynamic range, the bit-depth representation of the sampled audio input can be reduced, for example, from the typical 32-bit (float) or 16-bit CPM to a lower bit depth representation (e.g., 8-bit or 12-bit) to avoid overflow when performing certain operations in connection with watermark detection or decoding. In one embodiment, the dynamic range of the audio input is adjusted by simply by dropping some of the least significant bits and retaining the remaining most significant bits. This approach works in general, but when the audio input samples have a limited dynamic range (often due to low values) most of the information is in the lower significant bits and the most significant bits are not used. Thus the general approach of dropping the least significant bit can potentially result in losing a significant portion of information in the audio input samples. Accordingly, in another embodiment, the dynamic range of the audio input is adjusted by evaluating the dynamic range of the incoming audio input to determine which bits might be carrying a watermark signal and which bits could be truncated. In one embodiment, the evaluation may be performed by analyzing one or more frames of sampled audio input to determine certain statistical characteristics of the frame(s), such as min, max, mean, StDev etc. Adjustment of the dynamic range can be performed by the watermark detector 502, or by another module associated with the cue detection module 134 and communicatively coupled to an input of the watermark detector module 502.

iii. Use of Watermark Detector Output to Support Audio Activity Detection

In one embodiment, the watermark detector output is communicated to the audio activity detector module 202. In addition to a signal or other message or data indicating that an encoded audio watermark signal has been detected, the watermark detector output may further include an audio signature associated with one or more portions of audio input in which the watermark signal was detected. The audio signature may, for example, include spectral magnitudes of portion(s) of audio input computed at the transform stage 604, filtered at stage 606, or the like or any combination thereof (e.g., at frequencies where the version bits were mapped). Such watermark detector output is thereafter fed to a classifier associated with the audio activity detector module 202 and referenced during an audio activity detection process. During such an audio activity detection process, the output of the watermark detector (e.g., intermediate filtered spectral magnitudes) is compared with typical data obtained over several examples of activity or non-activity. The output from the watermark detector is also correlated with expected configurations of data that would be found if a watermark was present in the signal. The comparisons can either be performed heuristically or a by a classifier designed and trained (for example, using machine learning approaches such as neural networks, Support Vector Machine (SVM), etc.) explicitly using large amounts of prior data to distinguish between activity and non-activity states in various conditions. Similarly, in another variant of this embodiment, a classifier is used to distinguish presence or absence of a low-strength watermark signal.

One advantage of using the watermark detector output is that it enables the capability of distinguishing background sounds containing a watermark signal (such as watermarked white noise generators in an office building), which would otherwise be ignored by typical audio activity detection techniques. Another advantage is in terms of computational efficiency—the computations required (to calculate, for example, the spectral magnitude components) can be shared for both activity detection and watermark presence detection.

C. Cue Detection Based on Watermark Interpretation

When a watermark signal is encoded in ambient sound, the watermark signal can serve as an auxiliary channel conveying one or more items of auxiliary data within the plural-bit message, which can be used for many applications. Methods of extracting, recovering or otherwise decoding auxiliary data from detected watermark signals are disclosed in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020 and 2014/0142958, and in aforementioned U.S. patent application Ser. No. 14/270,163 and U.S. Provisional App. No. 62/034,340 (and Ser. No. 14/821,435).

In one embodiment, an item of auxiliary data conveyed by the watermark signal can be represented by a single bit or by a plural-bit sequence, wherein each bit of auxiliary data (also referred to herein as a "auxiliary data bit") is repeated at a plurality of known frequency locations. Accordingly, the auxiliary data may be repeated at k×l frequency locations, where k represents the number of auxiliary data bits and l represents the number of frequency locations to which each auxiliary data bit is mapped. Once a watermark signal is detected, it can be interpreted so as to extract, recover or otherwise decode a plural-bit message in a quick and efficient manner.

An item of auxiliary data can include any machine-executable instruction (e.g., executable by the CPU 102, the cue detection module 134, the GPU 118, user interface module 108, the sensor interface module 130, the image signal processor 116, the audio DSP 128, the communications module 114, or the like or any combination thereof), a content signal (e.g., an audio signal, an image signal, a video signal, etc.), a machine-readable computer file (e.g., for storing text data, audio data, image data, video data, or for storing haptic signature data as described in U.S. Patent App. Pub. No. 2012/0028577—which is incorporated by reference herein in its entirety), or any data or metadata as described in U.S. Patent App. No. 2014/0142958 and U.S. Provisional App. No. 62/034,340 (and non-provisional counterpart Ser. No. 14/821,435), each of which is incorporated herein by reference in its entirety, or an IP address, URL, database index or other link (e.g., a direct link or an indirect link) to any of the foregoing examples of types of items of auxiliary data, or the like or any combination thereof. In one embodiment, the auxiliary data could be provided as an identifier comprising a hash of any of the examples of types of auxiliary data items given above.

i. Decoding Encoded Audio Watermark Signals

In one embodiment, and with reference to FIG. 8, the cue detection module 134 includes a watermark decoder module 802 configured to process sampled audio input (e.g., by performing one or more watermark decoding processes) decode auxiliary data conveyed within a detected watermark signal. Generally, the watermark decoder module 802 includes a microprocessor, digital signal processor (e.g., a fixed-point DSP, floating-point DSP, or a combination thereof) or other microcontroller, programmable logic device, or any other processor typically consuming less power than the CPU 102 when in an active or working state. Optionally, the watermark decoder module 802 includes cache or other local memory device (e.g., volatile memory, non-volatile memory or a combination thereof), DMA channels, one or more input buffers, one or more output buffers, and any other component facilitating the functions it supports.

The watermark decoder module 802 and any of the audio activity detector module 202 and the watermark detector module 502 may be at least partially implemented on shared, common hardware components, or may be fully implemented on completely separate hardware components. Further, although the watermark decoder module 802 is illustrated as a part of the cue detection module 134, it will be appreciated that the watermark decoder module 802 may be a part of one or more other components of the electronic device (e.g., the CPU 102, the user interface module 108, the audio I/O module 122, the audio DSP 128, the sensor interface module 130, or the like or any combination thereof). In one embodiment, the watermark decoder module 802 and any of the audio activity detector module 202 and watermark detector module 502 are part of the same electronic device. In another embodiment, however, the watermark decoder module 802 is part of one electronic device (e.g., a first electronic device) and the audio activity detector module 202 and the watermark detector module 502 are part of one or more other electronic devices (e.g., one or more second electronic devices) physically separate from the first device. In this case, the second electronic device in which the watermark detector module 502 is found can be communicatively coupled to the first electronic device (e.g., via one or more wired or wireless links as discussed above). In this embodiment, the first electronic device may be any of the aforementioned portable electronic devices, and the second electronic device(s) may also be any of the aforementioned portable electronic devices or may be a desktop computer, a server (e.g., an application server, a cloud server, a base-station server, or the like or any combination thereof), or the like or any combination thereof.

When activated, the watermark decoder module 802 invokes, launches, or otherwise initiates a watermark decoding process by applying a set of processing stages to each of several segments of audio input. The stages can be configured to re-use operations and avoid unnecessary processing and, where possible, skip a stage where execution of the stage for a previous segment can be re-used, etc. As will be appreciated, these stages can be sequentially or serially executed by the watermark detector module 802. Serial execution enables stages to be organized into a sequential pipeline of processing stages. Nevertheless, at least some of the stages can be executed in parallel, as will be described in greater detail below.

Upon decoding auxiliary data, the watermark detector module 502 generates, as output, a signal or other message or data indicating that an encoded audio watermark signal has been decoded. Additionally or alternatively, the watermark decoder output can include the extracted, recovered or otherwise decoded auxiliary data. The watermark decoder output can thereafter be communicated or otherwise delivered (e.g., via the bus 100) to one or more target components of the electronic device via one or more modes of delivery modes such as a push mode, a pull mode, or the like or any combination thereof.

Once delivered to a target component, the watermark decoder output can be published (e.g., to a message queue implemented within an operating system, an application program, middleware, etc.), or otherwise read, copied, stored, altered, uploaded, used, etc., by system software, application software, middleware (e.g., either alone or in conjunction with one or more computer files, software components, etc.) executable by or accessible to the target component. Thus, in this context, the act of delivering watermark decoder output to a target component can be equivalent to delivering the watermark decoder output to one or more items of software (generically referred to herein as "target software") that publishes, reads, copies, stores, alters, uploads, uses, etc., the watermark decoder output. In one embodiment, delivered watermark decoder output can be rendered to a user of the electronic device via one or more user output devices 112. In another embodiment, delivered watermark decoder output can be provided to a remote database to obtain related metadata or information, to a rights management system, to facilitate an online transaction, etc.

In some embodiments, the watermark decoder module 802 is activated either automatically or manually, continuously or periodically, in a manner as similarly described with respect to the audio activity detector module 202, the watermark detector module 502, or the like or any combination thereof. In another embodiment, the watermark decoder module 802 is activated automatically whenever the audio activity detector 202 or the watermark detector module 502 is activated. In yet another embodiment, the watermark decoder module 802 is activated automatically whenever audio activity detector output or watermark detector output is communicated or delivered. In this case, the watermark decoder module 802 can be communicatively coupled to the output of the audio activity detector module 202 or the watermark detector module 502, or otherwise be configured to receive output from any of such modules.

Figure 9:
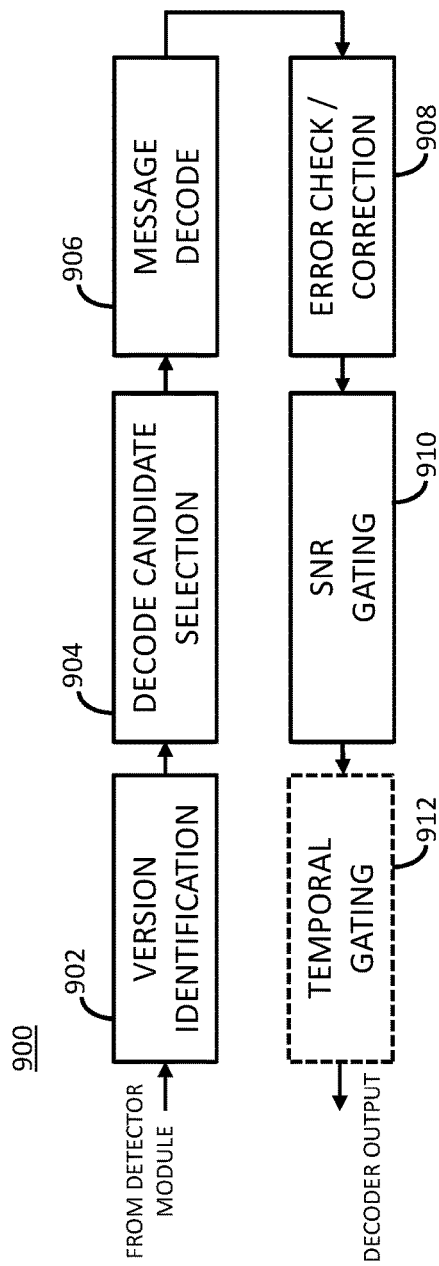
FIG. 9 is a flow chart illustrating one embodiment of a watermark decoding process.

An exemplary decoding process is described in greater detail with respect to FIG. 9. Specifically, FIG. 9 illustrates a watermark decoding process 900 for decoding a frequency-domain audio watermark signal employing an adjacent-frame, reversed embedding modulation scheme, such as that exemplarily described above and in aforementioned U.S. Patent App. Pub. No. 2014/0142958. It will be appreciated that the techniques described herein may be adapted to detect other types watermark signals employing any suitable or beneficial modulation scheme. Generally, the watermark decoding process 900 operates on audio input that has been processed by the watermark detector module 502 (e.g., as a result of any stage of the watermark detection process). It will be appreciated, however, that the watermark decoding process 900 may operate on audio input that has not be processed by the watermark detector module 502.

a. Version Identification Stage

At 902, the version of the watermark protocol used to construct the detected watermark signal is identified. In one embodiment, the version is determined by determining the highest version correlation metric obtained at aforementioned stage 614, and then identifying the version identifier associated with the highest version correlation metric. Notwithstanding the above, it will be appreciated that the version may be detected as described in any of the aforementioned U.S. Pat. Nos. 7,020,304 and 7,412,072, in any of the aforementioned U.S. Patent App. Pub. Nos. 2014/0108020 and 2014/0142958, or the like or any combination thereof.

b. Decoding Candidate Selection Stage

As mentioned above, the watermark protocol specifies, among other things, data formatting (e.g., relating to how data symbols are arranged into message fields, how message fields are packaged into message packets, etc.) and how watermark signal elements are mapped to corresponding elements of a host audio signal. Thus the version identifier identified at 902, which is associated with a particular watermark protocol, can be used to determine the manner in which the auxiliary data should be formatted and mapped (i.e., "structured") within the detected watermark signal. To increase the likelihood that auxiliary data constructed into the detected watermarked signal is decoded correctly, a decode candidate selection process is performed prior to decoding. In one embodiment, the decode candidate selection process operates on the set of candidate spectral magnitude profiles obtained from the distortion estimation performed at 614.

For example, for each of the candidate spectral magnitude profiles obtained from the distortion estimation at 614, the spectral magnitudes corresponding to the aforementioned auxiliary data bits are extracted. Thereafter, values at the frequency locations for each extracted auxiliary data bit are aggregated (e.g., summed), thereby yielding a sequence of k spectral magnitudes (also referred to as an "auxiliary data spectral magnitude sequence," where, as mentioned above, k represents the number of auxiliary data bits used to convey the auxiliary data in the watermark signal). Each auxiliary data spectral magnitude sequence is then correlated with a reference spectral magnitude sequence (e.g., stored within a memory of the watermark detector module 502, the cue detection module 134, etc.) associated with version identifier identified at 902, thereby generating a "structural strength metric" for that auxiliary data spectral magnitude sequence. For each auxiliary data spectral magnitude sequence, the version correlation metric and the structural strength metric are aggregated (e.g., summed) to produce a "decode candidate strength metric" for that auxiliary data spectral magnitude sequence. Thereafter, a decode candidate selection process is performed to select which auxiliary data spectral magnitude sequence(s) to submit to the decode process at 906.

In one embodiment, the decode candidate selection process is performed by analyzing the decode candidate strength metrics computed for each auxiliary data spectral magnitude sequence. For example, decode candidate strength metrics for the entire set of auxiliary data spectral magnitude sequences are analyzed to identify any auxiliary data spectral magnitude sequence(s) having a decode candidate strength metric above a threshold decode candidate value. In another example, decode candidate strength metrics for the entire set of auxiliary data spectral magnitude sequences are analyzed to identify only the auxiliary data spectral magnitude sequences having the o highest decode candidate strength metric values (where o is any integer greater than 1 and, in one embodiment, is in a range from 4 to 10, but may alternatively be greater than 10 or less than 4), which may or may not be greater than the threshold decode candidate value. Any identified auxiliary data spectral magnitude sequence is then submitted, as a candidate spectral magnitude sequence, for decoding at the decoding stage 906.

In another embodiment, the decode candidate selection process is performed by first analyzing the decode candidate strength metrics computed for each auxiliary data spectral magnitude sequence (e.g., as discussed in the examples above). Next, and assuming that a set of multiple auxiliary data spectral magnitude sequences has been identified, the set of identified auxiliary data spectral magnitude sequences is analyzed to identify "similar" auxiliary data spectral magnitude sequences. As defined herein, one auxiliary data spectral magnitude sequence (e.g., auxiliary data spectral magnitude sequence "A") is similar to another auxiliary data spectral magnitude sequence (e.g., auxiliary data spectral magnitude sequence "B") if the two auxiliary data spectral magnitude sequences are derived from the same noise profile and neighboring linear scaling factors. For example, auxiliary data spectral magnitude sequence "A" may be similar to auxiliary data spectral magnitude sequence "B" if the two auxiliary data spectral magnitude sequences are both derived from noise profile "C," and auxiliary data spectral magnitude sequence "A" is further derived from linear scaling factor "D" while auxiliary data spectral magnitude sequence "B" is further derived from linear scaling factor "E" (where linear scaling factors "D" and "E" are adjacent to one another, or are separated from one another by a range of 1 to 5 other intervening linear scaling factors). Within each sub-set of similar auxiliary data spectral magnitude sequences, any auxiliary data spectral magnitude sequence that does not have the highest decode candidate strength metric is identified as a redundant auxiliary data spectral magnitude sequence. Redundant auxiliary data spectral magnitude sequences are removed from the set of identified auxiliary data spectral magnitude sequences, and any auxiliary data spectral magnitude sequence remaining is then submitted, as a candidate spectral magnitude sequences, for decoding at the decoding stage 906.

In yet another embodiment, the decode candidate selection process is performed by analyzing the decode candidate strength metrics computed for multiple sub-sets of auxiliary data spectral magnitude sequences. In this embodiment, different sub-sets of auxiliary data spectral magnitude sequences are derived from one or more different linear scaling factors, such that different sub-sets of auxiliary data spectral magnitude sequences represent different levels of distortion. For example, a first sub-set of auxiliary data spectral magnitude sequences may be derived from one or more first linear scaling factors (e.g., including 0% scaling, a first range of linear scaling factors, or the like or any combination thereof) and a second sub-set of auxiliary data spectral magnitude sequences may be derived from one or more second linear scaling factors (e.g., including second range of linear scaling factors, having an average linear scaling factor that is greater than that of the first range of linear scaling factors). Then, for each sub-set of auxiliary data spectral magnitude sequences, the decode candidate strength metrics are analyzed to identify only the auxiliary data spectral magnitude sequences having the highest p decode candidate strength metric values (which may or may not be greater than the threshold decode candidate value). In general, the number of auxiliary data spectral magnitude sequences, p, identified for a sub-set will correspond to the distortion level represented by the sub-set. In one embodiment, the number of auxiliary data spectral magnitude sequences, p, identified for any sub-set will increase as the distortion level represented by the sub-set decreases. For example, the number of auxiliary data spectral magnitude sequences p identified for the aforementioned second sub-set may be in a range that is 10% to 80% less than the number of auxiliary data spectral magnitude sequences p identified for the aforementioned first sub-set. The resulting sub-sets of identified auxiliary data spectral magnitude sequences are then submitted, as candidate spectral magnitude sequences, for decoding at the decoding stage 906.

In the embodiments discussed above, a set of one or more candidate spectral magnitude sequences can be submitted for decoding periodically (e.g., every half-second, every second, every two seconds, etc., or thereabout), after a certain number (e.g., 2, 4, 6, 8, 10, 12, etc.) of auxiliary data spectral magnitudes have been identified, or the like or any combination thereof.

In the embodiments discussed above, the decode candidate selection process is performed based on the decode candidate strength metric. In another embodiment, however, any of the aforementioned decode candidate selection processes can be similarly performed based upon the version correlation metric, thus obviating the need to compute the structural strength metric and potentially increasing the speed with which the decode candidate selection process is performed.

Notwithstanding the above, it will be appreciated that the candidate decode selection stage 904 can be performed according one or more other suitable processes (e.g., as exemplarily described in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020 and 2014/0142958, in aforementioned U.S. patent application Ser. No. 14/270,163 and U.S. Provisional App. No. 62/034,340 (and Ser. No. 14/821,435), or the like or any combination thereof).

c. Message Decode Stage

At 906, each candidate spectral magnitude sequence in the set submitted from stage 904 is processed to decode the auxiliary data constructed into the detected watermark signal, thereby yielding decoded auxiliary data. In one embodiment, the decoding is performed by reference to the version identifier identified at 902 (which, as discussed above, is associated with the particular watermark protocol used to construct and encode the watermark signal). It will be appreciated that the decoding process 906 can be performed according one or more suitable processes (e.g., as exemplarily described in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020 and 2014/0142958, in aforementioned U.S. patent application Ser. No. 14/270,163 and U.S. Provisional App. No. 62/034,340 (Ser. No. 14/821,435), or the like or any combination thereof). The resulting set of decoded candidate spectral magnitude sequences is then submitted, as a set of one or more instances of decoded auxiliary data, for error checking or correction at stage 908.

d. Error Check/Correction Stage

At 908, each decoded candidate spectral magnitude sequence in the set submitted from the decoding stage 906 is subjected to error checking or correction. It will be appreciated that any error checking or correction processes conducted at 908 can be performed according one or more suitable processes (e.g., as exemplarily described in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020 and 2014/0142958, in aforementioned U.S. patent application Ser. No. 14/270,163 and U.S. Provisional App. No. 62/034,340 (and Ser. No. 14/821,435), or the like or any combination thereof). Upon passing the error checking or correction at stage 908, a decoded candidate spectral magnitude sequence is submitted to next processing stage (e.g., the SNR gating stage 910).

e. SNR Gating Stage

At 910, SNR gating is applied to each decoded candidate spectral magnitude sequence submitted from stage 908 to determine the strength of the watermark signal that conveyed the decoded auxiliary data relative to one or more noise profiles. If it is determined that the watermark signal strength of a decoded candidate spectral magnitude sequence is above one or more predetermined threshold values, the watermark detector module 502 generates, as output, a signal or other message or data indicating that an encoded audio watermark signal has been decoded. Additionally or alternatively, the watermark decoder output can include the extracted, recovered or otherwise decoded auxiliary data corresponding to the decoded candidate spectral magnitude sequence that passed the SNR gating. Thereafter, the watermark decoder output can be communicated or otherwise delivered in the manner discussed above.

In one embodiment, one or more sets of buffer elements in the filter buffer (e.g., filter buffer 710), the first accumulation buffer (e.g., first accumulation buffer 720), the aggregation buffer (e.g., aggregation buffer 730), or any combination thereof) may be cleared upon transmitting the watermark detector output.

f. Temporal Gating Stage

In one embodiment, the output generated at 910 is output (e.g., via the bus 100) to one or more components of the electronic device when it is generated. Optionally, the output of any signal or other message or data generated at 910 is delayed (e.g., at 912) until multiple instances of the same auxiliary data have been decoded over some period of time (e.g., spanning a range from 0.5 seconds (or thereabout) to 30 seconds (or thereabout)). Temporally gating the output of the watermark decoder module 802 in this manner can help to avoid or otherwise reduce the risk of generating output based on auxiliary data that has been improperly decoded.

D. More on Watermark-Based Cue Detection

As discussed above, the watermark decoding process 900 can be generally characterized as operating upon audio input that has been processed during the watermark detection process 600. Thus the watermark detection process 600 essentially functions as a pre-processing stage to the watermark decoding process 900, and can be characterized as including a signal processing phase (e.g., signal processing phase 600*a* shown in FIG. 6, which includes aforementioned stages 602, 604, 606, 608, 610 and 612 that facilitate detection of a watermark signal within the audio input) and a watermark determination phase (e.g., watermark determination phase 600*b* shown in FIG. 6, which includes aforementioned stage 614—and optionally stage 616—where a determination can be made as to whether or not a watermark signal is present within the audio input).

i. More on the Signal Processing Phase and the Signal Processing Module

In the embodiments discussed above, the signal processing phase 600*a* and the watermark determination phase 600*b* are both performed by the watermark detector module 502. In another embodiment, however, the signal processing phase 600*a* is performed by a separate module (e.g., a "signal processing module," not shown, but included as part of the cue detection module 134), and the watermark detector module 502 may simply be communicatively coupled to an output of the signal processing module (e.g., so as to receive the output of the estimate normalization stage 612) to execute signal detection stage 614 and (optionally) the gating stage 616. In this case, the watermark decoder module 802 could be communicatively coupled to the output of the watermark detector module 502 (e.g., to receive output indicating that a watermark signal has been detected), to an output of the signal processing module (e.g., to receive the output of the estimate normalization stage 612), or the like or any combination thereof. In one embodiment, the signal processing module and any of the audio activity detector module 202, the watermark detector module 502 and watermark decoder module 802 are part of the same electronic device. In another embodiment, however, the signal processing module is part of one electronic device (e.g., a first electronic device) and the audio activity detector module 202, watermark detector module 502 and the watermark decoder module 802 are part of one or more other electronic devices (e.g., one or more second electronic devices) physically separate from the first device but communicatively coupled to the first electronic device (e.g., via one or more wired or wireless links as discussed above). In this embodiment, the first electronic device and the second electronic device(s) may be any of the aforementioned portable electronic devices or may be a desktop computer, a server (e.g., an application server, a cloud server, a base-station server, or the like or any combination thereof), or the like or any combination thereof.

In one embodiment, the signal processing phase 600*a* may be reconfigurable or otherwise adapted to increase the speed, accuracy, etc., with which a watermark signal is detected or with which auxiliary data is decoded. For example, the signal processing phase 600*a* may be initially executed using one more parameters that are optimized or otherwise suitable for watermark detection. Once a watermark signal has been detected (e.g., as indicated by the watermark detector output by the watermark detector module 502), the signal processing phase 600*a* may be re-executed using one more parameters that are optimized or otherwise suitable for decoding of auxiliary data. In some cases, reconfiguring the signal processing phase 600*a* can also result in reducing the amount of resources (e.g., in terms of number of computations required, complexity of computations required, instructions per second required, memory requirements, power usage, etc.) that would have otherwise been required or otherwise consumed to process the audio input according one standard configuration.

In another embodiment, multiple signal processing modules may be employed, where one signal processing module (e.g., a first signal processing module) is configured to execute a signal processing phase 600*a* using parameters that are suitable or otherwise optimized for watermark detection and another signal processing module (e.g., a second signal processing module) is configured to execute a signal processing phase 600*a* using parameters that are suitable or otherwise optimized for decoding of auxiliary data. In this embodiment, the first signal processing module may be activated to execute a signal processing phase 600*a* using one more parameters process that are optimized or otherwise suitable for watermark detection. Once a watermark signal has been detected (e.g., as indicated by the watermark detector output by the watermark detector module 502), the second signal processing module may be activated to execute a signal processing phase 600*a* using one more parameters process that are optimized or otherwise suitable for decoding of auxiliary data.

a. Example Processing Parameters

In one embodiment, an example parameter that may optimized or otherwise suitably selected for watermark detection or decoding of auxiliary data is a frequency spectrum of the sampled audio input computed at the transform stage 604, where the frequency spectrum to be computed in support of a watermark detection process is different from that to be computed in support of a decoding process. For example, one or more first sub-bands of the frequency spectrum (e.g., with each sub-band only spanning a frequency range of 2 kHz, 4 kHz, etc.) may be computed in support of a watermark detection process whereas and one or more second sub-bands of the frequency spectrum (or the entire frequency spectrum) may be computed in support of a decoding process. In this case, each first sub-band could correspond to a location in the frequency spectrum where a watermark signal or a portion thereof (e.g., a version identifier, etc.) is, or is otherwise expected to be, found. In another example, a sparse FFT could be used to compute the frequency spectrum of the frame where a portion of the watermark signal (e.g., the version identifier, etc.) could be found or is otherwise expected to be found. The frequency sub-band to be computed may be predetermined, or may be determined after first examining the frequency content of the audio input frame.

In another embodiment, an example parameter that may optimized or otherwise suitably selected for watermark detection or decoding of auxiliary data is a resolution of an FFT applied to the audio input during the transform stage 604. For example, an FFT applied in support of a watermark detection process can have a relatively coarse resolution (e.g., a 512- or 256-point FFT) and an FFT applied in support of a watermark decoding process can have a relatively fine resolution (e.g., a 1024-point FFT).

ii. Pilot and Auxiliary Data Signals, and Other Aspects of Watermark Signals

In addition to (or as alternative to) configuring the signal processing phase 600*a* according to one or more parameters such as those described above, a watermark signal may be constructed so as to have one or more characteristics that facilitate quick and efficient detection by the watermark detector module 502. For example, the watermark signal can be constructed such that a portion thereof (e.g., the portion of the watermark conveying the version identifier, etc.) is present within a frequency sub-band corresponding to a set of relatively low-frequency FFT bins or other FFT bins that provide for suitable or desirable computational simplification. In this sense, the watermark signal can be characterized as including a "pilot signal." By constructing the watermark signal as described above, the audio input can be initially sampled at a lower sampling rate (e.g., lower than 16 kHz) and may also allow for one or more relatively small FFTs to be used at the transformation stage 604 in support of a watermark detection process.

In another embodiment, a watermark signal may be constructed simply to be detected, and need not convey auxiliary data for decoding. In this context, such a watermark signal may also be referred to as a "pilot signal." The pilot signal may be constructed as a frequency-domain audio watermark signal employing an adjacent-frame, reversed embedding modulation scheme (e.g., such as that exemplarily described in aforementioned U.S. Patent App. Pub. No. 2014/0142958) and may be represented by a multi-bit sequence having bits that are mapped to one or more particular frequency sub-bands (e.g., in a range spanning 0 to 2 kHz, etc.).

In another embodiment, one or more characteristics of the pilot signal may be different from another watermark signal conveying auxiliary data (also referred to herein as an "auxiliary data signal"). For example, both the pilot signal and the auxiliary data signal may be characterized as a frequency-domain audio watermark signal, but the tile size of the pilot signal may be less than that of the auxiliary data signal. In another example, the pilot signal may be provided as a time-domain watermark signal whereas the auxiliary data signal may be provided as a frequency-domain watermark signal (e.g., of the type exemplarily described above). Exemplary details of time-domain audio watermark signals are described in aforementioned U.S. Patent App. Pub. No. 2014/0142958. In another example, the pilot signal may be provided as a single-bit watermark signal whereas the auxiliary data signal can be provided as a multi-bit watermark signal.

In these embodiments, a first instance of a signal processing phase 600a may be executed to support a watermark detection process performed by the watermark detector module 502 (i.e., implemented to detect the presence of a pilot signal in the audio input). Once a pilot signal has been detected (e.g., as indicated by the watermark detector output by the watermark detector module 502), a second instance of a signal processing phase 600a may be executed to support a decoding process performed by the watermark decoder module 802 (i.e., implemented to decode auxiliary data constructed into a watermark signal encoded in the audio input). In one embodiment, the second instance of the signal processing phase 600a may be performed immediately once pilot signal is detected. Alternatively, the second instance of the signal processing phase 600a is executed only after a predetermined period of time has passed. In this case, the pilot signal acts to indicate when a watermark signal conveying decodable auxiliary data will be present within the audio input.

III. Policies

As generally used herein, a "policy" refers to the manner with which an associated component of the electronic device writes, reads, loads, stores, encodes, decodes, samples, compresses, decompresses, filters, or otherwise processes signals or other data generated by (or otherwise received by) one or more components of the electronic device. A policy can also refer to the manner with which an associated item of system software, application software, middleware, etc., supported by the electronic device is invoked, run or terminated (or which item of system software, application software, or middleware is invoked, run or terminated). A policy can also refer to the manner with which any associated item of system software, application software, middleware, software component, etc., reads, copies, stores, creates, alters, deletes, outputs, downloads, or uploads information or otherwise operates (e.g., based upon one or more computer files, software components, etc.). A policy can also refer to the manner in which any computer file is read, copied, stored, created, altered, deleted, downloaded, uploaded, or otherwise operated upon). A policy can also refer to the manner with which signals or other data are routed between components or software items of the electronic devices (e.g., in terms of specifying one or more components or software items to receive such signal or data, in terms of specifying when or how often such signal or data is routed, or the like or any combination thereof), the manner with which such signals or data are communicated outside the electronic device (e.g., via one or more communications links available through the communications module 114, via a user output device 110 such as a display, loudspeaker, haptic actuator, etc., or the like or any combination thereof), or whether such signals or data are routed or communicated at all. Thus, the term "policy" is broadly construed to refer to any aspect (or any combination of aspects) relating to the operation or function of one or more associated components or software items of the electronic device.

Policies can be embodied in hardware, firmware, in BIOS associated with one or more components of the electronic device, in one or more items of system software, application software, middleware, etc., in one or more computer files, software components, etc., or the like or any combination thereof. Policies can also be embodied as one or more identifiers, variables, limits, addresses, address formats, conditions, values, settings, program instructions, subroutines, rules, conventions, data formats, detection of transmission errors, acknowledgements, protocols, protocol stacks, or the like or any combination thereof. Software in which a policy is embodied can be stored in ROM, volatile memory 104, storage memory 106, or other memory device local to or otherwise accessible to the component or item of software associated with the policy. When stored within a computer file, software component, etc., a policy may be optionally identified by one or more associated identifiers (each also generically referred to herein as a "policy identifier"). In one embodiment, one or more policies can be represented as a specific type of auxiliary data (e.g., that has been decoded from a detected watermark signal).

Examples of protocols include any of those associated with one or more models or protocol suites such as the Open Systems Interconnection (OSI) model, the Transmission Control Protocol/Internet Protocol (TCP/IP) model, one or more power management protocols (e.g., the Advanced Configuration and Power Interface (ACPI), the System Power Management Interface (SPMI), the Power Management Bus (PMBus) protocol, the Active State Power Management (ASPM) protocol, etc.), the Internet protocol suite, the Distributed Component Object Model, or the like or any combination thereof. In another embodiment, one or more protocols embodied by a policy may be characterized as one or more network protocols, inter-process communication (IPC), remote procedure calls (RPC) and other communication protocols (e.g., including interaction protocols describing communication scenarios between individual agents in heterogeneous multi-agent systems), interoperability protocols, signaling protocols, process automation protocols, building automation protocols, industrial control system protocols, power system automation tools, automatic meter reading protocols, vehicle bus protocols, one or more Bluetooth protocols (e.g., including one or more controller stack protocols, one or more host stack protocols, etc.), or the like or any combination thereof. Specific examples of protocols include CANopen, Controller Area Network (CAN), Datagram Congestion Control Protocol (DCCP), D-Bus, DeviceNET, DNP3, Dynamic Data Exchange (DDE), EnOcean, Etch, EtherCAT, Ethernet, FAST RPC, File Transfer Protocol (FTP), FlexRay, General Inter-ORB protocol (IIOP), Hypertext Transfer Protocol (HTTP), Hypertext Transfer Protocol Secure (HTTPS), IEBus, IEEE 802.11-series protocols, Internet Protocol (IP), Java remote method invocation (RMI), Local Interconnect Network (LIN), MTConnect, OPC Unified Architecture, Open Building Information Exchange (oBIX), Open Smart Grid Protocol (OSGP), Real-Time Publish Subscribe (RTPS), Real-Time Transport protocol (RTP), RTP Control Protocol (RTCP), Secure Real-time Transport Protocol (SRTP), Session Description Protocol (SDP), Session Initiation Protocol (SIP), Simple Mail Transfer Protocol (SMTP), SOAP, Stream Control Transmission Protocol (SCTP), Transmission Control Protocol (TCP), USB, User Datagram Protocol (UDP), XML-RPC, ZigBee, one or more interaction protocols such as those described in Charif et al. "An Agent Interaction Protocol for Ambient Intelligence," published in *Intelligent Environments*, 2006, $2^{nd}$ IET International Conference on Intelligent Environments—IE 06, Vol. 1, 2006, etc., or the like or any combination thereof.

Policies can be set by the manufacturers of the electronic device (or components thereof), by providers of the system software, application software or middleware, by the user(s) of the electronic device, or the like or any combination thereof. In one embodiment, one or more policies can be set by entities associated with the production, distribution, performance, creation, promotion, etc., of the sound or other audio data from which the aforementioned audio input was derived.

A. Power Management Policies

One set of policies (also referred to herein as "power management policies") specify the manner with which the power and performance states of the components for the electronic device are configured and controlled. Power management policies can be implemented (e.g., at a power management module, etc.) as specified by the ACPI and the protocols specified therein.

As part of its power management standard, the ACPI specification defines: global system states (i.e., G0, G1, G2 and G3) that apply to the system of the electronic device and are visible to the user; specific types of global sleep states (i.e., S1, S2, S3, S4 and S5); device power states (D0, D1, D2, D3hot and D3) that may apply to one or more components (each also referred to herein as a "component device") such as the user interface module 108, a user input device 110, a user output device 112, a camera 120, the audio I/O module 122, a microphone 124, a sensor 132, the cue detection module 134, or the like or any combination thereof; processor power states (i.e., C0, C1, C2, C3 and C4(0), C4(1), . . . , C4(m), where states C2 to 4(m) are optional and where "m" represents any number of desired states) that are power consumption and thermal management states applied to one or more or all components (also referred to herein as "component processors") that execute instructions (e.g., the CPU 102, ISP 116, GPU 118, audio DSP 128, sensor interface module 130, or the like or any combination thereof) when the system is in the global working state G0; and processor and device performance states (i.e., P0, P1, P2, . . . , Pn) that are power consumption and capability states within the state C0 (for a component processor) or D0 (for a component device).

For more information on the ACPI, the reader is referred to the Advanced Configuration and Power Interface Specification, Rev. 5.0, Errata A, published Nov. 13, 2013. Although power management policies have been described as being implemented according to the ACPI, it will be appreciated that power management policies may also (or alternatively) be implemented according to one or more other protocols, specifications or architectures such as SPMI, the PMBus protocol, the ASPM protocol, or the like or any combination thereof.

B. Delivery Control Policies

Another set of policies (also referred to herein as "delivery control policies") specifies the manner in which output generated by any of the aforementioned modules of the cue detection module 134 (e.g., the audio activity detector module 202, the watermark detector module 502, the watermark decoder module 802, etc.) is delivered (e.g., from the module that generated the output). A delivery control policy can also specify that such output (also generically referred to herein as "cue detection output") should not be delivered at all (or should not otherwise be stored on the electronic device). As used herein, the term "cue detection output" refers not only to the signal, message or other data obtained as a result of performing the final stage of any process applied to the audio input (e.g., the audio activity determination stage 320, the signal detection stage 614/temporal gating stage 616, the SNR gating stage 910/temporal gating stage 912, etc.), but also refers to any signal, message or other data obtained as a result of performing any stage of any process applied to the audio input (e.g., including the signal detection stage 614, the version identification stage 902, etc.). Accordingly, cue detection output can also include information identifying any version correlation metric determined (e.g., at stage 614) to exceed a threshold correlation value, any version identifier used to construct a detected watermark signal (e.g., as determined at stage 902), or the like or any combination thereof.

In one embodiment, a delivery control policy can specify the mode (e.g., push, pull, etc.) by which the cue detection output is to be delivered. A delivery control policy specifying a push mode of delivery can be stored within a memory device associated with (or accessible to) the module responsible for delivering the cue detection output. A delivery control policy specifying a pull mode of delivery can be stored within a memory device associated with (or accessible to) the target component or target software, within a memory device associated with (or accessible to) the module responsible for generating the cue detection output, or the like or any combination thereof.

In another embodiment, a delivery control policy can specify one or more target component(s), item(s) of target software or any combination thereof, to which the cue detection output is to be delivered. In one embodiment, a target component can be any component of the electronic device. In another embodiment, a target component includes the CPU 102, the volatile memory 104, the storage memory 106, the user interface module 108, a user output device 112, the communications module 114, the audio I/O module 122, the audio DSP 128, the sensor interface module 130, or the like or any combination thereof. In another embodiment, however, a target component does not include the CPU 102. If not included in the cue detection module 134, components such as the song recognition module, the speech recognition module and the voice recognition module may also be considered target components. In one embodiment, target software can be any item of software executable on the electronic device, stored on the electronic device or otherwise accessible to the electronic device (e.g., via a combination of the communications module 114 and an application program such as a web browser).

In another embodiment, a delivery control policy can specify the immediacy with which cue detection output is to be delivered. For example, cue detection output can be delivered (e.g., via a push mode) immediately (or as soon as possible, e.g., within the next few clock cycles), within a predetermined time after the particular cue detection output has been generated, upon the occurrence of some predetermined event, or the like or any combination thereof. In these examples, the predetermined time, event, etc., may be set by the user of the electronic device, by an operating system associated with the electronic device, by an item of target software, or the like or any combination thereof. Numerous example embodiments describing aspects of delivery control policies are described below. It will be appreciated that the cue detection module 134 (or any of the modules included therein) may be governed by one or more of any of these policies.

In the event that the cue detection output is to be delivered according to a push mode and an associated target component is in a deactivated state (or in an "idle," "sleep" or other low power state), then the module "pushing" the output to the target component can preliminarily transmit a signal (e.g., an enable signal) or other command or request directly to the target component to "wake up" or otherwise activate the target component. Alternatively, the signal, command or request can be transmitted (e.g., from the module pushing the cue detection output) to another component (e.g., the power management module, the user interface module 108, the audio DSP 128, the sensor interface module 130, etc.) which is responsive to "wake up" or otherwise activate the target component. Examples of cue detection output that might be desirably delivered via a push mode can include audio activity of a type corresponding to ambulance sirens, gun shots, breaking glass, vehicle motion alarms (e.g., of the type intended to warn passersby of vehicles moving in reverse, etc.), auxiliary data associated with time-sensitive information, alerts, emergencies, etc., or the like or any combination thereof.

In the event that the cue detection output is to be delivered according to a pull mode, such output may be stored (e.g., in a computer file), published (e.g., to a message queue, etc.) or otherwise retained (e.g., within any cache, buffer or other local memory device) at the specific module that generated the cue detection output or elsewhere within the cue detection module 134, at another component (e.g., the audio DSP 128, the sensor interface module 130, etc.), or the like or any combination thereof. The target component or target software can thereafter pull (or attempt to pull) the cue detection output periodically (e.g., after polling the cue detection module 134 or one or more modules of the cue detection module 134, etc.), after the occurrence of an event (e.g., upon a transition at the target component from an "idle," "sleep" or other low power state to a higher-power state, etc.), or the like or any combination thereof. In one embodiment, the target component or target software can pull (or attempt to pull) the cue detection output upon receiving a supplemental signal, message or other data (e.g., pushed from the cue detection module 134 or other module or component responsible for generating, storing, publishing, etc., the cue detection output) indicating that such output has been generated, stored, published, etc. Examples of cue detection output that might be desirably delivered via a pull mode include audio activity indicating the presence of speech, a song, a movie, etc., auxiliary data associated with non-time-sensitive information, or the like or any combination thereof.

In one embodiment, a delivery control policy may correspond to the particular module from which the cue detection output was generated. For example, audio activity detector output may be delivered in accordance with a first delivery control policy, watermark detector output may be delivered in accordance with a second delivery control policy and watermark decoder output may be delivered in accordance with a third delivery control policy, wherein one or more aspects of at least two of the first, second and third delivery control policies are different from one another. In this example, the first delivery control policy might specify one or more target components such as the CPU 102, the audio DSP 128, the sensor interface module 130 (or a song recognition module, speech recognition module or voice recognition module, if such components are not part of the cue detection module 134), one or more associated items of target software that is executable or stored on (or otherwise accessible to) such target component(s), or the like or any combination thereof. However, the second delivery control policy might specify one or more target components such as the CPU 102, the audio DSP 128 and the sensor interface module 130 (as well as one or more associated items of target software), and the third delivery control policy might specify one or more target components such as the CPU 102, the ISP 116, the GPU 118, the audio I/O module 122, the audio DSP 128, and the sensor interface module 130 (as well as one or more associated items of target software). Likewise, the first delivery control policy might specify that audio activity detector output should always be delivered according to a pull delivery mode, whereas the second delivery control policy might specify that watermark detector output should always be delivered according to a pull delivery mode and the second delivery control policy might specify that watermark detector output should always be delivered according to a push delivery mode. The immediacy specified by the first, second and third delivery control policies may likewise be the same or different. It will be appreciated that the above-described aspects of the first, second and third delivery control policies is exemplary only, and that any of the first, second and third delivery control policies may be characterized by one or more different aspects.

In another embodiment, a delivery control policy may correspond to one or more characteristics of the cue detection output (also referred to herein as "cue detection output characteristics"), and such a delivery control policy can be stored (e.g., as discussed above) in association with one or more of such cue detection output characteristics. As used herein, a cue detection output characteristic can refer to the size (e.g., bit length) of the cue detection output (e.g., which may correspond to module that generated the cue detector output), the presence of a particular symbol or combination of symbols in the cue detection output (e.g., anywhere within the cue detection output, in one or more predefined regions of the cue detection output, etc.), or the like or a combination thereof. A particular symbol or combination of symbols present in the cue detection output may identify the module that generated the cue detector output, the time (e.g., in terms of time-of-day, day-of-year, etc.) the cue detection output was generated, the type of audio activity detected, or the like or any combination thereof.

For example, audio activity detector output may be delivered in accordance with one (or more) of a plurality of first delivery control policies, watermark detector output may be delivered in accordance with one (or more) of a plurality of second delivery control policies and watermark decoder output may be delivered in accordance with one (or more) of a plurality of third delivery control policies. In this example, audio activity detector output indicating at least a threshold amount of speech-type audio activity may be delivered in accordance with one of the first delivery control policies, and audio activity detector output indicating at least a threshold amount of song-type audio activity may be delivered in accordance with another, different first delivery control policy. Likewise, selection of one or more second delivery control policies to apply to watermark detector output may be based upon factors such as the number of version correlation metrics determined (e.g., at aforementioned stage 614) to exceed the threshold correlation value, the highest version correlation metric determined (e.g., at aforementioned stage 614) to exceed the threshold correlation value, or the like or any combination thereof. Similarly, selection of one or more third delivery control policies to apply to watermark decoder output may be based upon factors such as those described above with respect to delivery of the watermark detector output or upon other factors such as the version of the protocol used to construct auxiliary data into a detected watermark signal (e.g., as identified at aforementioned stage 902), the number of different version identifiers identified (e.g., at aforementioned stage 902), the presence (or absence) of certain types of auxiliary data decoded from a detected watermark signal (e.g., as output from stage 910 or 912), or the like or any combination thereof. It will be appreciated that the above-described aspects of the first, second and third delivery control policies is exemplary only, and that any of the first, second and third delivery control policies may be characterized by one or more different aspects.

In another embodiment, a delivery control policy may correspond to additional information such as the number of times any cue detection output has been generated by one or more modules of the cue detection module 134, the number of times one or more specific types of cue detection output has been generated, the frequency with which any cue detection output (or one or more specific types of cue detection output) has been generated. As used herein, a "type" of cue detection output can refer to audio activity detector output indicating that at least a threshold level of audio activity is present, audio activity detector output indicating that at least a threshold level of speech-type audio activity is present, audio activity detector output indicating that at least a threshold level of song-type audio activity is present, watermark detector output indicating that a watermark signal has been detected, watermark decoder output indicating that a watermark signal has been decoded, watermark decoder output including decoded auxiliary data, other output indicating a version identifier, or the like or any combination thereof. (Tracking of the number or frequency of cue detection output generation may be initiated and performed over a period of time based on user preferences, based on policies associated with one or more operating systems, application programs, middleware, etc., which are configured to subscribe to, read, copy, store, alter, upload, use, etc., the cue detection output.) Such additional information may be generated and stored within a memory device local to the cue detection module 134 or elsewhere (e.g., within volatile memory 104, non-volatile memory 106, the audio DSP 128, the sensor interface module 130, etc.). In this embodiment, a delivery control policy may specify that, unless the number or frequency of any generated cue detection output (or one or more specific types of generated cue detection output) exceeds a threshold amount (e.g., one cue detection output generated per second), cue detection output that would normally delivered via a push mode should be delivered via pull mode.

In another embodiment, a delivery control policy may correspond to additional information obtained or otherwise derived from signals or other data generated by any of the other components of the electronic device (e.g., the CPU 102, the user interface module 108, a user input device 110, the communications module 114, the ISP 116, the audio DSP 128, a camera 120, the sensor interface module 130, a sensor 132, a power management module, or the like or any combination thereof), or by generated by system software, application software, middleware, etc., running on (or otherwise controlling an operation of) any component of the electronic device, or written to or otherwise contained in or represented by any software component, computer file, etc., or the like or any combination thereof. For example, a delivery control policy may correspond to information (e.g., indicative of the charge state of a battery in the electronic device) communicated from the power management module to the cue detection module 134 and may specify that, unless the charge state of the battery is above a threshold charge state (e.g., corresponding to a 10% charge state, etc.), cue detection output that would normally delivered via a push mode should be delivered via pull mode.

When a delivery control policy depends upon one or more cue detection output characteristics, one or more items of additional information, or the like or any combination thereof, the delivery control policy may be stored (e.g., on a memory device), within a computer file, software component or other data structure so as to be associated with or indexed according to the one or more cue detection output characteristics, additional information, etc., upon which the delivery control policy depends.

i. Delivery of Cue Detection Output

In one embodiment, the cue detection module 134 may include a delivery management module such as delivery management module 1002 shown in FIG. 10, which is configured to analyze the cue detection output to discern one or more characteristics thereof, and thereafter execute delivery of the cue detection output in accordance with one or more delivery control policies associated with the discerned characteristic(s). In another embodiment, the delivery management module 1002 is additionally or alternatively configured to execute delivery of the cue detection output in accordance with one or more delivery control policies associated with any of the aforementioned additional information.

The delivery management module 1002 includes a microprocessor, digital signal processor (e.g., a fixed-point DSP, floating-point DSP, or a combination thereof) or other microcontroller, programmable logic device, or any other processor typically consuming less power than the CPU 102 when in an active or working state. Optionally, the delivery management module 1002 includes cache or other local memory device (e.g., volatile memory, non-volatile memory or a combination thereof), DMA channels, one or more input buffers, one or more output buffers, and any other component facilitating the functions it supports.

The delivery management module 1002 and any of the audio activity detector module 202, the watermark detector module 502 and the watermark decoder module 802 may be at least partially implemented on shared, common hardware components, or may be fully implemented on completely separate hardware components. Further, the cue detection module 134 may include a delivery management module 1002 for each component of the cue detection module 134 (e.g., such as the aforementioned audio activity detector module 202, watermark detector module 502, watermark decoder module 802, etc.) or may include at least one delivery management module 1002 for two or more (or all) components of the cue detection module 134. Thus, a single delivery management module 1002 may analyze the cue detection output generated by one or more (or all) components of the cue detection module 134. Although the delivery management module 1002 is illustrated as a part of the cue detection module 134, it will be appreciated that the delivery management module 1002 may be a part of one or more other components of the electronic device (e.g., the CPU 102, the user interface module 108, the audio I/O module 122, the audio DSP 128, the sensor interface module 130, or the like or any combination thereof).

In one embodiment, the delivery management module 1002 and one or more of the audio activity detector module 202, the watermark detector module 502 and the watermark decoder module 802 are part of the same electronic device. In another embodiment, however, the delivery management module 1002 is part of one electronic device (e.g., a first electronic device) and one or more of the audio activity detector module 202, the watermark detector module 502 and the watermark decoder module 802 are part of one or more other electronic devices (e.g., one or more second electronic devices) physically separate from the first device but communicatively coupled to the first electronic device (e.g., via one or more wired or wireless links as discussed above). In this embodiment, the first electronic device may be any of the aforementioned portable electronic devices, and the second electronic device(s) may also be any of the aforementioned portable electronic devices or may be a desktop computer, a server (e.g., an application server, a cloud server, a base-station server, or the like or any combination thereof), or the like or any combination thereof.

In one embodiment, the delivery management module 1002 is activated either automatically or manually, continuously or periodically, in a manner as similarly described with respect to the audio activity detector module 202, the watermark detector module 502, the watermark decoder module 802, or the like or any combination thereof. In another embodiment, the delivery management module 1002 is activated automatically whenever the audio activity detector 202, the watermark detector module 502 or the watermark decoder module 802 is activated. In yet another embodiment, the delivery management module 1002 is activated automatically whenever audio activity detector output, watermark detector output or watermark decoder output is communicated or delivered. In this case, the delivery management module 1002 can be communicatively coupled to the output of the audio activity detector module 202, the watermark detector module 502 or the watermark decoder module 802, or otherwise be configured to receive output from any of such modules.

When activated, the delivery management module 1002 can, in one embodiment, analyze the cue detection output to discern one or more cue detection output characteristics. The delivery management module 1002 may then look up any discerned cue detection output characteristic(s) (e.g., in one or more computer files, software components, etc., stored within a memory device local to the delivery management module 1002, within a memory device local to the module that generated the cue detection output or otherwise local to the cue detection module 134, within a memory device local to the audio DSP 128 or the sensor interface module 130, within the volatile memory 104, the storage memory 106, cue detection module 134, or the like or any combination thereof) to identify one or more delivery control policies associated with cue detection output characteristic(s) that match one or more discerned cue detection output characteristics. In another embodiment, the look-up may be performed relative to any of the aforementioned additional information (e.g., to identify one or more delivery control policies associated with cue detection output characteristic(s) that match one or more items of additional information). Thereafter, the delivery management module 1002 executes delivery of the cue detection output in accordance with one or more of the identified delivery control policies.

ii. Example Delivery Process

Figure 11:
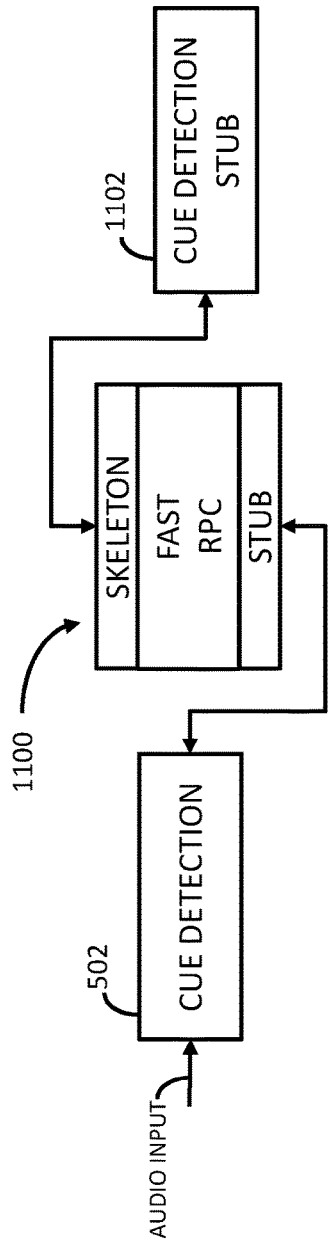
FIG. 11 schematically illustrates a distributed object communication process between the cue detection module shown in FIG. 1 and one or more other components of the electronic device shown in FIG. 1.

Having exemplarily described the delivery management module 1002 and example implementations of delivery control policies above, an exemplary process by which cue detection output can be delivered is provided with respect to FIG. 11.

Referring to FIG. 11, the cue detection module 134 (which may be configured as exemplarily described with respect to any of FIGS. 1 to 9) processes received audio input. Audio input may be processed according to one or more processes such as the audio activity detection process 300 or 400, the watermark detection process 600, the watermark decoding process 900, or the like or any combination thereof. An inter-process communication 1100 (e.g., a FAST Remote Procedure Call (RPC), etc.) is then used to transmit cue detection output (e.g., generated as a result of, or during the course of, the processing) to a cue detection stub 1102 running on a target component or otherwise supported by a target software item. In one embodiment, the cue detection stub 1102 runs on the CPU 102, the communications module 114, the ISP 116, the GPU 118, the audio I/O module 122, the audio DSP 128, the sensor interface module 130, the camera 120, microphone 124 or other sensor 132, or the like or any combination thereof.

Generally, the inter-process communication 1100 is used based on the based on a currently-embodied policy associated with the delivery manager module 1102, associated with the target component or software item, or the like or a combination thereof. Although the inter-process communication 1100 is described herein as a FAST RPC, it will be appreciated that the cue detection output may be delivered according to one or more other suitable inter-process communication schemes involving a message queue, publish-subscribe messaging patterns, etc. Further, inter-process communication 1100 may be initiated, invoked, triggered, etc., by the delivery management module 1002 (or other module of the cue detection module 134), by a middleware interface between the delivery management module 1002 (or other module of the cue detection module 134), or the like or any combination thereof.

After the cue detection output is delivered to the cue detection stub 1102, the cue detector output can be published, or otherwise read, copied, stored, altered, uploaded, used, etc., by the target component or by the target software item (e.g., either alone or in conjunction with one or more computer files, software components, etc.) executable by or accessible to the target component. In one embodiment, the cue detection output is encrypted or otherwise encoded to prevent it from being accurately read or otherwise interpreted by components other than the target component or software item.

iii. Delivery Control via Auxiliary Data

As discussed above, the delivery management module 1002 can analyze, as a specific type of cue detection output, auxiliary data that has been decoded as a result of performing a watermark decoding process. One type of auxiliary data conveyed by a detectable watermark signal can include delivery control data that corresponds to one or more delivery control policies already associated with the delivery management module 1002. In this case, the delivery control data is embodied as one or more delivery control identifiers constructed into the watermark signal (e.g., at fixed or variable regions of the auxiliary data). If, upon analyzing cue detection output, the delivery management module 1002 discerns one or more delivery control identifiers within cue detection output containing decoded auxiliary data, the delivery management module 1002 can look up the discerned delivery control identifier(s) (e.g., in a memory device local to the delivery management module 1002 or the watermark decoder module 802, or otherwise local to the audio DSP 128, the sensor interface module 130, the cue detection module 134, or the like or any combination thereof) to identify one or more delivery control policies associated with delivery control identifier(s) that match one or more discerned delivery control identifiers. Thereafter, the delivery management module 1002 executes delivery of the cue detection output (e.g., auxiliary data contained in watermark detector output) in accordance with the one or more identified delivery control policies.

iv. Policy Control via Auxiliary Data

Another type of auxiliary data conveyed by a detectable watermark signal can include policy control data. In one embodiment, policy control data can be embodied as one or more symbols constructed into the watermark signal (e.g., at fixed or variable regions of the auxiliary data). If, upon analyzing cue detection output, the delivery management module 1002 discerns policy control data, the delivery management module 1002 delivers the policy control data according to a currently-embodied delivery control policy. Such a currently-embodied delivery control policy may, for example, specify that policy control data is to be delivered immediately (or as soon as possible), via a push delivery mode, to one or more target components, software items, etc. In another example, a currently-embodied delivery control policy associated with the delivery management module 1002 may specify that discerned policy control data is to be delivered in accordance with a delivery control policy associated with delivery control data accompanying the policy control data.

a. Current Policy Control Data

One type of policy control data (i.e., "current policy control data") represents one or more policies (e.g., one or more power management policies, delivery control policies, or the like or any combination thereof) that are presently or currently embodied within with one or more components of the electronic device, within one or more items of software stored on the electronic device, within one or more items of software accessible to the electronic device, or the like or any combination thereof. Current policy control data can identify a currently-embodied policy (e.g., via an associated policy identifier) and include an associated policy control identifier indicating an action to be taken with respect to the identified policy. Exemplary actions that may be taken with respect to an identified policy include disabling a policy or enabling a policy. When a policy is disabled, a component or software item associated with that policy will not perform an operation that it otherwise would or could have if the policy was enabled.

Instead of (or in addition to) including a policy control identifier, the current policy control data can, in another embodiment, include one or more IP addresses, URLs, database indexes or other direct or indirect links, or the like or any combination thereof, to one or more policy control identifiers. In another embodiment, the policy control data can include one or more IP addresses, URLs, database indexes or other direct or indirect links, or the like or any combination thereof, to information identifying a policy.

In one example embodiment, policies that can be disabled or enabled include policies specifying how (or whether) an operation of one or more components, software items, etc., is controlled based on one or more commands, signals or other messages generated by or otherwise transmitted from another component or software item. For example, current policy control data can specify that one or more policies permitting activation of a camera 120 (or permitting activation of a user output device such as a display, loudspeaker, haptic actuator, etc., or permitting control of one or more data transmission functions of the communications module 114, or permitting control of one or more application program for recording captured audio, rendering media content, texting, sending emails, etc., or the like or any combination thereof) based on one or more commands, signals or other messages generated by or otherwise transmitted from the user interface module 108 (or from one or more user input devices 110 such as a touch screen, or from the power management module, etc.) should be disabled or enabled.

In another example embodiment, policies that can be disabled or enabled include policies specifying which communication link(s) available via the communications module 114 (e.g., via one or more communication links such as WiFi, Bluetooth, Bluetooth Low Energy, cellular 3G, visible-light communication, ultrasonic communication, or the like or any combination thereof) can be used to transmit or receive information. Similarly, policies that can be disabled or enabled, can include policies specifying which communication link(s) can be used to transmit one or more particular types of information. In this case, a "type of information" can be classified according to the component or software item it was generated or output from, according to the component or software item to which it is to be delivered (e.g., via header or routing data associated with the information, etc.), according to its data format, size, etc., or the like or any combination thereof.

Once delivered, the current policy control data is analyzed, parsed, or otherwise processed (e.g., by the target component or software item) to discern the policy identified therein, as well as the policy control identifier. Then, by reference to the discerned policy control identifier, the target component or software can take an action with respect to the identified policy (e.g., disable the identified policy, enable the identified policy, etc.). In one embodiment, the target component or software can perform a look-up of the delivered policy control identifier or policy identifier (e.g., in a computer file, in a software component, etc.) to discern an action to be taken with respect to the identified policy.

In embodiments in which the current policy control data is embodied as an IP address, URL, database index or other link (e.g., a direct link or an indirect link), etc., to one or more of the aforementioned policy control identifiers, then the target component or software item (or software item associated therewith) can establish a communication link to a remote database (e.g., via the communications module 114) to retrieve the linked-to policy control identifier(s), policy identifiers, etc. The target component or software can thereafter take an action with respect to the policy based, at least in part, on the retrieved information.

b. Updated Policy Control Data

Another type of policy control data is updated policy control data, which represents one or more policies (also referred to as "updated policies"), that are not currently embodied but should be (or are available to be embodied within the electronic device). An updated policy can be embodied by replacing a currently-embodied policy, or by simply augmenting a set of currently-embodied policies. Updated policy control data include one or more updated policies, one or more policy identifiers each associated with one or more updated policies, one or more IP addresses, URLs, database indexes or other direct or indirect links, or the like or any combination thereof, each to one or more updated policies. In one embodiment, updated policy control data can include one or more policy identifiers each associated with one or more currently-embodied policies.

Once delivered, the target component or software item operates to embody the updated policy included within the updated policy control data (e.g., within the target component or software item, or elsewhere within the electronic device) by adding the updated policy to a set of policies that are currently embodied at the target component or software item (or elsewhere within the electronic device). In embodiments in which the updated policy control data also includes a policy identifier associated with the updated policy, then this policy identifier can be stored (e.g., in a computer file, in a software component, etc., that is associated with or otherwise accessible to the target component or software item).

In embodiments in which the updated policy control data also includes a policy identifier associated with one or more currently-embodied policies, then the updated policy control data can be analyzed, parsed, or otherwise processed (e.g., by the target component or software item) to discern the policy identifier and replace the currently-embodied policy associated therewith, with the updated policy. In one embodiment, the target component or software can perform a look-up of the delivered policy identifier (e.g., in a computer file, in a software component, etc.) to discern which currently-embodied policy is to be replaced by the updated policy.

In embodiments in which the updated policy control data includes an IP address, URL, database index or other link (e.g., a direct link or an indirect link), etc., to one or more updated policies, then the target component or software item (or software item associated therewith) can establish a communication link to a remote database (e.g., via the communications module 114) to retrieve one or more updated policies (and, optionally, any policy identifiers associated therewith). Once retrieved, the one or more updated policies can be embodied (e.g., by the target component or software item, or elsewhere within the electronic device) as discussed above.

IV. Division of Computing Labor

Processes executed by one or more components such as the above-described audio activity detector module 202, the watermark detector module 502, the watermark decoder module 802, the signal processing module and the delivery management module 1002, the song recognition module, the speech recognition module, the voice recognition module, etc., can be executed locally, remotely or a combination thereof. Likewise, processes executed by other of the aforementioned components (e.g., the CPU 102, the audio I/O module 122, the audio DSP 128, the sensor interface module 130, etc.) may be executed locally, remotely or any combination thereof. Processes executed by the CPU 102 may include applications such as mobile apps.

Processes executed "locally" are executed by one or more portable electronic devices (each also referred to as a "local device") to which the user has current physical access. Examples of local devices include a smartphone currently being carried by a user, a smartwatch currently being worn by a user, etc. Processes executed "remotely" are executed by one or more electronic devices (each also referred to as a "remote device") to which the user does not have current physical access. Examples of remote devices might include a user's desktop computer (e.g., when the user is at a shopping mall), a portable electronic device of somebody other than the user (but within close proximity to the user), a server (e.g., an application server, a cloud server, a base-station server, or the like or any combination thereof), or the like or any combination thereof. Typically, the remote device lacks the resource constraints (e.g., processing power, battery capacity, network communication bandwidth, memory storage capacity, etc.) present at the local device. Results of processes executed at the remote device can be transmitted back to the local device. By executing processes remotely, the processor of the local device (e.g., the CPU 102, the GPU 118, the audio DSP 128, etc.) is free to carry out other processing tasks, or to enter into a low power state which extends the useful battery life of the portable electronic device.

A process can be executed locally or remotely based on characteristics of the process itself, based on characteristics of an application associated with the process, based on characteristics of one or more of the local and remote devices, or any combination thereof. For example, a determination to execute at least a portion of a process remotely instead of locally may be made when the following inequality is satisfied:

$$P_m \times C/M > (P_{idle} \times C/S) + (P_{trx} \times D/B),$$

where C is number of instructions required to execute the process (or portion thereof), M is the instruction execution speed (in number of instructions per second) of the local device (e.g., the CPU 102), S is the instruction execution speed (in number of instructions per second) of the remote device, D is the amount of data (in bytes) related to the process to be exchanged between the local and remote devices when execution of at least the portion of the process is transferred from the local device to the remote device, B is the wireless byte transfer speed (in total number of uplink and downlink bytes exchanged per second) during wireless communication between the local device and the remote device, $P_m$ is the power consumption of the CPU 102 of the local device (in watts/second) when the CPU 102 is in an operational state (e.g., in a performance state such as P0, P1, P2, etc., as specified in the ACPI, Specification, Rev. 5.0, Errata A), $P_{idle}$ is the power consumption of the CPU 102 of the local device (in watts/second) when the CPU is in a low-power processor state (e.g., in a power state such as C1, C2, etc., as specified in the ACPI, Specification, Rev. 5.0, Errata A), and $P_{trx}$ is power consumption (in watts/second) at the local device while the local device communicates with the remote device over a wireless link. Additional information relating to many aspects of this analysis can be found in U.S. Pat. No. 8,595,289 and Kumar et al. "Cloud Computing for Mobile Users: Can Offloading Computation Save Energy?", Computer, 43(4), 2010, each of which is incorporated herein by reference in its entirety.

In another example, the determination to execute at least a portion of a process remotely instead of locally may be made when the following inequality (modified from above) is satisfied:

$$P_{avail} \times (P_m \times C_M) > (P_{idle} \times C/S) + (P_{trx} \times D/B),$$

where $P_{avail}$ is power available to the local device (e.g., whether supplied by an on-board battery, an on-board solar cell, an external AC electrical power supply, etc.) to execute processes thereat. In general, $P_{avail}$ can represent a constant or variable value that is greater than 0. If the local device is running from power supplied, for example, by an external electrical power supply battery, $P_{avail}$ can be relatively small (e.g., 0.0001, etc.) so that, essentially, all processing will occur at the local device. If the local device is disconnected from an external power supply, and is just running from power supplied by a battery, the value of $P_{avail}$ can vary depending on the discharge state of the battery (e.g., $P_{avail}$ can be relatively low if the battery is fully charged, and can grow larger—up to a value equal to or greater than 1—depending on the extent to which the battery is depleted).

In another example embodiment, processes associated with one or more items of software (e.g., including one or more processes associated with an operating system such as a high-level operating system, a mobile operating system, etc., one or more application programs, software components, etc.) supported by the local device can be transferred to the cloud computing service for execution by the remote device, regardless of a determination as described in the paragraph above. In this case, the local device evolves somewhat into a "thin client" device, essentially becoming a user interface capable of communicating with the remote device supported by the cloud computing service.

Generally, the remote device executes the same processes that are transferred by the local device. However in another embodiment, instead of executing processes that have been transferred from the local device, the remote device can execute processes that are more computationally complex versions of the transferred processes. To facilitate this, transferred processes can be identified (e.g., by a process identifier) and the cloud computing service can use the identifier to look up other processes that accomplish the same task as the transferred process but in a more computationally complex manner. In this case, numerous processes may, for example, be stored in a database accessible by the cloud computing service in association with other identifiers and indexed according to computational complexity. In another embodiment, the cloud computing service can scan the image of the local device for malware, viruses, or other malfunction and, if any such defect is identified, ameliorate it.

A. Remote Device as Virtualization of Local Device

In one embodiment, the remote device is a virtual machine, a software implementation of the local device (e.g., the user's smartphone, smartwatch, tablet computer, etc.), in which the state(s) of one or more (or all) components or software items associated with the local device are replicated, mirrored in (or otherwise correspond to the state(s) of one or more (or all) counterpart components or software items associated with) the remote device. Generically, the state of a component or software item is also referred to herein as a "device state." In one embodiment, one or more operating systems, kernels, application programs, software components, computer files, file systems, memory images, wireless baseband stacks, protocol stacks, or the like or any combination thereof, present on the user's local device is replicated or mirrored at the remote device.

The virtual machine can be implemented as an image or emulation of the local device, as a native execution of the local device, or the like or any combination thereof, run by a cloud computing service having one or more cloud servers. Techniques for virtualizing a user's local device are discussed in Chen et al. "Virtual Smartphone Over IP", 2010 IEEE International Symposium on a World of Wireless Mobile and Multimedia Networks (WoWMoM), IEEE, 2010; Chun et al. "Augmented Smartphone Applications Through Clone Cloud Execution", HotOS, Vol. 9, 2009; Satyanarayanan et al. "The Case for VM-Based Cloudlets in Mobile Computing", IEEE Pervasive Computing, 8(4), 2009, Zhao et al. "Mirroring Smartphones for Good: A Feasibility Study", Mobile and Ubiquitous Systems: Computing, Networking, and Services, 2012, each of which is incorporated herein by reference in its entirety.

i. Synchronizing the Local and Remote Devices

After a remote device has been implemented, it can be desirable to synchronize the device states of the local and remote devices. Generally, synchronization involves the transfer of data (also herein referred to as an "update") to ensure that at least one device state at one of the local and remote devices is up-to-date with the most current state of at least one counterpart device state at the other of the local and remote devices. Information to be synchronized can be transferred (e.g., via one or more network connections) from the local device to the remote device, from the remote device to the local device, or any combination thereof. In another embodiment, information to be synchronized can be transferred between the local and remote devices via one or more intermediate cloud servers (e.g., via a service such as FIREBASE, recently acquired by GOOGLE).

An update may be automatically initiated by one or both of the local and remote devices, and may be carried out according to one or more suitable communication modes (e.g., a push mode, a pull mode, etc.) and the synchronization process itself may, optionally, occur in the background of the local device. Some example embodiments of synchronizing the local and remote devices, and the contents of the synchronizing update(s), are discussed in greater detail below. It will be appreciated that these embodiments may be implemented alone or in any combination to facilitate synchronization between a local device and its virtualized doppelganger (the remote device). It will further be appreciated that a synchronization process may be initiated manually (e.g., via user interaction with the local device).

In one embodiment, an update occurs whenever the user interacts with the local device (e.g., where a user interaction can be captured or otherwise determined via the CPU 102, the user interface module 108, one or more user input devices 110, the sensor interface module 130, or the like or any combination thereof). In this embodiment, the update may be performed immediately after each user interaction (e.g., gestural input made via physical interaction with a touchscreen, press of a physical button, voice-based input made via a microphone, etc.), after a predetermined number of user interactions (e.g., 20 user interactions) have been made, after a series of user interactions have been made within a predetermined period of time (e.g., 10 minutes), etc. In another embodiment, the update may be initiated upon the occurrence of a synchronization event such as when a task performed at the local device changes, when one or more apps running in the foreground of the local device are switched, upon the completion of one or more processing operations, or the like or any combination thereof. In these embodiments, the update is initiated by the local device (e.g., at and the information to be synchronized is transferred (e.g., via a push mode) from the local device to the remote device.

In another embodiment, an update occurs whenever information (also referred to herein as "external information") is received at (or available to be accessed by) the local device (e.g., via one or more wired or wireless network connections). As used herein, external information includes any application or application update, email, push notification, streamed audio/visual content, computer file, or the like or any combination thereof. External information is also typically associated with the user or the user's local device (e.g., via an account ID, etc.). In this embodiment, the update may be performed immediately after each item of external information is received at (or becomes accessible via) the local device, after a predetermined number of external information items (e.g., 20 items) have been received at (or accessible to) the local device, etc. In another embodiment, the update may be initiated upon the occurrence of a synchronization event such as when a task performed at the local device changes, when one or more apps running in the foreground of the local device are switched, upon the completion of one or more processing operations, or the like or any combination thereof. In one embodiment, the update is initiated by the local device and the information to be synchronized is transferred (e.g., via a push mode) from the local device to the remote device. However in another embodiment, the external information is transferred from the source of the external information (e.g., an application distribution platform, email server, push notification server, streaming media server, computer file source, etc., or one or more servers intervening between such sources and the local device) to the remote device running at the cloud computing service.

In yet another embodiment, updates may be performed according one or more schedules (e.g., set in advance by the user, the cloud computing service, or otherwise associated in advance with one or more components or software items of the local device), or may be performed adaptively. Adaptive updates can be initiated based upon one or more current characteristics of the local device, the network connection(s) available to the local device, etc. For example, an update may be performed once a current charge remaining on the battery of the local device is below a set threshold (e.g., below 20% charge remaining). In this example, the update may include information obtained from a quick memory hash, a check of the last 5 accesses to a file system or databases, or the like or any combination thereof. In another example, an update may be performed whenever the local device is in a battery charge mode. In yet another example, an update may be performed based on contextual information relating to the current or future location of the local device or user behavior (e.g., including known or predicted user travel, charging schedules, meetings, appointments, etc.) as may be inferred or otherwise obtained from data (e.g., emails, photos, music, applications, meetings, appointments, physical activity data, etc.) stored on the user's local device (and, possibly, mirrored on the counterpart remote device) or otherwise accessible via one or more online accounts associated with the user or with the user's local device (and thus, possibly, assessable via the counterpart remote device), from stored maps of cell coverage quality, etc. If such contextual information indicates that the user's local device is, or is likely to be, within communication range of a WiFi network, then an update may be initiated. However, if such contextual information indicates that the user's local device is, or is likely to be, outside communication range of a WiFi network, then a scheduled update may be postponed. In these embodiments, the update is initiated by the local device or the remote device and the information to be synchronized is transferred (e.g., via a push mode) from the local device to the remote device.

In still another embodiment, an update is performed as part of a process by which the user's local device (or one or more components of the user's local device) transitions from a relatively-high power state into any relatively-low power state (e.g., as specified in the ACPI, Specification, Rev. 5.0, Errata A). Alternatively, the update can be performed as part of a process by which the user's local device (or one or more components of the user's local device) transitions into a low-power state such as any of the S4, G2, G3, or D3 states as specified in the ACPI, Specification, Rev. 5.0, Errata A. In another example, the update can be performed as part of a process by which the user's local device (or one or more components of the user's local device) transitions into any state causing an active network connection (e.g., a wireless network connection through which the local device can communicate with the remote device) to become inactive. In these example embodiments, a component of the user's local device (e.g., the power management module, the CPU 102, the audio DSP 128, the sensor interface module 130, the cue detection module 134, etc.) can initiate an update (or otherwise cause an update to be initiated) before the transition is ultimately made, and the information to be synchronized is transferred (e.g., via a push mode) from the local device to the remote device.

In yet another embodiment, an update is performed when the user's local device (or one or more components of the user's local device) transitions into any state in which the user's local device can communicate (e.g., via any wired or wireless network connection) with the remote device. In this embodiment, the update can be initiated by one or both of the local and remote devices, and the information to be synchronized is transferred from the local device to the remote device, from the remote device to the local device, or any combination thereof.

In some cases, a local device may execute applications (also referred to herein as "real-time applications") that use, as input, data or signals generated by or output from the sensor interface module 130 or one or more sensors 132. Such data or signals can also referred to herein as one or more "sensor streams." If a real-time application monitors a sensor stream when the local device is in an "idle," "sleep" or other relatively low-power state, then the operating state of the local device can be captured and uploaded to the cloud computing service as the local device enters into an operational or other relatively high-power state.

ii. Managing Synchronization

Generally, one or both of the local and remote devices may include a synchronization module configured to handle updates (e.g., by initiating an update or otherwise causing an update to be initiated). A synchronization module associated with a local device may be provided as a microprocessor, digital signal processor or other microcontroller, programmable logic device, or any other processor typically consuming less power than the CPU 102 when in an active or working state. Optionally, the synchronization module includes cache or other local memory device (e.g., volatile memory, non-volatile memory or a combination thereof), DMA channels, one or more input buffers, one or more output buffers, and any other component facilitating the functions it supports. As with other embodiments, however, it will be appreciated that the synchronization module may be functionally integrated into one or more other components (e.g., the CPU 102, the user interface module 108, the audio I/O module 122, the audio DSP 128, the sensor interface module 130, or the like or any combination thereof). A synchronization module associated with a remote device may be provided as one or more CPUs, microprocessors, digital signal processors, etc. In one embodiment, the synchronization module(s) may be provided as exemplarily described in the aforementioned publication by Zhao et al. "Mirroring Smartphones for Good: A Feasibility Study", Mobile and Ubiquitous Systems: Computing, Networking, and Services, 2012.

In one embodiment, the synchronization module is configured to handle updates by determining what information should be transferred, as part of the update, from one device to another. To accomplish this, the synchronization module associated with a device can compute or otherwise determine whether one or more device states that presently exist at the device represent a change in device state(s) since the last update. If a change in a current device state is determined to exist, information describing that current device state (also referred to herein as "changed state information") is copied or otherwise identified to be included in the next update. In one embodiment, the synchronization module associated with a device can determine changes in device state by applying one or more hashes (e.g., a Zobrist hash, etc.) to an application program workspace, an operating system workspace, etc., stored or otherwise running on the device. As used herein, the term "workspace" can refer to a file, a directory, a file system (or part thereof), or the like or any combination thereof. Both the local and remote devices can run concurrently, allowing hashing to take place at intervals to confirm synchronicity of operational states between the devices.

In another embodiment, the synchronization module is configured to handle updates by determining what information should, once received at a device (e.g., the local device) as part of an update, be stored, acted upon, or otherwise used to update a device state at that receiving device. To accomplish this, the synchronization module associated with the receiving device (e.g., the local device) can interpret any received changed state information to determine whether any device state(s) transferred from the sending device (e.g., the remote device) are more recent than the corresponding device state(s) at the receiving device. (For purposes of facilitating discussion in this disclosure, the age of a current device state can be measured from the time the device state changed from the previous to the current device state.) If a device state transferred from the sending device is more recent than the corresponding device state at the receiving device, then the received changed state information is stored, acted upon, or otherwise used to update the device state at the receiving device.

In the embodiments discussed above, the synchronization module considers any change in device state in determining whether to include it as part of the update process. In another embodiment, however, changes that do not have a material effect on one or more device states are not considered. For example, changes to certain types of memory allocation may have no material impact on device state, yet they may appear to be different. Such changes are not considered by the synchronization module as part of the update process.

This approach provides the ability to transfer the "image" of the local device to other devices. The state of the local device is replicated at the remote device, and this replicated state can be transferred into other devices, as desired.

iii. Selective Local/Remote Execution

In one embodiment, any process or application executed, run or otherwise supported by the local device is replicated, mirrored, or otherwise supported at the remote device. In another embodiment, however, certain processes or applications are executed, run or otherwise supported only at the local device or only at the remote device. Designation of whether a process or application is to be executed, run or otherwise supported at the local device or the remote device can be specified by the process or application, by the user, etc. User designation may be desirable for privacy reasons. For example, the user may opt to run an application at the local device without sharing state and data in the cloud, as the application would only be running locally.

In contrast to the "local only mode," certain applications are particularly advantageous to run in the cloud. Applications that use a great deal of memory and processing, like image editing (e.g., Adobe Photoshop) or computer aided design, for example, are good candidates to be run at the remote device. In this case, the local device logs all inputs and renders (e.g., displays) the output of the remotely-run application via one or more output devices 112 (e.g., a display) of the local device. If a network connection to the remote device is lost, the application may switch to execution at the local device, where keystrokes are stored locally, and then updated when the network connection is restored.

iv. Example Use Cases

When the local device is off, in standby, out of cell range, etc., execution of the counterpart remote device takes over in the cloud computing service. Thus, no communication with the local device is required other than to alert the user that some critical data has arrived. There is no need to activate the local device to receive messages and store them locally if the user is not seeking to look at them. When the user is ready to look at them, input from the local device to the remote device initiates a synchronization procedure. This input can occur, for example, when the user wakes the local device from a sleep or standby mode. Of course, the user could select some messages to come though opportunistically still, which is useful for poor communication reception areas.

When the local device is off, or to save power when the user is not directly using the device, the remote device can be set to run certain data-driven actions autonomously (e.g., receiving messages, calls, email, social media updates, etc.), and to respond or process data appropriately. The local device is then synchronized with the remote device when needed (or at scheduled or less-frequent intervals) to save power at the local device needed for wireless transmission and reception (tx/rx) and CPU processing tasks. If the battery of the user's local device is low, the remote device can run all processing required at full speed and send memory snapshot images back to the local device to reduce power requirements associated with computation performed at the local device.

Certain applications (also referred to as "network applications") associated with services such as those offered by FACEBOOK, TWITTER, INSTAGRAM, etc., tend to send many notifications, updates, etc., via one or more wireless network connections. When running on a local device, such network applications typically power up the CPU to receive or request data, process it, and integrate it into a local database or workspace within the application in the local device file system. To conserve power consumption at the local device, such network applications may be replicated in the remote device. Once replicated, the remotely-executed network application behaves just as it would on the user's local device, but runs entirely in the cloud. The user can then select to wake the local device explicitly when desired, and this will cause the local device to be synchronized with the remote device. Once synchronized, the user can get all notifications, and run any function of the local device. It will be appreciated that this same approach can be repeated for the entire operation of the local device. Moreover, the user can opt to be notified for only a limited set of events. The local and remote devices synchronize upon (for example, the user's request, which is entered into the local device via voice, key stroke, etc.). This explicit user input can be forwarded to the remote device over a WiFi or cellular (if no WiFi) network connection.

v. Remote Device Interface

In one embodiment, the cloud computing service may provide a virtual device Web interface configured to allow the remote device to be used as the local device from another device (e.g., a desktop computer, another smartphone, smartwatch, tablet computer, etc.). Such a virtual device Web interface may be useful if the user's local device has been lost or physically destroyed. The remote device therefore provides a fully-restorable backup, which can be loaded (e.g., by, or at the request of, the user) onto a replacement local device.

V. Use Cases

Embodied as exemplarily described above, the cue detection module 134 may be set in an "always on" mode for processing audio input as discussed above, even while the CPU 102 is in a "sleep," "idle" or other low power state—and even when the device itself are in a global "sleep" state. Enabling "always on" cue detection enables a wealth of novel and useful applications. Some of which are described below.

- Navigation: a watermark signal played over loudspeakers awakens user's devices and automatically launches a navigation app or service (e.g., facilitating evacuation, shopping, driving, etc.). Navigation can be from user's current position and facilitated by GPS communications or via dead-reckoning (e.g., navigation app can instruct user to start from a predetermined location, watermark signal can only be reliably detected at a certain location, etc.).
- Presence of specific auxiliary data forces the device into silent mode. Useful in conference rooms and movie theaters
- When boarding airplane, auxiliary data automatically transitions a user's mobile device into airplane mode, and re-enables communications when leaving the aircraft, no user interaction (e.g., touch) is required. Only audio signaling can achieve this, as the radio cannot be re-enabled via a radio signal.
- Presence of specific auxiliary data disables video/audio capture functionality. For example, auxiliary data embedded in movie soundtrack prevents users from recording movie on the device
- Guided tour: device automatically shows content relevant to the nearest museum exhibit.
- Tether device to specific location, device only functions when activation auxiliary data is present, and disables itself when removed from the authorized area (could be useful to discourage theft of guided tour devices as they become useless once taken away from the venue).
- In order to pair the device to external device (e.g., via WiFi, Bluetooth, etc.) authentication data is transmitted via watermark signal.
- In order to pair the device to external device (e.g., via WiFi, Bluetooth, etc.) authentication data is transmitted to the device via watermark signal, the device decodes the auxiliary data therefrom and establishes a wireless communication channel based on the decoded information.

More on Audio Classification Based on Co-occurrence Statistics

One benefit of audio or image watermark detection in a shopper's experience is the ability to enhance the shopping experience. This is especially the case when watermarks can be detected wherever the shopper goes. In an audio context, one way of achieving always-on watermark detection is to have a smart phone continuously listening and extracting audio watermarks from encountered audio sources. But keeping the device always-on can be computationally expensive, consumes energy unnecessarily, and drains a smart phone's battery. Therefore, as detailed above, an initial pre-filter can be used to evaluate whether there is a potential audio source that may contain an audio watermark. One initial pre-filter, discussed in detail below, uses a feature-based classification. One objective of this initial pre-filter is to distinguish between silence and speech/music in the presence of different ambient or environmental noise.

Feature Description

Given an audio sample x of duration t seconds and its sample rate f, we define the sample as vector: $x=(x_i)_{i=1}^{f \cdot t}$.

The features extracted from this sample are based on modeling changes in localized zero-crossing rate and maximum magnitude. The reason for these features is that we assume that for additive white noise these two properties will remain constant in time while they tend to change rapidly for speech and music. Firstly, sample x is divided into:

$$n = \left\lfloor \frac{f \cdot t}{l} \right\rfloor \text{ smaller non-overlapping continuous sub-}$$

samples $s_k \subset x$ of length $l$, $s_k = (s_{k,i})_{i=1}^{l}$, $k \in \{1, \ldots, n\}$.

For every $k \in \hat{n}$ the following two numbers are evaluated:

1. Zero-crossing rate: $z_k = \sum_{i=1}^{l-1} [\text{sign}(s_{k,i}) \cdot \text{sign}(s_{k,i+1}) < 0]$, where $[\cdot]$ denotes Iverson bracket.

2. Maximum magnitude $v_k = \max_{i \in l} |s_{k,i}|$, where $|\cdot|$ denotes absolute value.

The following algorithm is identical for both $z_k$ and $v_k$ with different parameters, so it needs only to be described once. The second step is computing a difference vector:

$\Delta r_i = z_i - z_{i+1}$, resp. $\Delta r_i = v_i - v_{i+1}$, $i \in \{1, \ldots, n-1\}$ Then, given thresholding parameter T and quantization parameter q, $\Delta z$ is quantized, rounded and thresholded to contain integer values from $\{-T, \ldots, T\}$. Formally, $$r_i = trunc_T\left(\text{round}\left(\frac{\Delta z_i}{q}\right)\right), i \in \widehat{n-1}$$

A D-dimensional co-occurrence matrix $C=(C_{d_1}, \ldots, d_D)$, $d_i \in \{-T, \ldots, T\}$ from every D neighboring values of r is computed as $$C_{d_1}, \ldots, d_D = \sum_{i=1}^{n-D} [(r_i, r_{i+1}, \ldots, r_{i+D-1}) = (d_1, d_2, \ldots, d_D)].$$

Moreover, we use a probability of occurrence of $(d_1, d_2, \ldots, d_D)$ that is assumed to be the same as of $(d_D, d_{D-1}, \ldots, (-d_1, -d_2, \ldots, -d_D)$ and $(-d_D, -d_{D-1}, \ldots, -d_1)$ so we can merge values in all those bins into a single bin which helps to reduce dimensionality. Finally, the co-occurrence is normalized so that the sum over all elements equals 1.

Parameter values are heuristically set to:

L=14.

Zero-crossing rate: q=1, T=2, D=3. Resulting dimensionality is 39.

Maximum magnitude: q=0.002, T=2, D=3. Resulting in a dimensionality of 39.

The total number of features is 78.

Testing

We preformed testing on audio segments of lengths 1 and 6 seconds. These segments were created by splitting audio files containing either silence (e.g., which may include ambient or environmental noise) or some audio content (speech or music). The tested audio segments contained clips recorded in two conference rooms, one small and one relatively larger, using various recording devices, including an iPad2, iPad3, iPad mini, iPhone4 and iPhone4S, for the audio content samples. Silence samples were recorded using an iPad3 and iPhone4s in many different noisy environments. All audio samples were recorded using a sampling rate of 16 kHz.

A Support Vector Machine (SVM) with an RBF kernel (using a libsvm library) was used as a classifier using 5-fold cross validation for evaluation. SVMs are machine learning techniques. The open source "libSVM" library is downloadable at http://www.csie.ntu.edu.tw/~cjlin/libsvm/. Implementation details of the LIBSVM, including solving SVM ("Support Vector Machines") optimization problems, theoretical convergence, multiclass classification, probability estimates and parameter selection are detailed in Chang, C.-C. and Lin, C.-J. 2011, "LIBSVM: A library for support vector machines," ACM Trans. Intell. Syst. Technol. 2, 3, Article 27 (April 2011), 27 pages, which is hereby incorporated herein by reference in its entirety.

Recall from above that we are trying to distinguish between silence samples and content samples (e.g., music or voice samples), so we can enable a watermark detector when the latter is encountered. Distinguishing between silence and content is a 2-class problem. For our tests the classifier was trained and tested using the same amount of silence and content samples (identical priors). The whole sample set was divided into halves, one half for training, and the second half for testing.

Figure 12:
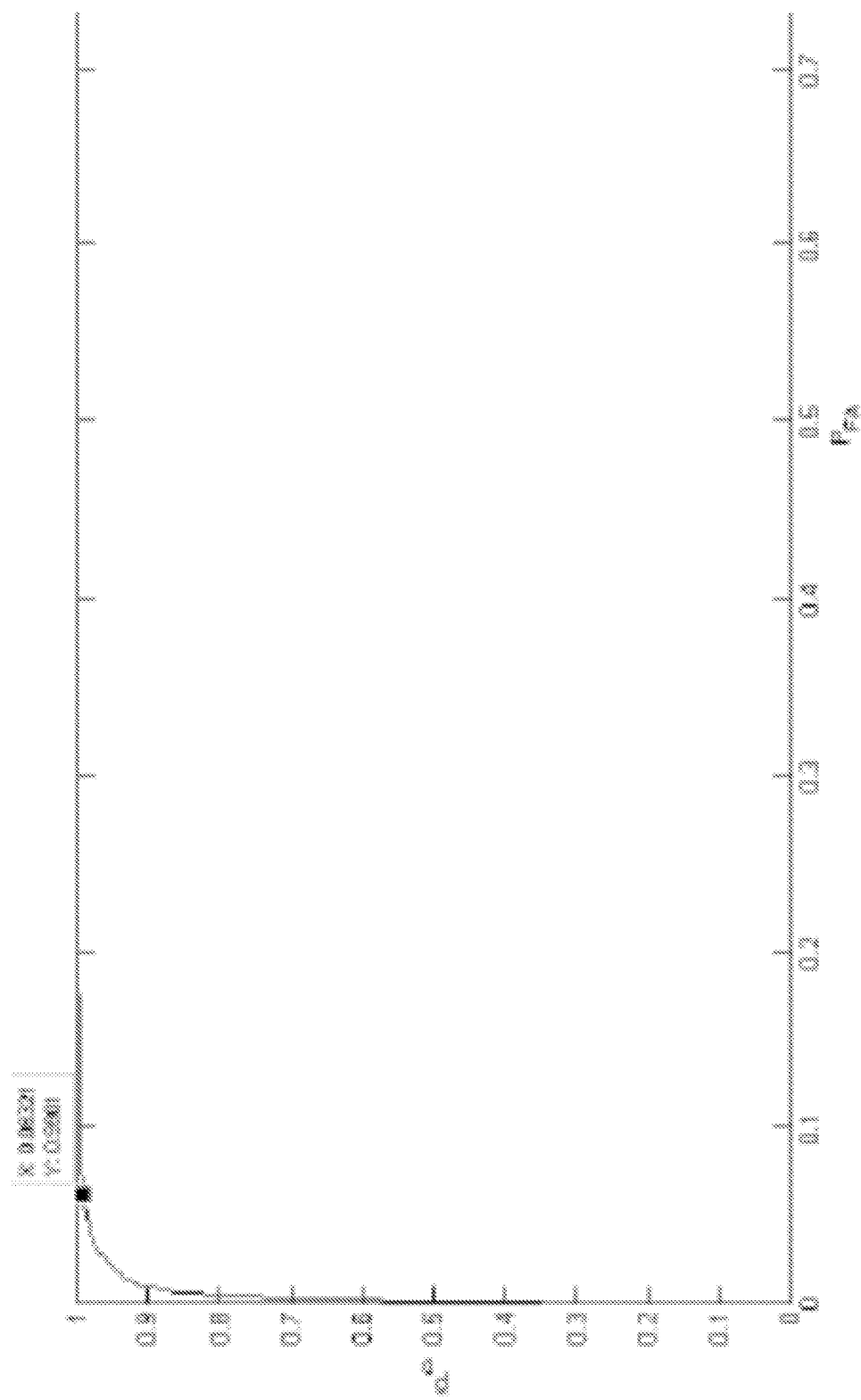
FIG. 12 is a diagram showing receiver operating characteristics (curve) for tested 1 second sound segments.
Figure 13:
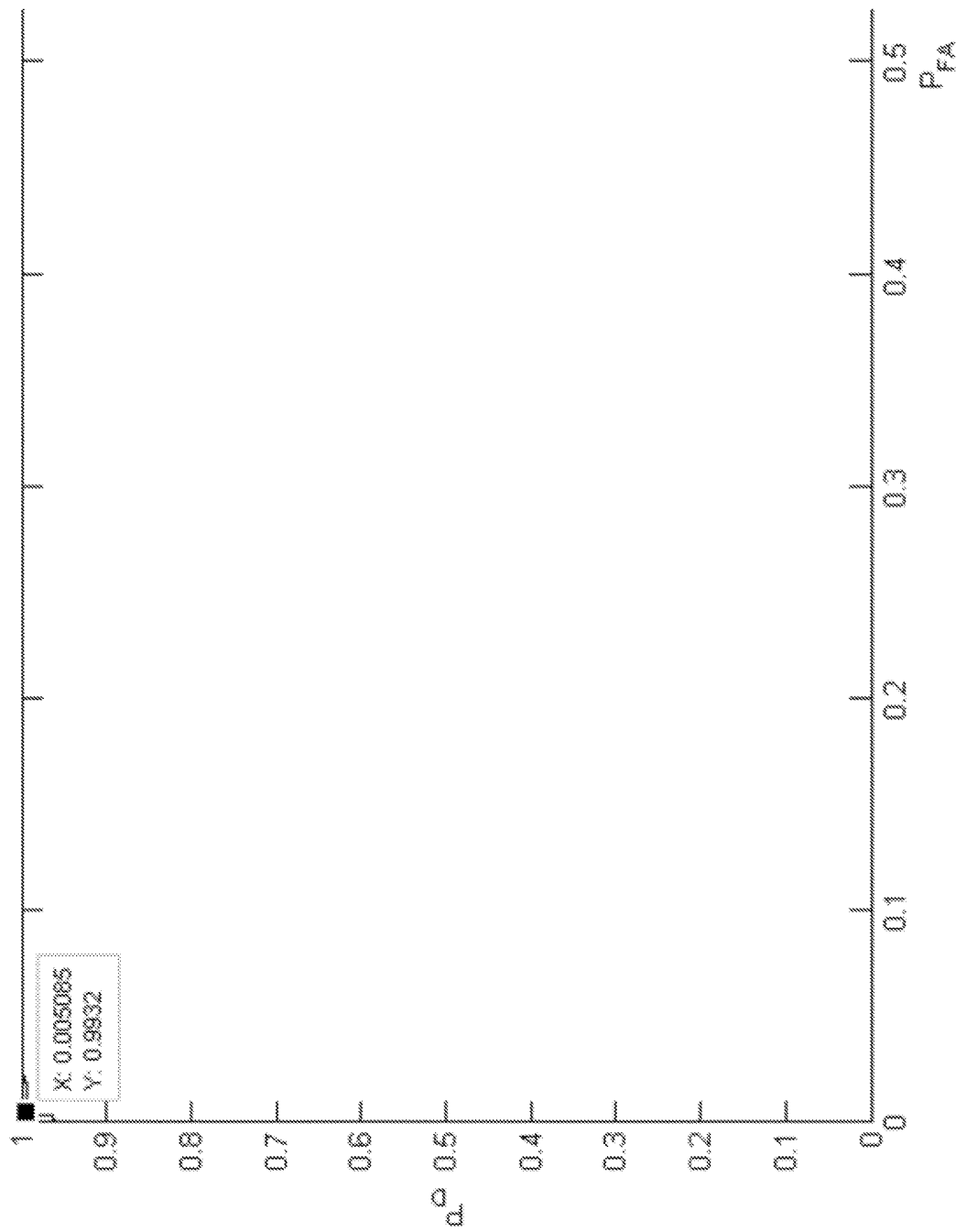
FIG. 13 is a diagram showing receiver operating characteristics (curve) for tested 6 second sound segments.

FIGS. 12 and 13 show Receiver Operating Characteristics (ROC) obtained by shifting bias of a trained SVM.

One (1) Second Audio Segments

Classification of shorter segments often are less reliable than in case of longer segments because of less robust statistics. Also, there is much higher chance that speech or music will have a pause in a segment—perhaps resulting in mislabeling the audio segment, not the classifier and the sample is later wrongly considered misclassified.

FIG. 12 shows the ROC of the classifier trained on over 7000 1 second samples (half content, half noise). For the content detection rate of 99% it falsely detects content in about 6% of silence cases.

Six (6) Second Audio Segments

FIG. 13 shows the ROC of the classifier trained on around 1200 samples (half content, half noise). For the content detection rate of 99.3% it falsely detects content in about 0.5% of silence cases. In practice, segments of 1 s or shorter can also be classified to provide an even quicker response to changes in audio content and average the features over the time after the change to have more reliable decision. Or we can simply average several decisions of consecutive or nearby samples.

Based on our testing, the 78 dimensional feature set can separate noise from content on our training samples extremely well. The noise segments form several tight clusters in the feature space, depending on the room or place, and it can be very easily separated using non-linear classifiers. Further, this methodology also is adaptable for classifying other audio environments, like cars with road noise, coffee shops, home settings, each with or without speech or music.

Given a t second audio sample with sampling rate f, we obtain a vector with n=f·t elements. A rough estimation of number of necessary operation is:

Feature extraction—2.1n comparisons, 2.7n multiplications and 1.3n sums. It scales linearly with number of elements and size of a segment and it can be vectorized.

Classifier—for linear classifiers (that do not perform well on my examples), the complexity is just 'feature_dimension' for both multiplication, addition and comparison. With non-linear SVMs the estimation is more complex (it depends on number of training samples and shape of the feature clusters). In general, the number of operations is be in order of $O$ (feature_dimension·number_of_support_vectors),
where the number of support vectors are hundreds or thousands.

Feature computation can be speed up 4-16 times using Streaming SIMD Extensions (SSE) vectorization in C++. Moreover, zero-crossing rate (ZCR) co-occurrence can be computed using only integer operations.

VI. Concluding Remarks

Having described and illustrated the principles of the technology with reference to specific implementations, it will be recognized that the technology can be implemented in many other, different, forms.

For example, while the detailed embodiments contemplated the cue detection module 134 as discerning cues based on audio input, it will be appreciated that the principles associated with processes implemented by any of the audio activity detector module 202, the watermark detector module 502, the watermark decoder module 802, and the policy management module 1002 may be adapted to discern cues based on imagery captured by a camera 120 (or from other image- or video-based input), or other data generated by (or obtained from) any other electronic device component.

Likewise, cues may be discerned based on any suitable watermark detection/decoding techniques, fingerprinting techniques, or any other suitable identification technique. Examples of other watermark detection/decoding techniques are discussed in U.S. Pat. Nos. 6,763,124 and 8,401,224, in U.S. Patent App. Pub. Nos. 2010/0150434 and 2014/0052555, in U.S. application Ser. No. 13/975,919, and in International Patent Pub. No. WO2014/182963, each of which are incorporated herein by reference. Fingerprinting techniques are well known: SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.) Still other fingerprinting techniques are detailed in patent publications 20090282025, 20060104598, WO2012004626 and WO2012156774 (all by LTU Technologies of France). Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision-ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers. Cues can also be discerned based on optical character recognition (OCR).

Embodiments of the present technology can also employ neuromorphic processing techniques (sometimes termed "machine learning," "deep learning," or "neural network technology"). As is familiar to artisans, such processors employ large arrays of neuron-like elements—interconnected to mimic biological synapses. Such processors employ programming that is different than the traditional, von Neumann, model. In particular, connections between the circuit elements are weighted according to correlations in data that the processor has previously learned (or been taught). When a pattern of data (e.g., a set of audio, image or other sensor data) is applied to the processor (i.e., to inputs of several of the circuit elements), certain nodes may spike while others remain relatively idle. Each of these nodes may serve as an input to plural other circuit elements, triggering further spiking in certain other nodes—a chain reaction that ultimately provides signals to output nodes to indicate the results of the neuromorphic processing. (In addition to providing output signals responsive to the input data, this process can also serve to alter the weightings, training the network to better respond to certain patterns that it has seen (i.e., processed) before.) Such techniques are well suited for pattern recognition applications, among many others.

Additional information on such techniques is detailed in the Wikipedia articles on "Machine Learning," "Deep Learning," and "Neural Network Technology," as well as in Le et al, Building High-Level Features Using Large Scale Unsupervised Learning, arXiv preprint arXiv:1112.6209 (2011), and Coates et al, Deep Learning with COTS HPC Systems, Proceedings of the 30th International Conference on Machine Learning (ICML-13), 2013. These journal papers, and then-current versions of the "Machine Learning" and "Neural Network Technology" articles, are attached as appendices to copending patent application 61/861,931, filed Aug. 2, 2013 (see also, published non-provisional counterpart 2015-0055855).

The methods, processes, and systems described above may be implemented in hardware, software or a combination of hardware and software. For example, the signal processing operations for distinguishing among sources and calculating position may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

This specification has discussed several different embodiments and examples. It should be understood that the methods, elements and concepts detailed in connection with one embodiment or example can be combined with the methods, elements and concepts detailed in connection with other embodiments or examples. While some such arrangements have been particularly described, many have not—due to the large number of permutations and combinations. The Applicant similarly recognizes and intends that the methods, elements and concepts of this specification can be combined, substituted and interchanged—not just among and between themselves, but also with those known from the cited prior art incorporated by reference above. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc. Although disclosed as complete systems, sub-combinations of the detailed arrangements are also separately contemplated (e.g., omitting various of the features of a complete system). While certain aspects of the technology have been described by reference to illustrative methods, it will be recognized that apparatuses configured to perform the acts of such methods are also contemplated as part of the Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that the Applicant intends be incorporated into embodiments of the present technology, and into which the technologies and teachings detailed herein be incorporated. To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family. In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

What is claimed is:

1. A method, comprising:
in an electronic device comprising first and second processors, obtaining audio input corresponding to sound propagating within an aural environment surrounding the electronic device;
at a first processor, processing the audio input to discern a characteristic of the audio input, the processing comprising processing audio input samples of the audio input to determine a relative-entropy of the audio input, and estimating the presence of audio activity based on the determined relative-entropy of the audio input;
generating an output based upon the processing of the audio input to discern the characteristic; and
causing the second processor to enter into a higher power state based on the generated output.

2. The method of claim 1, wherein processing the audio input to discern the characteristic further comprises determining zero-crossing or short-term energy metrics from the audio input, determining co-occurrence statistics of the zero-crossing or short term energy metrics, and classifying the audio input based on the co-occurrence statistics.

3. The method of claim 1, wherein the output comprises cue detection output, and further comprising:
by reference to the cue detection output, enabling at least one policy embodied on the electronic device.

4. The method of claim 1, wherein the output comprises cue detection output, and further comprising:
by reference to the cue detection output, disabling at least one policy embodied on the electronic device.

5. The method of claim 1, comprising:
processing the received audio to derive a plurality of items of auxiliary data therefrom, wherein at least one of the items of auxiliary data comprises delivery control data; and
by reference to the delivery control data, delivering at least one other of the items of auxiliary data to at least one component of the electronic device.

6. The method of claim 1, wherein the first and second processors are components of an electronic device, the method further comprising generating an audio signal corresponding to sound propagating within an aural environment surrounding the electronic device, wherein the obtained audio input comprises a plurality of samples of the audio signal.

7. The method of claim 6, wherein the second processor is a CPU.

8. The method of claim 7, wherein the first processor is a digital signal processor.

9. The method of claim 7, further comprising processing the audio input while the second processor is in an idle or sleep state.

10. The method of claim 1, wherein processing the audio input to discern the characteristic of the audio input comprises processing the audio input to discern the presence of a digital audio watermark signal within the audio input.

11. The method of claim 10, wherein processing the audio input to discern the characteristic of the audio input comprises processing the audio input to discern auxiliary data conveyed by a digital audio watermark signal present within the audio input.

12. The method of claim 10, comprising:
detecting presence of the digital watermark signal from a first sub-band spanning a first frequency range; and
decoding auxiliary data from the digital watermark signal from second sub-bands spanning a frequency range greater than the first frequency range.

13. The method of claim 12, comprising:
transforming the frame with a sparse FFT in a process of detecting the presence of the digital watermark signal from the first sub-band.

14. The method of claim 12, comprising:
transforming a frame with a first FFT for audio input sampled at a first sample rate in a process of detecting the presence of the digital watermark signal from the first sub-band; and
transforming a frame with a second FFT for audio input sampled at a second sample rate higher than the first sample rate, in a process of decoding auxiliary data from the digital watermark signal from the second sub-bands.

15. The method of claim 10, wherein processing the audio input to discern the presence of a digital audio watermark signal within the audio input comprises:
buffering frames of the audio input;
transforming the frames into spectral magnitude frames;
accumulating spectral magnitude frames into an accumulation buffer;
from the accumulation buffer, extracting spectral magnitude values corresponding to selected bits of the digital audio watermark signal;
correlating the extracted spectral magnitude values with a predetermined signal to produce a correlation metric.

16. The method of claim 15, wherein accumulating comprises:
accumulating spectral magnitude frames into a first accumulation buffer, the spectral magnitude frames corresponding to shift groups; and
accumulating spectral magnitude frames from the first accumulation buffer according to shift group in a second accumulation buffer.

17. The method of claim 15 comprising:
scaling the spectral magnitude frames in the second accumulation buffer according to plural noise profiles to produce candidate spectral magnitude profiles for each of the noise profiles; and
extracting spectral magnitude values from the candidate spectral magnitude profiles corresponding to selected bits of the digital audio watermark signal.

18. The method of claim 15, comprising:
correlating the extracted spectral magnitude values with predetermined signals to produce correlation metrics for the predetermined signals;
determining a reference spectral magnitude sequence for a predetermined signal detected based on the correlation metrics;
generating a structural strength metric for the reference spectral magnitude sequence;
selecting spectral magnitude sequences from which to decode auxiliary data by identifying spectral magnitude sequences with a structural strength metric that exceeds a threshold decode candidate value.

19. The method of claim 18, comprising:
identifying similar spectral magnitude code sequences based on similarity of time shift or noise profile of the spectral magnitude code sequences to produce sub-sets of similar spectral magnitude code sequences; and selecting spectral magnitude sequences from which to decode auxiliary data by selecting within a sub-set based on the structural strength metric.

20. A non-transitory computer readable medium, on which is stored instructions, which configure a first processor to:

obtain audio input corresponding to sound propagating within an aural environment surrounding an electronic device;

process the audio input to discern a characteristic of the audio input by determining a relative-entropy of the audio input, and estimating the presence of audio activity based on the determined relative-entropy of the audio input;

generate an output based upon the processing of the audio to discern the characteristic; and cause a second processor to enter into a higher power state based on the generated output.

21. The non-transitory computer readable medium of claim 20, on which is stored instructions, which configure the first processor to process the audio input while the second processor is in an idle or sleep state.

22. The non-transitory computer readable medium of claim 20, on which is stored instructions, which configure the first processor to discern the characteristic of the audio input by processing the audio input to discern auxiliary data conveyed by a digital audio watermark signal present within the audio input.

23. The non-transitory computer readable medium of claim 20, on which is stored instructions, which configure the first processor to discern the characteristic of the audio input by processing the audio input to discern presence of a digital audio watermark signal within the audio input.

24. The non-transitory computer readable medium of claim 23, on which is stored instructions to configure the first processor to:

buffer frames of the audio input;

transform the frames into spectral magnitude frames;

accumulate spectral magnitude frames into an accumulation buffer;

from the accumulation buffer, extract spectral magnitude values corresponding to selected bits of the digital audio watermark signal; and correlate the extracted spectral magnitude values with a predetermined signal to produce a correlation metric.

25. A device comprising:

a first processor coupled to a memory and a second processor;

the first processor configured to obtain from the memory audio input corresponding to sound propagating within an aural environment surrounding an electronic device;

process the audio input to discern a characteristic of the audio input by determining a relative-entropy of the audio input, and estimating presence of audio activity based on the determined relative-entropy of the audio input;

generate an output based upon the processing of the audio to discern the characteristic; and cause the second processor to enter into a higher power state based on the generated output.

26. The device of claim 25 wherein the first processor is configured to process the audio input while the second processor is in an idle or sleep state.

27. The device of claim 25 wherein the first processor is configured to discern the characteristic of the audio input by processing the audio input to discern auxiliary data conveyed by a digital audio watermark signal present within the audio input.

28. The device of claim 25 wherein the first processor is configured to discern the characteristic of the audio input by processing the audio input to discern presence of a digital audio watermark signal within the audio input.

29. The device of claim 28 wherein the first processor is configured to:

buffer frames of the audio input;

transform the frames into spectral magnitude frames;

accumulate spectral magnitude frames into an accumulation buffer;

from the accumulation buffer, extract spectral magnitude values corresponding to selected bits of the digital audio watermark signal; and correlate the extracted spectral magnitude values with a predetermined signal to produce a correlation metric.

* * * * *